US012337828B2

(12) United States Patent
Hashimoto

(10) Patent No.: US 12,337,828 B2
(45) Date of Patent: Jun. 24, 2025

(54) REMOTE TRAVEL SYSTEM

(71) Applicant: TOYOTA JIDOSHA KABUSHIKI KAISHA, Toyota (JP)

(72) Inventor: Tatsuya Hashimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 271 days.

(21) Appl. No.: 17/946,462

(22) Filed: Sep. 16, 2022

(65) Prior Publication Data

US 2023/0101342 A1 Mar. 30, 2023

(30) Foreign Application Priority Data

Sep. 28, 2021 (JP) ................................ 2021-157693

(51) Int. Cl.
*B60W 30/06* (2006.01)
*B60W 30/09* (2012.01)
*B60W 60/00* (2020.01)
*G05D 1/00* (2024.01)

(52) U.S. Cl.
CPC ............ *B60W 30/06* (2013.01); *B60W 30/09* (2013.01); *B60W 60/001* (2020.02); *G05D 1/0011* (2013.01); *B60W 2556/45* (2020.02)

(58) Field of Classification Search
CPC .. B60W 30/06; B60W 2556/45; B60W 30/09; B62D 15/0285
See application file for complete search history.

(56) References Cited

U.S. PATENT DOCUMENTS

| 10,759,343 | B2 * | 9/2020 | Leem ..................... G08G 1/012 |
| 2014/0244073 | A1 * | 8/2014 | Okamura ........... B62D 15/0285 701/2 |
| 2018/0253972 | A1 * | 9/2018 | Nishida ................. B60L 53/126 |
| 2019/0204821 | A1 | 7/2019 | Yoon et al. |
| 2019/0386526 | A1 * | 12/2019 | Grassl ..................... H02J 50/10 |
| 2021/0009111 | A1 * | 1/2021 | Kang ................ B60W 60/0051 |
| 2021/0179078 | A1 * | 6/2021 | Nakada ................... G08G 1/143 |

FOREIGN PATENT DOCUMENTS

JP 2021-094934 A 6/2021

* cited by examiner

*Primary Examiner* — Abby J Flynn
*Assistant Examiner* — Clint Pham
(74) *Attorney, Agent, or Firm* — Sughrue Mion, PLLC

(57) ABSTRACT

In a remote travel system, a vehicle control device of a host vehicle and a terminal control device of an operation terminal perform wireless communication with each other, and the vehicle control device performs remote travel control of making the host vehicle travel autonomously to a designated stall in response to operation of the operation terminal. The remote travel system is configured such that a stall registered in the remote travel system is allowed to be designated as the designated stall during execution of the remote travel control. The remote travel system is configured such that, even when there is a movable obstacle on a travel route of the host vehicle to a stall to be reached by the host vehicle during execution of the remote travel control, that stall is allowed to be designated as the designated stall when that stall is one registered in the remote travel system.

3 Claims, 48 Drawing Sheets

FIG. 14
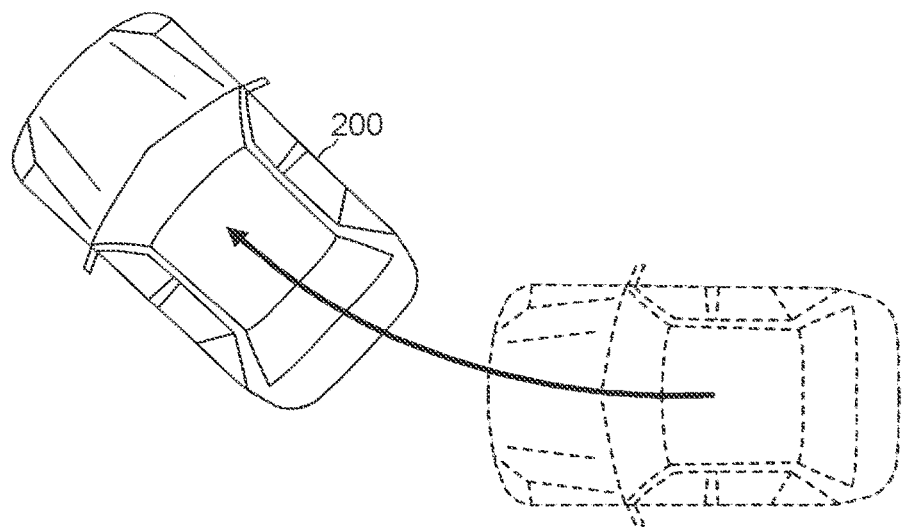
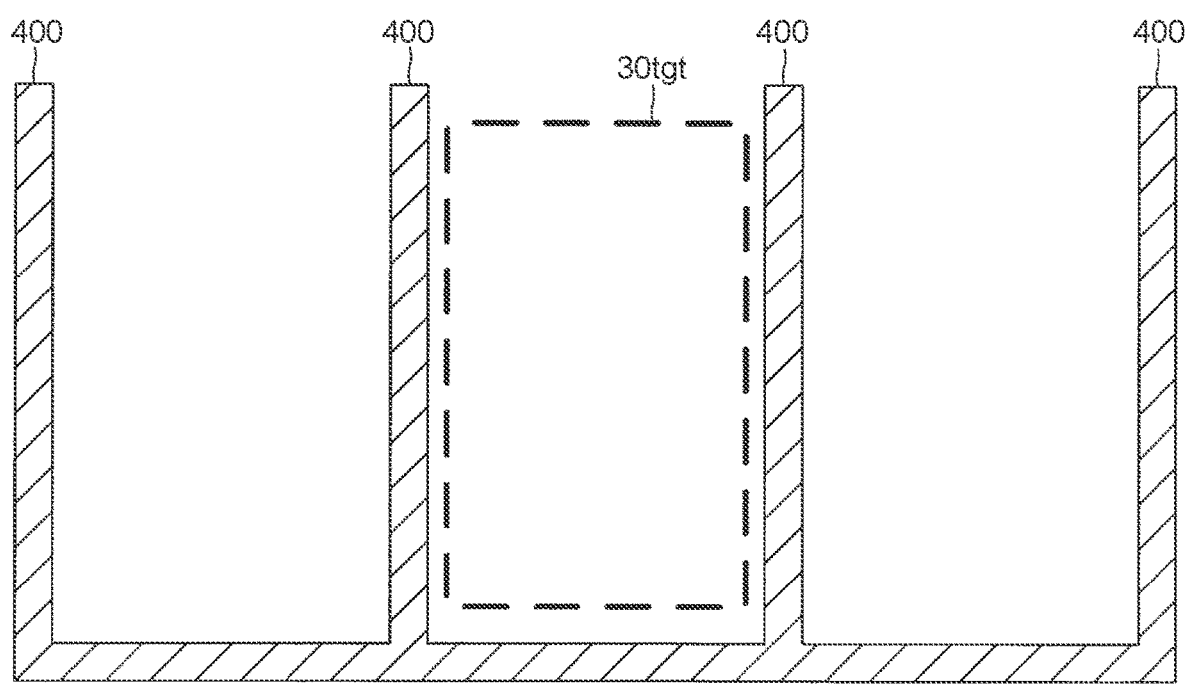

REMOTE TRAVEL SYSTEM

CROSS-REFERENCE TO RELATED APPLICATION

This application claims priority to Japanese Patent Application No. 2021-157693 filed on Sep. 28, 2021, incorporated herein by reference in its entirety.

BACKGROUND

1. Technical Field

The disclosure relates to a remote travel system.

2. Description of Related Art

There is a known remote travel system that allows remote travel control of remotely making a host vehicle travel autonomously and move into a parking stall by operation of a mobile phone terminal or the like (e.g., see Japanese Unexamined Patent Application Publication No. 2021-94934). In conventional remote travel systems, when a host vehicle is stopped near a parking stall, this parking stall is detected, and when this parking stall is designated as a parking stall into which the host vehicle is to be moved, this designated parking stall is set as a designated parking stall and the host vehicle is moved into the designated parking stall by remote travel control.

SUMMARY

In the case where, when there is an obstacle on a travel route of a host vehicle to a parking stall into which the host vehicle is to be moved by remote travel control and this obstacle is an obstacle that can be removed, such as a shutter or a pylon, the parking stall can be designated as the designated parking stall only after the obstacle is removed from the travel route, then the user of the remote travel system can designate the parking stall as the designated parking stall only after temporarily stepping out of the host vehicle and removing the obstacle from the travel route, which reduces the flexibility in selecting the timing of designating a designated parking stall.

An object of the disclosure is to provide a remote travel system that allows great flexibility for the timing of designating a stall to be reached by the host vehicle under remote travel control.

A remote travel system according to the disclosure is a system in which a vehicle control device of a host vehicle and a terminal control device of an operation terminal perform wireless communication with each other, and the vehicle control device performs remote travel control of making the host vehicle travel autonomously to a designated stall in response to operation of the operation terminal. The remote travel system according to the disclosure is configured such that a stall registered in the remote travel system is allowed to be designated as the designated stall during execution of the remote travel control. Further, the remote travel system according to the disclosure is configured such that, even when there is a movable obstacle on a travel route of the host vehicle to a stall to be reached by the host vehicle during execution of the remote travel control, the stall to be reached by the host vehicle is allowed to be designated as the designated stall when that stall is a stall registered in the remote travel system.

In the case where the remote travel system is designed such that, when there is an obstacle on the travel route of the host vehicle to a stall to be reached by the host vehicle under the remote travel control and this obstacle is an obstacle that can be removed (movable obstacle), a designated stall can be designated only after the obstacle is removed from the travel route, then the user can designate that stall as the designated stall only after temporarily stepping out of the host vehicle and removing the obstacle from the travel route, which reduces the flexibility in selecting the timing of designating a designated stall.

However, if a stall to be designated as the designated stall is a stall registered in the remote travel system (registered stall), even when that stall is designated as the designated stall in a state where there is an obstacle on the travel route of the host vehicle, processing required to make the host vehicle travel to that stall can be performed based on information about the registered stall. Further, if that obstacle is one that can be removed from the travel route of the host vehicle (movable obstacle), the host vehicle can be made to travel to the designated stall when that obstacle is removed from the travel route after the host vehicle starts traveling and before the host vehicle comes into contact with the obstacle at the latest.

According to the disclosure, even when there is a movable obstacle on the travel route of the host vehicle to a stall to be reached by the host vehicle during execution of the remote travel control, that stall can be specified as the designated stall when that stall is a stall registered in the remote travel system. This can increase the flexibility in selecting the timing of designating a designated stall.

The remote travel system according to the disclosure may be configured such that, when a stall registered in the remote travel system is designated as the designated stall and the obstacle is present on a travel route of the host vehicle to the designated stall during execution of the remote travel control, the terminal control device performs a notification process of notifying the presence of the obstacle.

According to the disclosure, it is notified that there is an obstacle on the travel route of the host vehicle, which can increase the likelihood of the obstacle being removed by the user of the remote travel system.

The remote travel system according to the disclosure may be configured such that the designated stall is allowed to be designated by operation of a device installed in the host vehicle.

In the case where a device for designating a designated stall is installed in the host vehicle, if the remote travel system is designed such that a designated stall can be designated only after an obstacle is removed, the user is forced to go through the trouble of temporarily stepping out of the host vehicle, removing the obstacle from the travel route of the host vehicle, getting into the host vehicle again, and designating a designated stall.

According to the disclosure, if a stall to be designated as a designated stall is a stall registered in the remote travel system (registered stall), that stall can be designated as the designated stall before the obstacle is removed from the travel route of the host vehicle. Thus, the disclosure can avoid forcing the user to go through the trouble as described above.

The remote travel system according to the disclosure may be configured such that travel of the host vehicle is stopped when a likelihood of the host vehicle coming into contact with the obstacle becomes high while the host vehicle is traveling under the remote travel control.

According to this configuration, the host vehicle is stopped when the likelihood of the host vehicle coming into contact with an obstacle becomes high after the host vehicle starts traveling under remote travel control. Thus, travel safety of the host vehicle can be secured even when the configuration is adopted in which a stall to be designated as the designated stall can be designated as the designated stall when there is an obstacle on the travel route of the host vehicle to that stall.

The constituent elements of the disclosure are not limited to those of an embodiment of the disclosure to be described later with reference to the drawings. Other objects, other features, and associated advantages of the disclosure will be easily understood from the description of the embodiment of the disclosure.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 14 is a view showing a situation where the host vehicle is made to move forward while turning right by remote move-in control;

DETAILED DESCRIPTION OF EMBODIMENTS

A remote travel system according to an embodiment of the disclosure will be described below with reference to the drawings.

The remote travel system according to the embodiment of the disclosure to be described below is a system in which a control device of a host vehicle (vehicle control device) and a control device of an operation terminal (terminal control device) perform wireless communication with each other, and the vehicle control device performs remote travel control of making the host vehicle travel autonomously to a designated stall in response to operation of the operation terminal.

In particular, the remote travel system according to the embodiment of the disclosure to be described below is a system in which the vehicle control device and the terminal control device perform wireless communication with each other, and the vehicle control device performs remote move-in and -out control (remote travel control) of making the host vehicle travel autonomously and move (park) into a designated parking stall in response to operation of the operation terminal and making the host vehicle travel autonomously and move out of a parking stall to a designated stall in response to operation of the operation terminal.

However, the remote travel system according to the disclosure is not limited to such a remote move-in and -out system. The remote travel system according to the disclosure may be any system in which the vehicle control device performs remote travel control of making the host vehicle travel autonomously to a designated stall remotely from the outside of the host vehicle in response to operation of the operation terminal.

Figure 1:
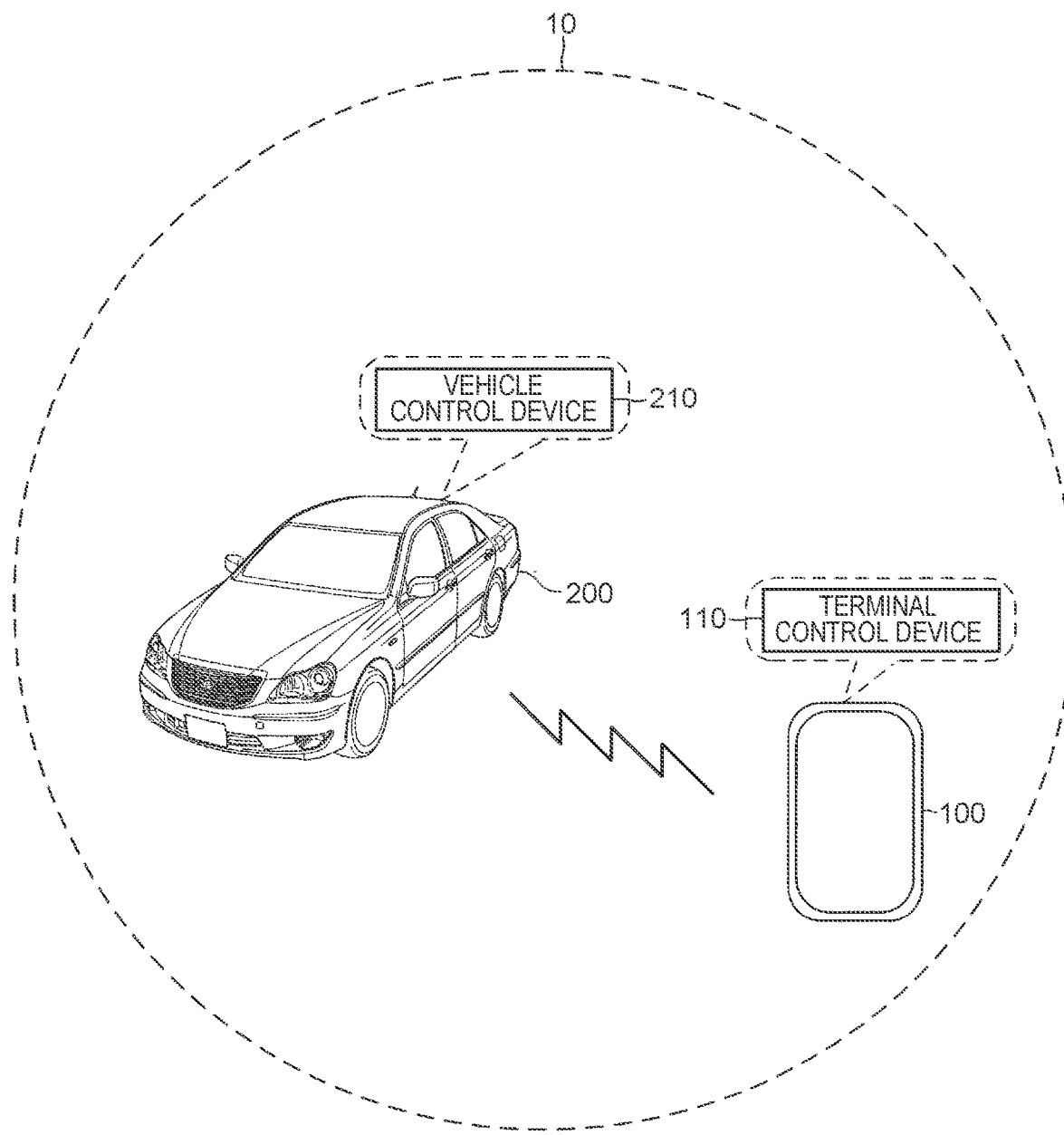
FIG. 1 is a view showing a remote travel system according to an embodiment of the disclosure.

As shown in FIG. 1, a remote travel system 10 according to the embodiment of the disclosure includes at least a control device installed in an operation terminal 100 (terminal control device 110) and a control device installed in a host vehicle 200 (vehicle control device 210).

Figure 2:
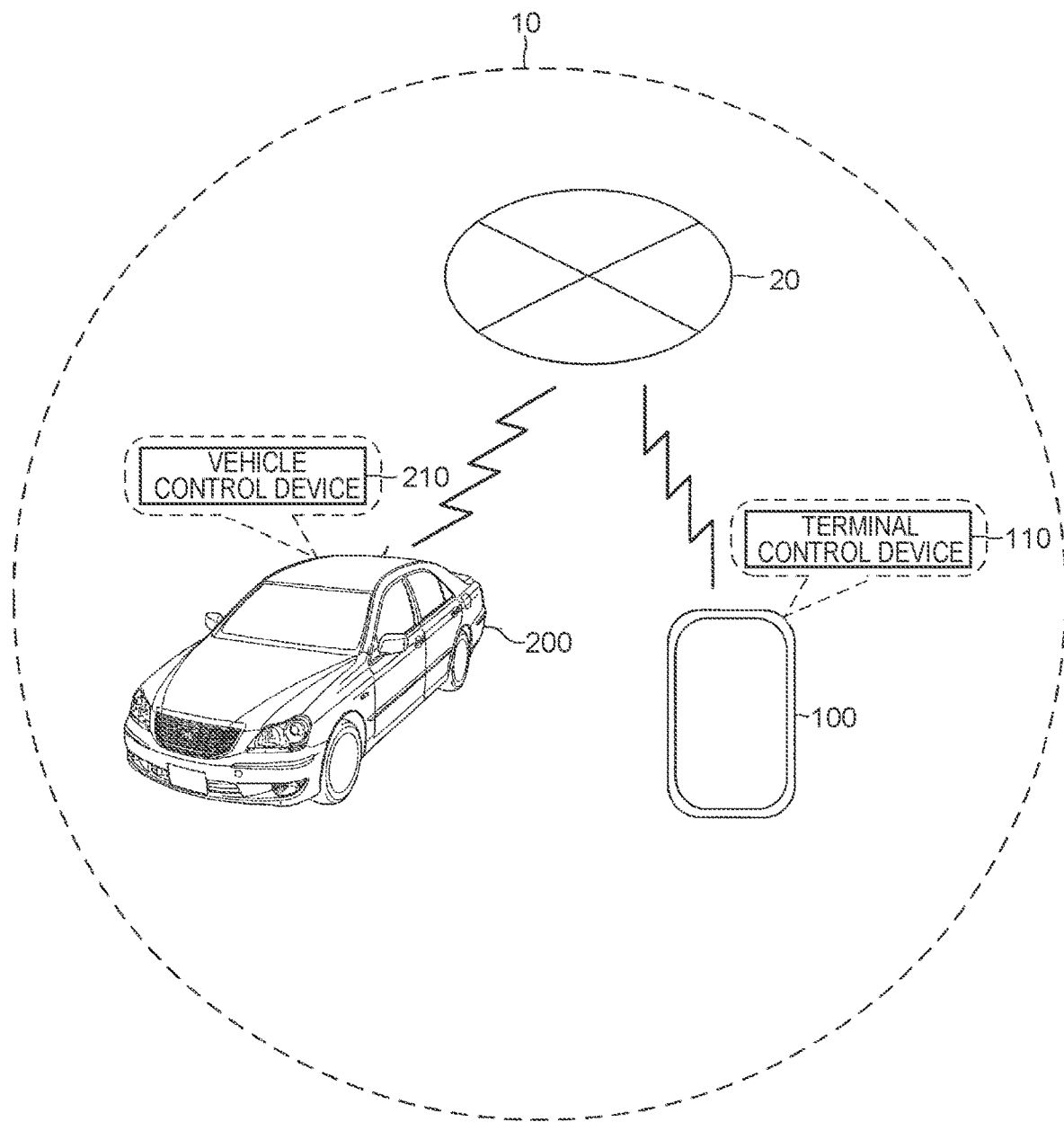
FIG. 2 is a view showing another remote travel system according to the embodiment of the disclosure.

The remote travel system 10 is configured such that various signals can be wirelessly and directly transmitted and received between the terminal control device 110 and the vehicle control device 210. As shown in FIG. 2, the remote travel system 10 may include at least the terminal control device 110, the vehicle control device 210, and the Internet 20 and be configured such that various signals are transmitted and received between the terminal control device 110 and the vehicle control device 210 via the Internet 20.

Figure 3:
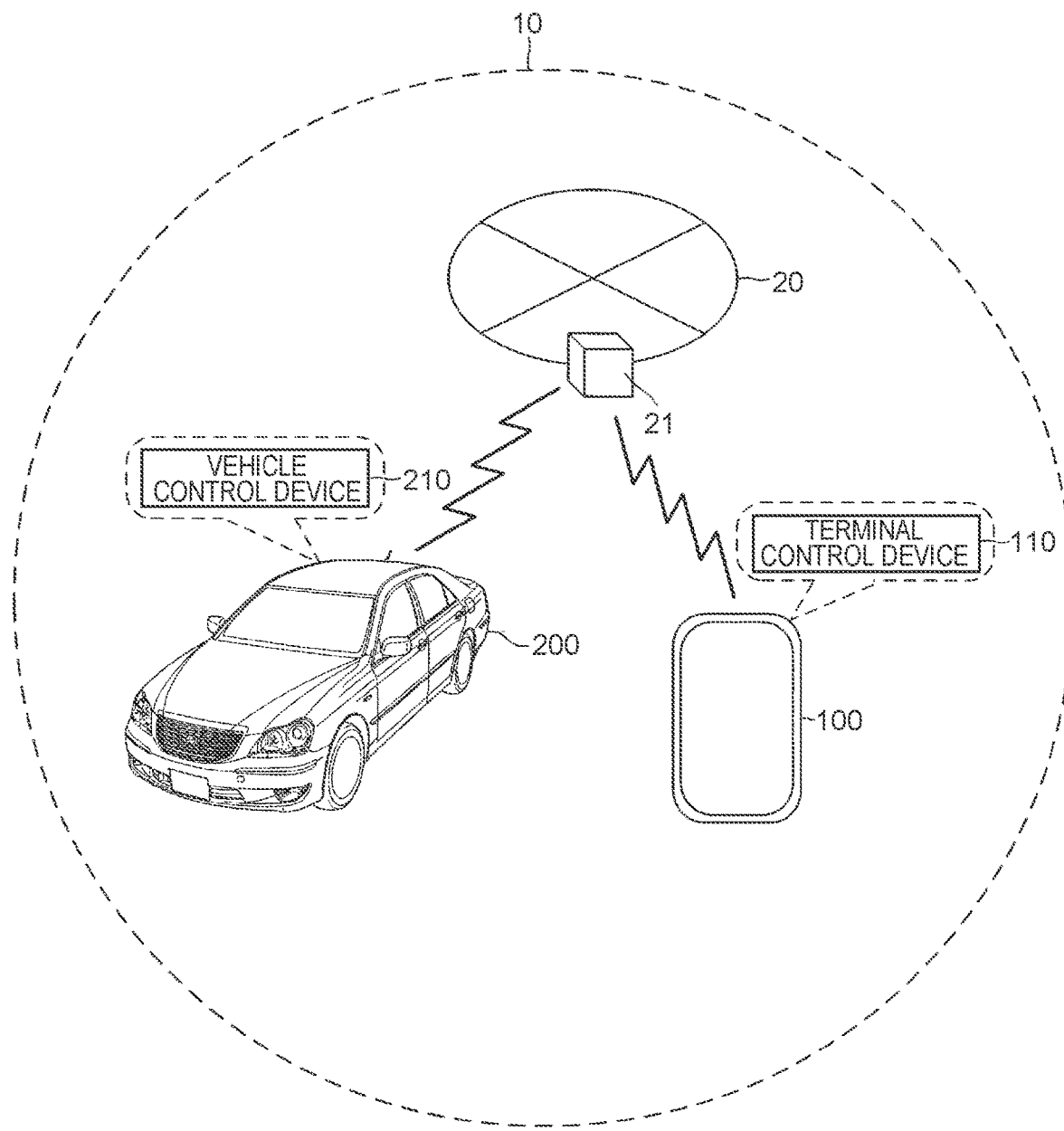
FIG. 3 is a view showing yet another remote travel system according to the embodiment of the disclosure.

As shown in FIG. 3, the remote travel system 10 may include at least the terminal control device 110, the vehicle control device 210, the Internet 20, and a server 21 provided on the Internet 20 and be configured such that various signals are transmitted and received between the terminal control device 110 and the vehicle control device 210 via the Internet 20 and the server 21.

Operation Terminal

In this example, the operation terminal 100 is a so-called smartphone that is a telephone a person can carry. However, the operation terminal 100 may be any terminal that is separated from the host vehicle 200 and that a user, such as a driver of the host vehicle 200, can bring to an outside of the host vehicle 200, and may be, for example, a so-called smart key that a person can carry or a terminal dedicated to remote move-in and -out.

Figure 4:
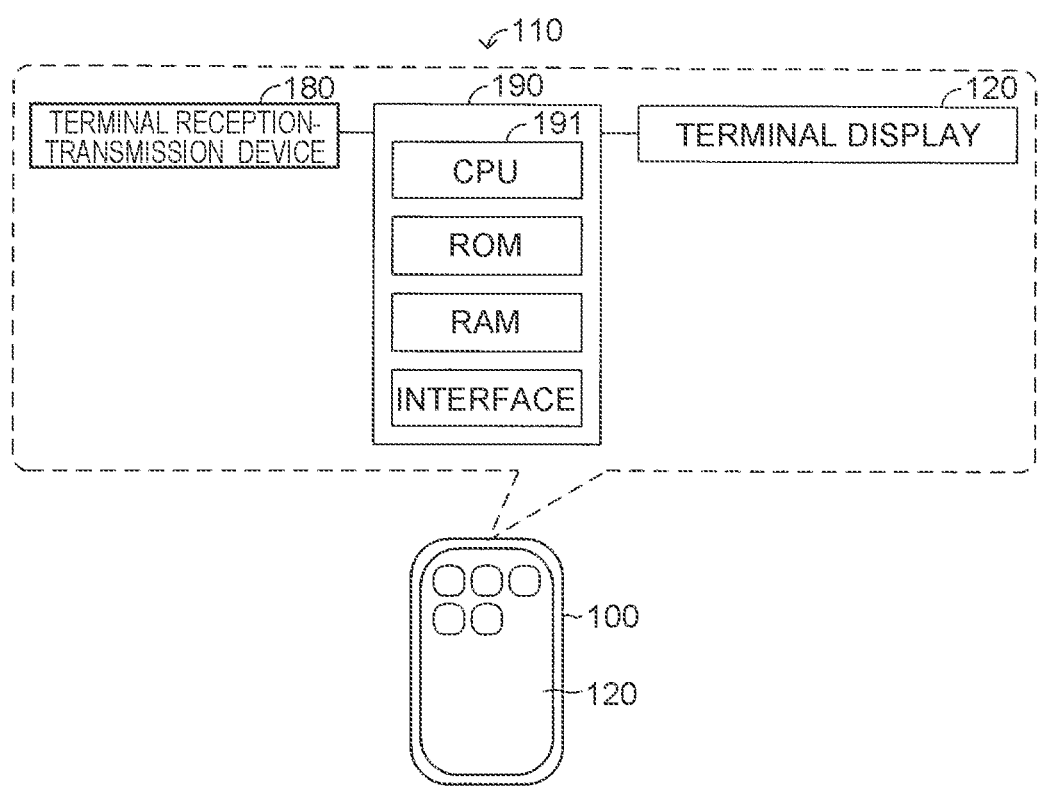
FIG. 4 is a diagram showing a terminal control device constituting a part of the remote travel system according to the embodiment of the disclosure, an operation terminal in which this terminal control device is installed, etc.

As shown in FIG. 4, the operation terminal 100 includes the terminal control device 110. The terminal control device 110 includes a terminal ECU 190.

ECU stands for Electronic Control Unit. The terminal ECU 190 includes a microcomputer as a main part. The terminal ECU 190 includes a CPU (terminal CPU 191), a ROM, a RAM, a non-volatile memory, an interface, etc. The terminal CPU 191 is configured to realize various functions by executing instructions (programs, routines) stored in the ROM. In particular, a remote travel application for making an ECU of the host vehicle 200 (vehicle ECU 290) execute remote move-in and -out control, to be described later, is installed in the terminal ECU 190.

When the remote travel system 10 is configured as shown in FIG. 3, the remote travel system 10 may be configured such that some of the functions covered by the remote travel application installed in the terminal ECU 190 are covered by programs stored in the server 21. Further, when the remote travel system 10 is configured as shown in FIG. 3, the remote travel system 10 may be configured such that the remote travel application installed in the terminal ECU 190 is updated by the server 21.

The operation terminal 100 includes a terminal display 120 and a terminal reception-transmission device 180.

The terminal display 120 is a device that displays images. The terminal display 120 is designed to undergo a change in a certain physical property when an object contacts the terminal display 120. In particular, in this example, the terminal display 120 is designed to undergo a change in the certain physical property when a finger of a person contacts the terminal display 120.

The terminal display 120 is electrically connected to the terminal ECU 190. The terminal ECU 190 can display various images on the terminal display 120. The terminal ECU 190 can detect a change that the terminal display 120 undergoes in the certain physical property when an object contacts the terminal display 120, and locate a portion of the terminal display 120 contacted by the object based on the detected change.

Since the terminal ECU 190 can locate a portion of the terminal display 120 contacted by an object based on a change in the certain physical property of the terminal display 120, the terminal display 120 is a device that provides information for locating a portion contacted by an object (contact information provision device). While the contact information provision device is the terminal display 120 in this example, it is not limited thereto. The contact information provision device may be any device that can provide information for locating a portion contacted by an object, and may be, for example, a device that does not have the function of displaying images but can provide information for locating a portion contacted by an object.

The terminal reception-transmission device 180 is a device that receives signals coming wirelessly from an outside of the operation terminal 100 as well as wirelessly transmits signals to the outside of the operation terminal 100. The terminal reception-transmission device 180 is electrically connected to the terminal ECU 190. Through the terminal reception-transmission device 180, the terminal ECU 190 can wirelessly transmit various signals to the outside of the operation terminal 100. Through the terminal reception-transmission device 180, the terminal ECU 190 can receive various signals that the ECU of the host vehicle 200 (vehicle ECU 290) has wirelessly transmitted to the outside of the host vehicle 200 through a vehicle reception-transmission device 280.

Thus, the terminal control device 110 is configured to be able to wirelessly communicate with the vehicle control device 210.

Host Vehicle

Figure 5:
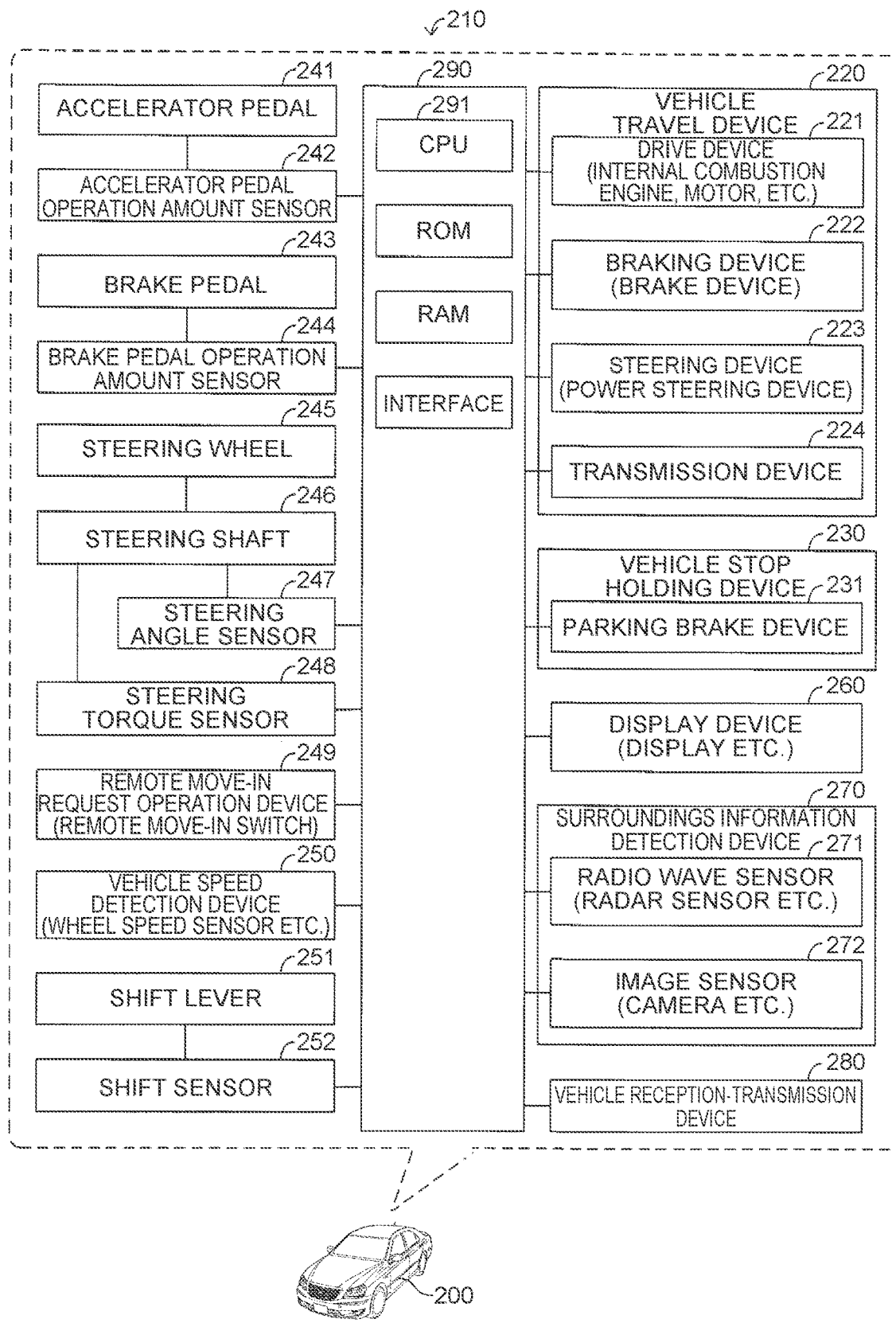
FIG. 5 is a diagram showing a vehicle control device constituting a part of the remote travel system according to the embodiment of the disclosure, a vehicle (host vehicle) in which this vehicle control device is installed, etc.

As shown in FIG. 5, the host vehicle 200 is equipped with the vehicle control device 210.

The vehicle control device 210 is a device that executes remote move-in control and remote move-out control as the remote move-in and -out control. The remote move-in control is control of parking the host vehicle 200 into a designated parking stall by making the host vehicle 200 travel automatically and stop automatically at a point inside the designated parking stall in response to signals wirelessly transmitted from the operation terminal to the outside. The remote move-out control is control of moving the host vehicle 200 out of a designated parking stall by making the host vehicle 200 travel automatically and stop automatically at a point outside the designated parking stall in response to signals wirelessly transmitted from the operation terminal to the outside.

As shown in FIG. 5, the vehicle control device 210 includes the vehicle ECU 290. The vehicle ECU 290 includes a microcomputer as a main part. The vehicle ECU 290 includes a CPU (vehicle CPU 291), a ROM, a RAM, a non-volatile memory, an interface, etc. The vehicle CPU 291 is configured to realize various functions by executing instructions (programs, routines) stored in the ROM. In particular, programs for executing the remote move-in and -out control are stored in the vehicle ECU 290.

When the remote travel system 10 is configured as shown in FIG. 3, the remote travel system 10 may be configured such that some of the processes that are covered by the program for executing the remote move-in and -out control stored in the vehicle ECU 290 are covered by programs stored in the server 21. Further, when the remote travel system 10 is configured as shown in FIG. 3, the remote travel system 10 may be configured such that the program for executing the remote move-in and -out control stored in the vehicle ECU 290 is updated by the server 21.

Vehicle Travel Device

The host vehicle 200 is further equipped with a vehicle travel device 220. The vehicle travel device 220 is a device that performs driving, braking, steering, and shift change of the host vehicle 200, and includes a drive device 221, a braking device 222, a steering device 223, and a transmission device 224 in this example.

Drive Device

The drive device 221 is a device that outputs a drive force to be applied to the host vehicle 200 to make the host vehicle 200 travel, and is, for example, an internal combustion engine and/or a motor. The drive device 221 is electrically connected to the vehicle ECU 290. The vehicle ECU 290 can control the drive force output from the drive device 221 by controlling the operation of the drive device 221.

Braking Device

The braking device 222 is a device that outputs a braking force to be applied to the host vehicle 200 to brake the host vehicle 200, and is, for example, a hydraulic brake device. The braking device 222 is electrically connected to the vehicle ECU 290. The vehicle ECU 290 can control the braking force output from the braking device 222 by controlling the operation of the braking device 222.

Steering Device

The steering device 223 is a device that outputs a steering force to be applied to the host vehicle 200 to steer the host vehicle 200, and is, for example, a power steering device. The steering device 223 is electrically connected to the vehicle ECU 290. The vehicle ECU 290 can control the steering force output from the steering device 223 by controlling the operation of the steering device 223.

Transmission Device

The transmission device 224 is a device that switches between transmitting and not transmitting the drive force output from the drive device 221 to drive wheels of the host vehicle 200, and switches between transmitting the drive force to the drive wheels so as to move the host vehicle 200 forward and transmitting the drive force to the drive wheels so as to move the host vehicle 200 rearward. Further, the transmission device 224 is a device that holds the host vehicle 200 in a stopped state by engaging a claw-shaped part (parking lock pawl) with a gear of the transmission device 224 and thereby locking the gear so as not to rotate. Thus, the transmission device 224 functions also as a vehicle stop holding device that holds the host vehicle 200 in a stopped state.

The transmission device 224 operates in one state (shift state) among a state in which the drive force is transmitted to the drive wheels so as to move the host vehicle 200 forward (forward drive state), a state in which the drive force is transmitted to the drive wheels so as to move the host vehicle 200 rearward (rearward drive state), a state in which the drive force is not transmitted to the drive wheels of the host vehicle 200 (neutral state), and a state in which the host vehicle 200 is held in a stopped state (parking state).

The transmission device 224 is electrically connected to the vehicle ECU 290. The vehicle ECU 290 can set the shift state of the transmission device 224 to one state among the forward drive state, the rearward drive state, the neutral state, and the parking state by controlling the operation of the transmission device 224.

Vehicle Stop Holding Device

The host vehicle 200 is further equipped with a vehicle stop holding device 230. The vehicle stop holding device 230 is a device that holds the host vehicle 200 in a stopped state, and is a parking brake device 231 in this example. The parking brake device 231 may be an electrical parking brake device or may be a manual parking brake device. The parking brake device 231 is a device that holds the stopped host vehicle 200 in the stopped state by applying a braking force to the wheels of the host vehicle 200. In particular, the parking brake device 231 is a device that holds the stopped host vehicle 200 in the stopped state by pressing brake pads against brake disks provided on the wheels of the host vehicle 200 and thereby applying a braking force to the wheels. In this example, the parking brake device 231 is an electrical parking brake device and is therefore electrically connected to the vehicle ECU 290. The vehicle ECU 290 can hold the host vehicle 200 in a stopped state by operating the parking brake device 231.

Sensors and Others

The host vehicle 200 is further equipped with an accelerator pedal 241, an accelerator pedal operation amount sensor 242, a brake pedal 243, a brake pedal operation amount sensor 244, a steering wheel 245, a steering shaft 246, a steering angle sensor 247, a steering torque sensor 248, a remote move-in request operation device 249, a vehicle speed detection device 250, a shift lever 251, a shift sensor 252, a display device 260, a surroundings information detection device 270, and the vehicle reception-transmission device 280.

Accelerator Pedal Operation Amount Sensor

The accelerator pedal operation amount sensor 242 is a sensor that detects an operation amount of the accelerator pedal 241. The accelerator pedal operation amount sensor 242 is electrically connected to the vehicle ECU 290. The accelerator pedal operation amount sensor 242 transmits information on the detected operation amount of the accelerator pedal 241 to the vehicle ECU 290. Based on this information, the vehicle ECU 290 acquires the operation amount of the accelerator pedal 241 as an accelerator pedal operation amount AP.

Except when executing the remote move-in and -out control to be described later, the vehicle ECU 290 acquires a required drive force (required drive torque) based on the accelerator pedal operation amount AP and a travel speed of the host vehicle 200 (host vehicle speed). The vehicle ECU 290 controls the operation of the drive device 221 such that the required drive force is output. When executing the remote move-in and -out control to be described later, the vehicle ECU 290 determines a drive force required to make the host vehicle 200 travel as desired by the remote move-in or -out control and controls the operation of the drive device 221 such that that drive force is output.

Brake Pedal Operation Amount Sensor

The brake pedal operation amount sensor 244 is a sensor that detects an operation amount of the brake pedal 243. The brake pedal operation amount sensor 244 is electrically connected to the vehicle ECU 290. The brake pedal operation amount sensor 244 transmits information on the detected operation amount of the brake pedal 243 to the vehicle ECU 290. Based on this information, the vehicle ECU 290 acquires the operation amount of the brake pedal 243 as a brake pedal operation amount BP.

Except when executing the remote move-in and -out control to be described later, the vehicle ECU 290 acquires a required braking force (required braking torque) based on the brake pedal operation amount BP. The vehicle ECU 290 controls the operation of the braking device 222 such that the required braking force is output. When executing the remote move-in and -out control to be described later, the vehicle ECU 290 determines a braking force required to brake the host vehicle 200 as desired by the remote move-in or -out control and controls the operation of the braking device 222 such that that braking force is output.

Steering Angle Sensor

The steering angle sensor 247 is a sensor that detects a rotation angle of the steering shaft 246 relative to a neutral position and is electrically connected to the vehicle ECU 290. The steering angle sensor 247 transmits information on the detected rotation angle of the steering shaft 246 to the vehicle ECU 290. Based on this information, the vehicle ECU 290 acquires the rotation angle of the steering shaft 246 as a steering angle θ.

Steering Torque Sensor

The steering torque sensor 248 is a sensor that detects a torque that the driver of the host vehicle 200 has input into the steering shaft 246 through the steering wheel 245, and is electrically connected to the vehicle ECU 290. The steering torque sensor 248 transmits information on the detected torque to the vehicle ECU 290. Based on this information, the vehicle ECU 290 acquires a torque that the driver has input into the steering shaft 246 through the steering wheel 245 (driver-input torque).

Except when executing the remote move-in and -out control to be described later, the vehicle ECU 290 acquires a required steering force (required steering torque) based on the steering angle θ, the driver-input torque, and the travel speed of the host vehicle 200 (host vehicle speed), and controls the operation of the steering device 223 such that that required steering torque is output from the steering device 223. When executing the remote move-in and -out control to be described later, the vehicle ECU 290 determines a steering force required to make the host vehicle 200 travel as desired by the remote move-in or -out control and controls the operation of the steering device 223 such that that steering force is output.

Remote Move-In Request Operation Device

The remote move-in request operation device 249 is a device that is operated by the driver to request the vehicle ECU 290 to execute the remote move-in and -out control to be described later, and is a switch, for example. The remote move-in request operation device 249 is electrically connected to the vehicle ECU 290. When operated by the driver, the remote move-in request operation device 249 transmits a predetermined signal to the vehicle ECU 290. Upon receiving this predetermined signal, the vehicle ECU 290 determines that execution of the remote move-in or -out control is requested.

The vehicle ECU 290 may be configured to make the display device 260, to be described later, display a remote move-in and -out request image and, when touch operation is performed by the driver on a portion of the display device 260 displaying the remote move-in and -out request image, determine that execution of the remote move-in and -out control is requested. In this case, it is not necessary to provide the remote move-in request operation device 249 in the host vehicle 200.

Vehicle Speed Detection Device

The vehicle speed detection device 250 is a device that detects the travel speed of the host vehicle 200, and is, for example, a wheel speed sensor. The vehicle speed detection device 250 is electrically connected to the vehicle ECU 290. The vehicle speed detection device 250 transmits information on the detected travel speed of the host vehicle 200 to the vehicle ECU 290. Based on this information, the vehicle ECU 290 acquires the travel speed of the host vehicle 200 (host vehicle speed V).

Shift Sensor

The shift sensor 252 is a sensor that detects a set position of the shift lever 251. The shift lever 251 is a device operated by the driver of the host vehicle 200, and the set positions of the shift lever 251 that the drier can set include a forward travel position (drive range D), a rearward travel position (rear range R), a neutral position (neutral range N), and a parking position (parking range P). The shift sensor 252 is electrically connected to the vehicle ECU 290. The shift sensor 252 transmits a signal showing the detected set position of the shift lever 251 to the vehicle ECU 290.

When the shift lever 251 is set to the drive range D, the shift sensor 252 transmits a signal showing that the set position of the shift lever 251 is the drive range D to the vehicle ECU 290. Upon receiving this signal, the vehicle ECU 290 controls the shift state of the transmission device 224 such that the transmission device 224 assumes the forward drive state.

When the shift lever 251 is set to the rear range R, the shift sensor 252 transmits a signal showing that the set position of the shift lever 251 is the rear range R to the vehicle ECU 290. Upon receiving this signal, the vehicle ECU 290 controls the shift state of the transmission device 224 such that the transmission device 224 assumes the rearward drive state.

When the shift lever 251 is set to the neutral range N, the shift sensor 252 transmits a signal showing that the set position of the shift lever 251 is the neutral range N to the vehicle ECU 290. Upon receiving this signal, the vehicle ECU 290 controls the shift state of the transmission device 224 such that the transmission device 224 assumes the neutral state.

When the shift lever 251 is set to the parking range P, the shift sensor 252 transmits a signal showing that the set position of the shift lever 251 is the parking range P to the vehicle ECU 290. Upon receiving this signal, the vehicle ECU 290 controls the shift state of the transmission device 224 such that the transmission device 224 assumes the parking state.

When executing the remote move-in and -out control to be described later, the vehicle ECU 290 controls the shift state of the transmission device 224 (performs a shift change) as needed to make the host vehicle 200 travel as desired by the remote move-in or -out control.

Display Device

The display device 260 is a device that displays various images so as to be viewable to the driver, and is, for example, a display of a navigation device. The display device 260 is electrically connected to the vehicle ECU 290. The vehicle ECU 290 can display various images on the display device 260.

Surroundings Information Detection Device

The surroundings information detection device 270 is a device that detects information on the surroundings of the host vehicle 200, and includes a radio wave sensor 271 and an image sensor 272 in this example.

Radio Wave Sensor

The radio wave sensor 271 is a sensor that detects information about objects present around the host vehicle 200 using radio waves, and is, for example, at least one of a radar sensor (millimeter-wave radar etc.), an acoustic wave sensor such as an ultrasonic sensor (clearance sonar), and a light sensor such as a laser radar (LiDAR). The radio wave sensor 271 is electrically connected to the vehicle ECU 290. The radio wave sensor 271 emits radio waves and receives radio waves reflected by an object (reflected waves). The radio wave sensor 271 transmits information about emitted radio waves and received radio waves (reflected waves) to the vehicle ECU 290. In other words, the radio wave sensor 271 detects an object present around the host vehicle 200 and transmits information about the detected object to the vehicle ECU 290. Based on this information (radio wave information IR or radio wave data), the vehicle ECU 290 can acquire information about objects present around the host vehicle 200 (surroundings detection information IS). Examples of objects detected using the radio wave sensor 271 include vehicles, walls, bicycles, and persons.

Image Sensor

The image sensor 272 is a sensor that images the surroundings of the host vehicle 200, and is, for example, a camera. The image sensor 272 is electrically connected to the vehicle ECU 290. The image sensor 272 images the surroundings of the host vehicle 200 and transmits information about the captured image to the vehicle ECU 290.

Vehicle Reception-Transmission Device

The vehicle reception-transmission device 280 is a device that receives signals coming wirelessly from the outside of the host vehicle 200 as well as wirelessly transmits signals to the outside of the host vehicle 200. The vehicle reception-transmission device 280 is electrically connected to the vehicle ECU 290. Through the vehicle reception-transmission device 280, the vehicle ECU 290 can wirelessly transmit various signals to the outside of the host vehicle 200. Through the vehicle reception-transmission device 280, the vehicle ECU 290 can receive various signals that the terminal ECU 190, to be described later, has wirelessly transmitted to the outside of the operation terminal 100 through the terminal reception-transmission device 180.

Overview of Operation of Remote Travel System

Next, an overview of the operation of the remote travel system 10 will be described. The remote travel system 10 is configured such that a user of the operation terminal 100 (terminal user) can execute the remote travel control of remotely making the host vehicle 200 travel by performing touch operation on the operation terminal 100 outside the host vehicle 200.

In this example, the remote travel control is control of remotely making the host vehicle 200 travel to a predetermined place as the terminal user performs touch operation on the operation terminal 100 outside the host vehicle 200. In the following, the operation of the remote travel system 10 will be described using a case as an example where the remote travel control is remote move-in and -out control including remote move-in control and remote move-out control.

The remote move-in control is control of remotely moving (parking) the host vehicle 200 into a parking space as the terminal user performs touch operation on the operation terminal 100 outside the host vehicle 200. On the other hand, the remote move-out control is control of remotely moving the host vehicle 200 out of a parking space as the terminal user performs touch operation on the operation terminal 100 outside the host vehicle 200.

Operation of Vehicle Control Device

When the driver operates the remote move-in request operation device 249 and execution of the remote move-in or -out control is requested while the host vehicle 200 is stopped, the vehicle control device 210 starts the remote move-in control.

When starting the remote move-in control, the vehicle control device 210 performs a process of detecting a parking stall based on the surroundings detection information IS, determining whether the detected parking stall is a stall that meets parkability conditions, and setting a parking stall that meets the parkability conditions as a parkable stall (parkable stall setting process).

In this example, the parkability conditions are the following conditions: that the parking stall has no other vehicle parked therein; that the parking stall has enough space for parking the host vehicle 200; that a route for making the host vehicle 200 travel to move into the parking stall (target move-in route Rin_tgt) can be set; and that there is no obstacle on the target move-in route Rin_tgt. Therefore, a parking stall in which another vehicle is parked, a parking stall that does not have enough space for parking the host vehicle 200, a parking stall to which the target move-in route Rin_tgt cannot be set, and a parking stall to which there is an obstacle on the target move-in route Rin_tgt cannot be set as a parkable stall.

The vehicle control device 210 is configured such that, even when a parking stall is a stall to which there is an obstacle on the target move-in route Rin_tgt, that parking stall is set as a parkable stall if that parking stall meets a certain condition. This will be described later.

Figure 6:
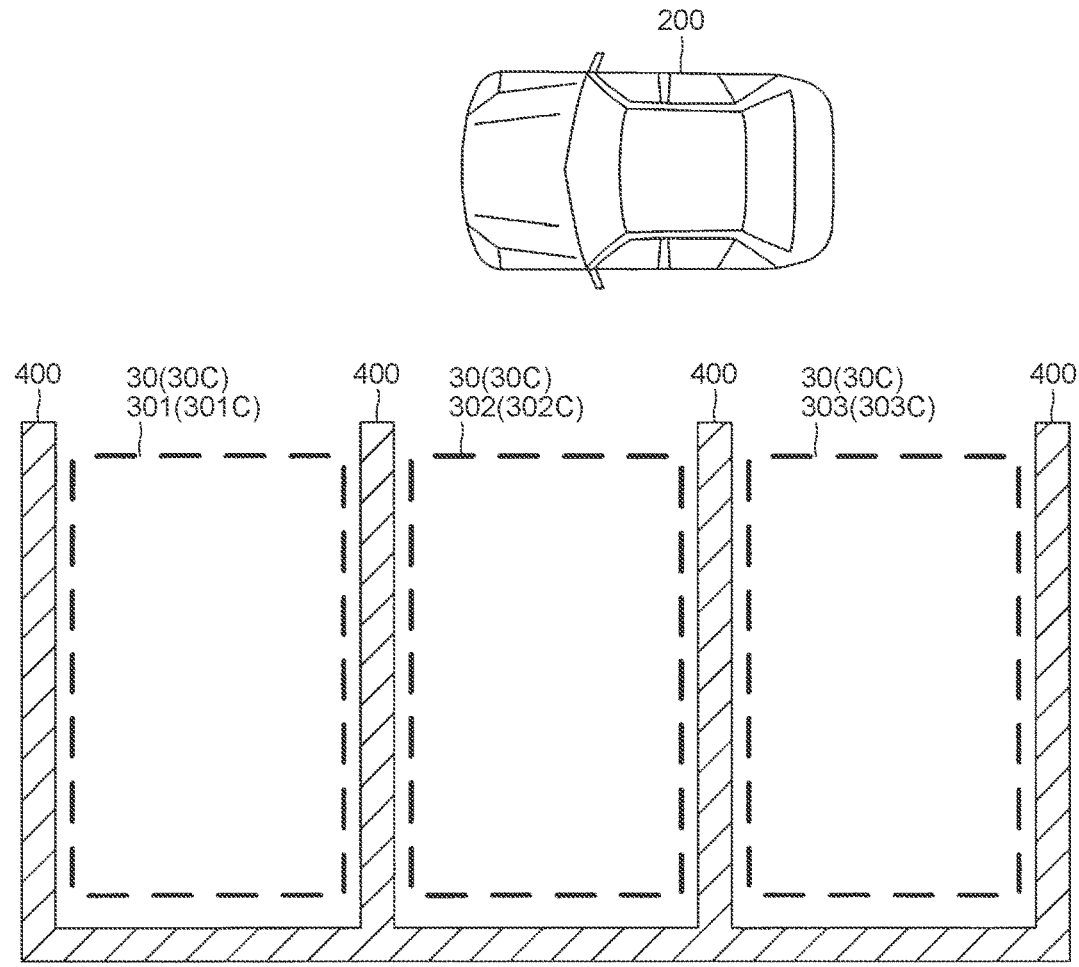
FIG. 6 is a view showing a situation where the host vehicle is stopped near parking stalls.

For example, as shown in FIG. 6, in the case where there are three stalls (parking stalls 301 to 303), these parking stalls 301 to 303 meet the parkability conditions when each of the parking stalls 301 to 303 has no other vehicle parked therein, each of the parking stalls 301 to 303 has enough space for parking the host vehicle 200, the target move-in route Rin_tgt can be set for each of the parking stalls 301 to 303, and there is no obstacle etc. on the target move-in route Rin_tgt. Reference sign 400 in FIG. 6 denotes demarcation lines that demarcate parking stalls 30.

Therefore, when the host vehicle 200 is stopped near the parking stalls 301 to 303 shown in FIG. 6, the vehicle control device 210 detects the demarcation lines 400 based on the surroundings detection information IS, locates the three parking stalls 301 to 303 demarcated by these demarcation lines 400, determines that the parking stalls 301 to 303 are parking stalls that meet the parkability conditions, and sets the parking stalls 301 to 303 as parkable stalls 301C to 303C.

Some parking spaces at homes are not provided with demarcation lines for demarcating a parking stall. The vehicle control device 210 is configured to detect a fence, a building wall, etc., if present, around such a parking space based on the surroundings detection information IS, locate the parking stall based on the fence, the building wall, etc., and set that parking stall as a parkable stall when that parking stall meets the parkability conditions.

Further, some parking spaces are not provided with demarcation lines for demarcating a parking stall and have no fence, building wall, etc. around the parking space. The vehicle control device 210 is configured such that, when the host vehicle 200 has been moved into the parking space in the past and the stall into which the host vehicle 200 has been moved at that time is registered in the vehicle control device 210 as a registered parking stall, the registered parking stall can be set as a parking stall into which the host vehicle 200 is to be moved when the host vehicle 200 is stopped near the parking space and execution of the remote move-in or -out control is requested. This will be described later.

In the following, the remote travel system 10 will be described, with a case where the host vehicle 200 is perpendicularly parked serving as an example. However, the remote travel system 10 is configured to also allow the host vehicle 200 to be parallel-parked.

Figure 7:
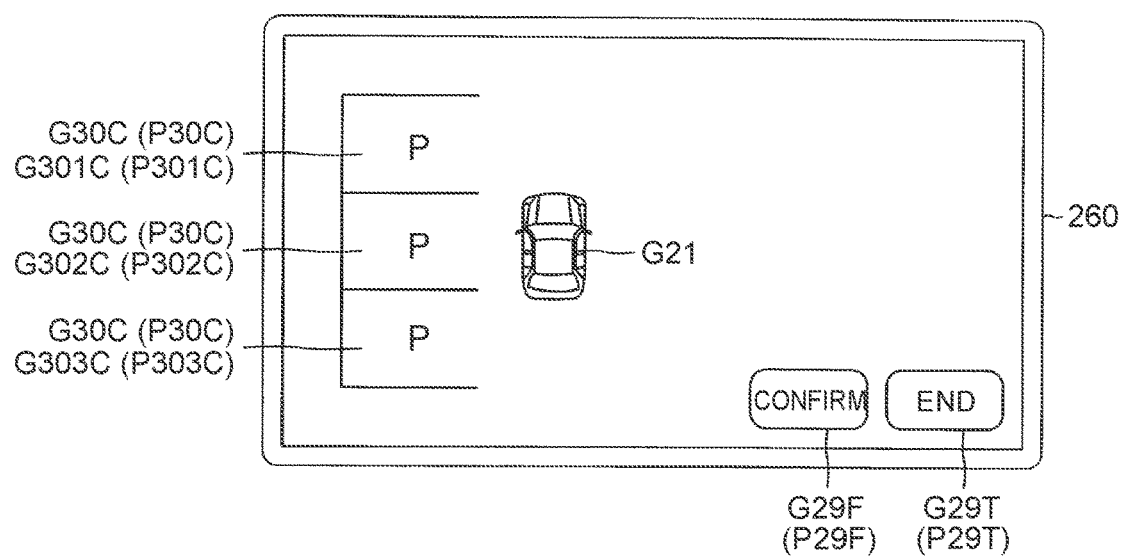
FIG. 7 is a view showing a display device displaying a screen for designating a parking stall into which the host vehicle is to be moved.

After setting parkable stalls 30C, the vehicle control device 210 displays the screen shown in FIG. 7 to let the driver select a parkable stall 30C into which the host vehicle 200 is to be moved among the set parkable stalls 30C. Specifically, the vehicle control device 210 displays a vehicle image G21, parkable stall images G30C, a selection confirmation image G29F, and an end image G29T on the display device 260.

The vehicle image G21 is an image displaying the host vehicle 200. Each parkable stall image G30C is an image displaying a parkable stall, and a portion of the display device 260 displaying this image (parkable stall image portion P30C) is a portion that receives touch operation. In this example, touch operation of the display device 260 is operation of touching the display device 260 with a finger (contact operation). The vehicle control device 210 acquires an actual positional relationship between the parkable stall 30C and the host vehicle 200 based on the surroundings detection information IS, and displays the vehicle image G21 and the parkable stall image G30C on the display device 260 such that the positional relationship between the vehicle image G21 and the parkable stall image G30C corresponds to the actual positional relationship between the host vehicle 200 and the parkable stall 30C. Since the screen shown in FIG. 7 is a screen that is displayed on the display device 260 when the host vehicle 200 is stopped near the parking stall 30 as shown in FIG. 6, parkable stall images G301C to G303C displaying the three parkable stalls 301C to 303C, respectively, are displayed on the display device 260 in FIG. 7.

The selection confirmation image G29F is an image displaying characters "confirm," and a portion of the display device 260 displaying this image (selection confirmation image portion P29F) is a portion that receives touch operation. The end image G29T is an image displaying characters "end," and a portion of the display device 260 displaying this image (end image portion P29T) is a portion that receives touch operation.

When touch operation is performed on the parkable stall image portion P30C and subsequently touch operation is performed on the selection confirmation image portion P29F, the vehicle control device 210 sets the parkable stall 30C corresponding to the parkable stall image portion P30C on which the touch operation has been performed as a designated parking stall 30tgt. Therefore, the designated parking stall 30tgt is a stall that is to be reached by the host vehicle 200 under the remote travel control. The remote travel system 10 is configured such that the designated parking stall 30tgt can be set by operation of a device installed in the host vehicle 200 (display device 260), but may also be configured such that the designated parking stall 30tgt can be set by operation of the operation terminal 100.

Further, when touch operation is performed on the parkable stall image portion P30C and subsequently touch operation is performed on the selection confirmation image portion P29F, the vehicle control device 210 displays the screen shown in FIG. 8A on the display device 260 to let the driver select whether to move the host vehicle 200 into the designated parking stall 30tgt by moving it forward or rearward. Specifically, the vehicle control device 210 displays a forward move-in selection image G23in_fwd, a rearward move-in selection image G23in_rwd, a previous screen image G29R, and the end image G29T on the display device 260.

The forward move-in selection image G23in_fwd is an image displaying characters "forward move-in," and a portion of the display device 260 displaying this image (forward move-in selection image portion P23in_fwd) is a portion that receives touch operation. The rearward move-in selection image G23in_rwd is an image displaying characters "rearward move-in," and a portion of the display device 260 displaying this image (rearward move-in selection image portion P23in_rwd) is a portion that receives touch operation. The previous screen image G29R is an image displaying characters "return," and a portion of the display device 260 displaying this image (previous screen image portion P29R) is a portion that receives touch operation. When touch operation is performed on the previous screen image portion P29R, the vehicle control device 210 returns the screen to be displayed on the display device 260 to the immediately preceding image display. For example, when touch operation is performed on the previous screen image portion P29R while the screen shown in FIG. 8A is displayed on the display device 260, the vehicle control device 210 returns the screen to be displayed on the display device 260 to the screen shown in FIG. 7.

Figure 8A:
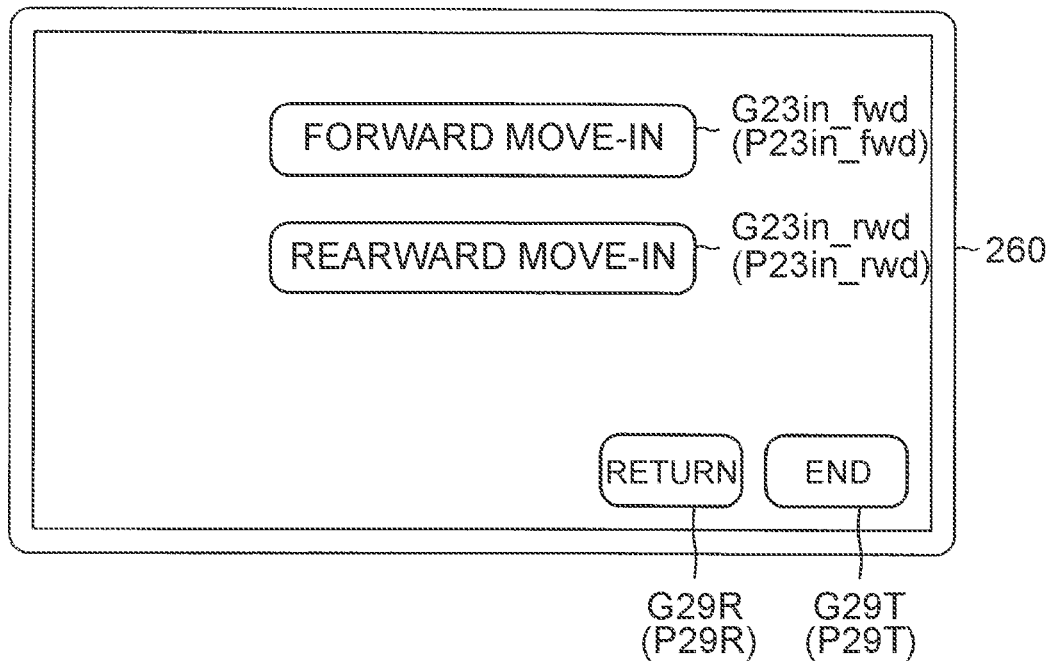
FIG. 8A is a view showing the display device displaying a screen for selecting whether to move the host vehicle in by moving it forward or rearward.
Figure 8B:
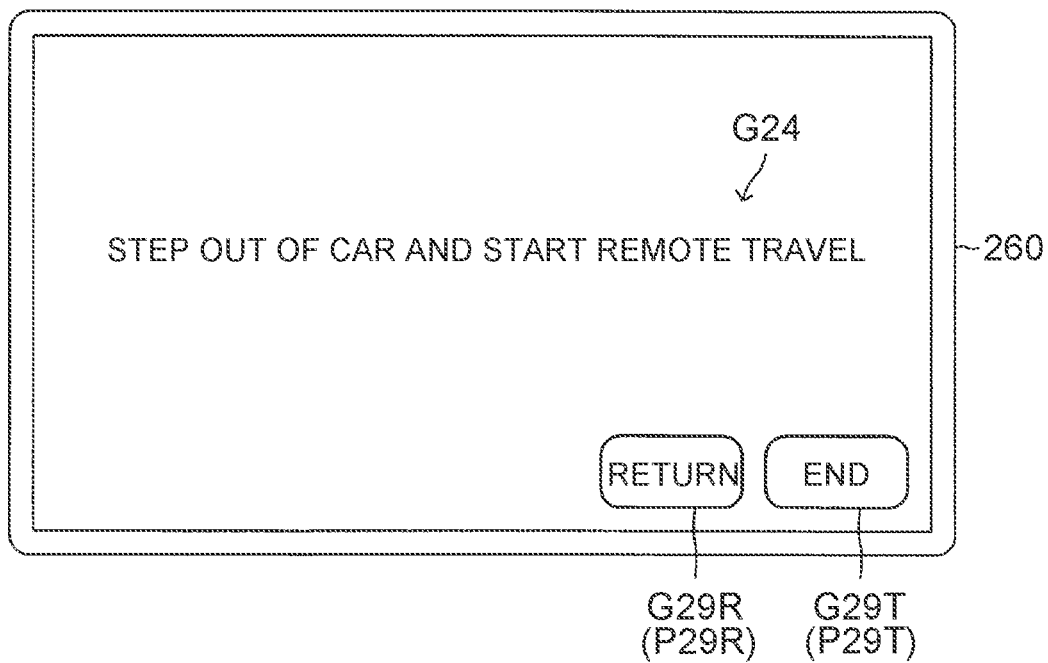
FIG. 8B is a view showing the display device displaying a screen for prompting the user to step out of the host vehicle and make the host vehicle travel by remote travel control.

When touch operation is performed on one of the forward move-in selection image portion P23in_fwd and the rearward move-in selection image portion P23in_rwd, the vehicle control device 210 displays the screen shown in FIG. 8B on the display device 260 to prompt the driver to step out of the host vehicle 200 and move the host vehicle 200 in by operating the operation terminal 100. Specifically, the vehicle control device 210 displays a remote operation notification image G24, the previous screen image G29R, and the end image G29T on the display device 260. The remote operation notification image G24 is an image that prompts the driver to step out of the host vehicle 200 and move the host vehicle 200 in by operating the operation terminal 100.

Operation of Terminal Control Device

Figure 9:
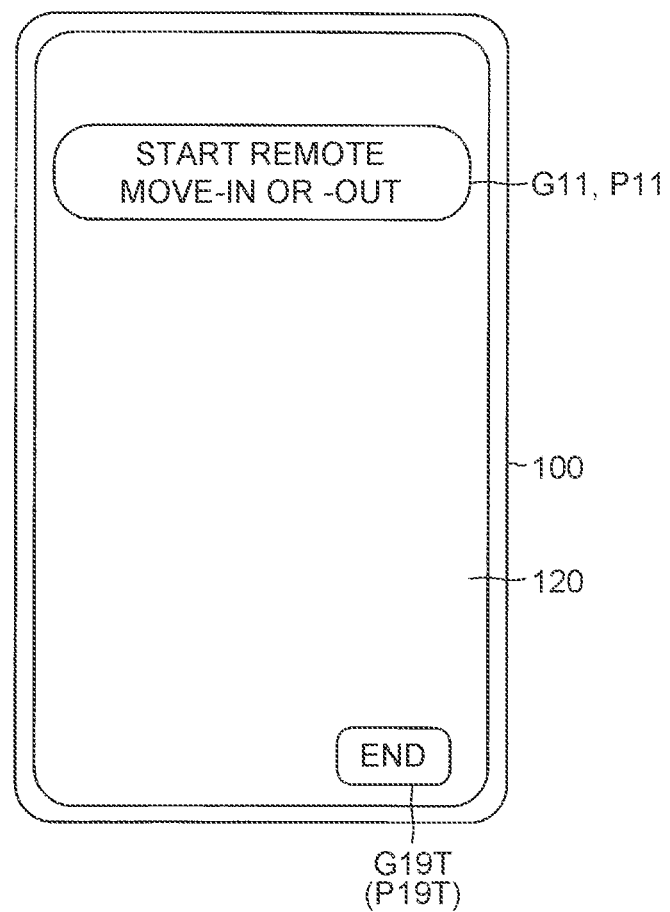
FIG. 9 is a view showing the operation terminal displaying a remote move-in or -out selection image etc. on a terminal display.

When the driver steps out of the host vehicle 200 and performs predetermined operation (application start operation) on the terminal display 120 of the operation terminal 100, the terminal control device 110 starts the remote travel application in response to the application start operation and displays the screen shown in FIG. 9 on the terminal display 120. Specifically, the terminal control device 110 displays a remote move-in or -out start image G11 and the end image G19T on the terminal display 120.

The application start operation is touch operation that is performed on the terminal display 120 to start the remote travel application. In this example, touch operation performed on the terminal display 120 is operation of a person touching the terminal display 120 with a finger (contact operation).

The remote move-in or -out start image G11 is an image displaying characters "start remote move-in or -out," and a portion of the terminal display 120 displaying this image (start remote move-in or -out image portion P11) is a portion that receives touch operation. The end image G19T is an image displaying characters "end," and a portion of the terminal display 120 displaying this image (end image portion P19T) is a portion that receives touch operation.

Figure 10:
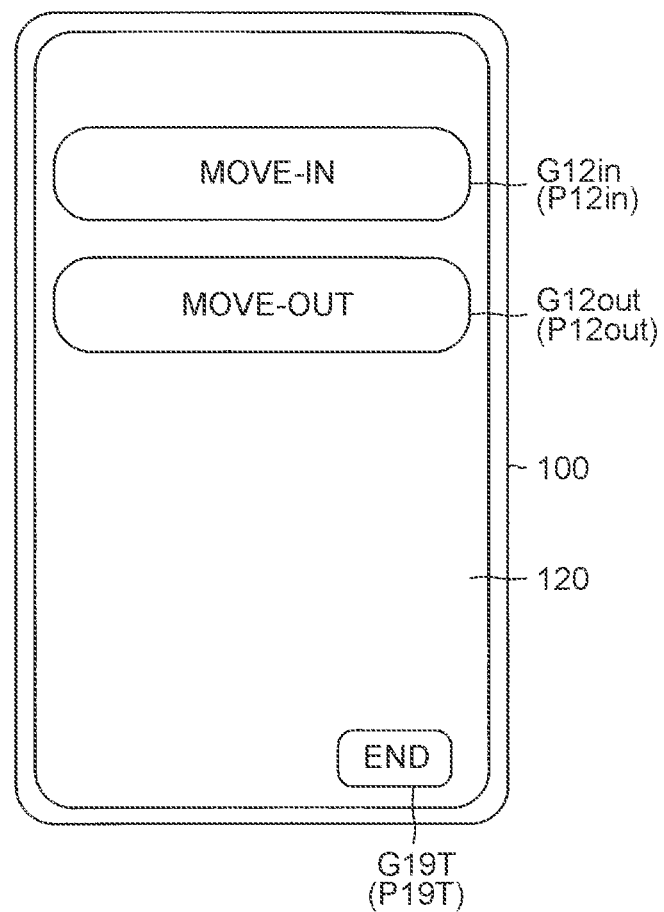
FIG. 10 is a view showing the operation terminal displaying a move-in selection image, a move-out selection image, etc. on the terminal display.

When touch operation is performed on the start remote move-in or -out image portion P11, the terminal control device 110 displays the screen shown in FIG. 10 on the terminal display 120 to let the terminal user select whether to move the host vehicle 200 in or out. Specifically, the terminal control device 110 displays a move-in selection image G12in, a move-out selection image G12out, and the end image G19T on the terminal display 120.

The move-in selection image G12in is an image displaying characters "move-in," and a portion of the terminal display 120 displaying this image (move-in selection image portion P12in) is a portion that receives touch operation. The move-out selection image G12out is an image displaying characters "move-out," and a portion of the terminal display 120 displaying this image (move-out selection image portion P12out) is a portion that receives touch operation.

When touch operation is performed on the move-in selection image portion P12in, the terminal control device 110 wirelessly transmits an application start signal and a move-in selection signal to the outside. On the other hand, when touch operation is performed on the move-out selection image portion P12out, the terminal control device 110 wirelessly transmits an application start signal and a move-out selection signal to the outside.

The application start signal is a signal showing information, such as an ID, that is used to determine whether the operation terminal 100 is a registered operation terminal (to identify the operation terminal 100). The move-in selection signal is a signal showing that move-in of the host vehicle 200 has been selected by the terminal user. The move-out selection signal is a signal showing that move-out of the host vehicle 200 has been selected by the terminal user.

Operation of Vehicle Control Device

When the vehicle control device 210 receives the application start signal and the move-in selection signal, the vehicle control device 210 determines whether the operation terminal 100 is a registered operation terminal based on the information shown by the application start signal. The registered operation terminal is an operation terminal that is registered in the vehicle control device 210 as an operation terminal for making the vehicle control device 210 perform the remote travel control. In this example, the operation terminal 100 is a registered operation terminal, and therefore the vehicle control device 210 determines that the operation terminal 100 is a registered operation terminal.

Figure 11:
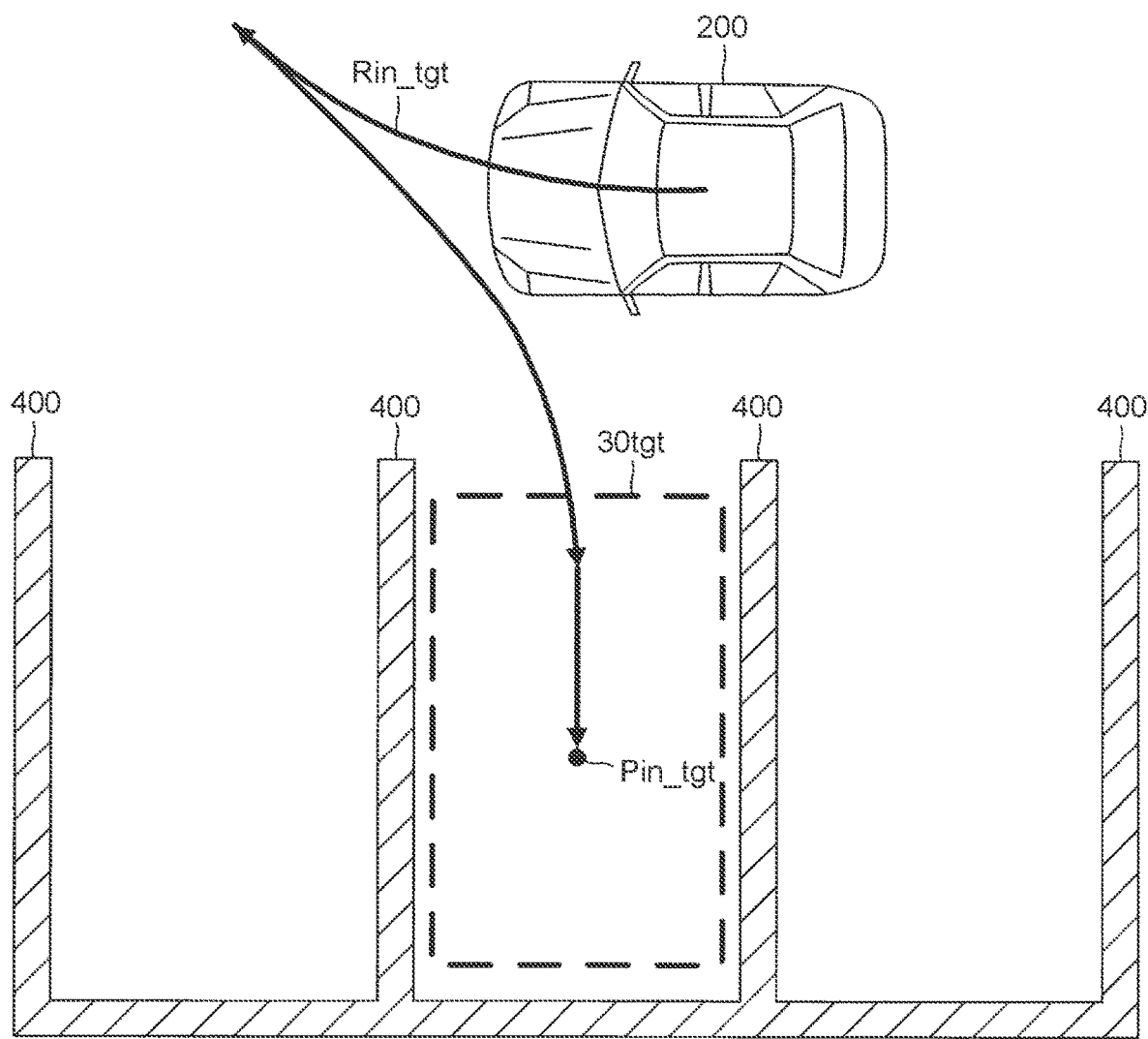
FIG. 11 is a view showing a target move-in route.

When the vehicle control device 210 receives the application start signal and the move-in selection signal and determines that the operation terminal 100 is a registered operation terminal, the vehicle control device 210 starts the remote move-in control. When the vehicle control device 210 starts the remote move-in control, as shown in FIG. 11, the vehicle control device 210 sets the target move-in route Rin_tgt based on the surroundings detection information IS. The target move-in route Rin_tgt is a route along which the host vehicle 200 is made to travel to move the host vehicle 200 into the designated parking stall 30tgt.

Further, when the vehicle control device 210 receives the application start signal and the move-in selection signal and determines that the operation terminal 100 is a registered operation terminal, the vehicle control device 210 acquires the distance between the host vehicle 200 and a point inside the designated parking stall 30tgt (target parking point Pin_tgt) to be reached by the host vehicle 200 under the remote move-in control (remaining move-in distance Din) based on the surroundings detection information IS.

When the vehicle control device 210 sets the target move-in route Rin_tgt and acquires the remaining move-in distance Din, the vehicle control device 210 wirelessly transmits a vehicle position signal and a remaining move-in distance signal to the outside. The vehicle position signal is a signal showing a positional relationship between the designated parking stall 30tgt and the host vehicle 200. The remaining move-in distance signal is a signal showing the remaining move-in distance Din.

Operation of Terminal Control Device

Figure 12:
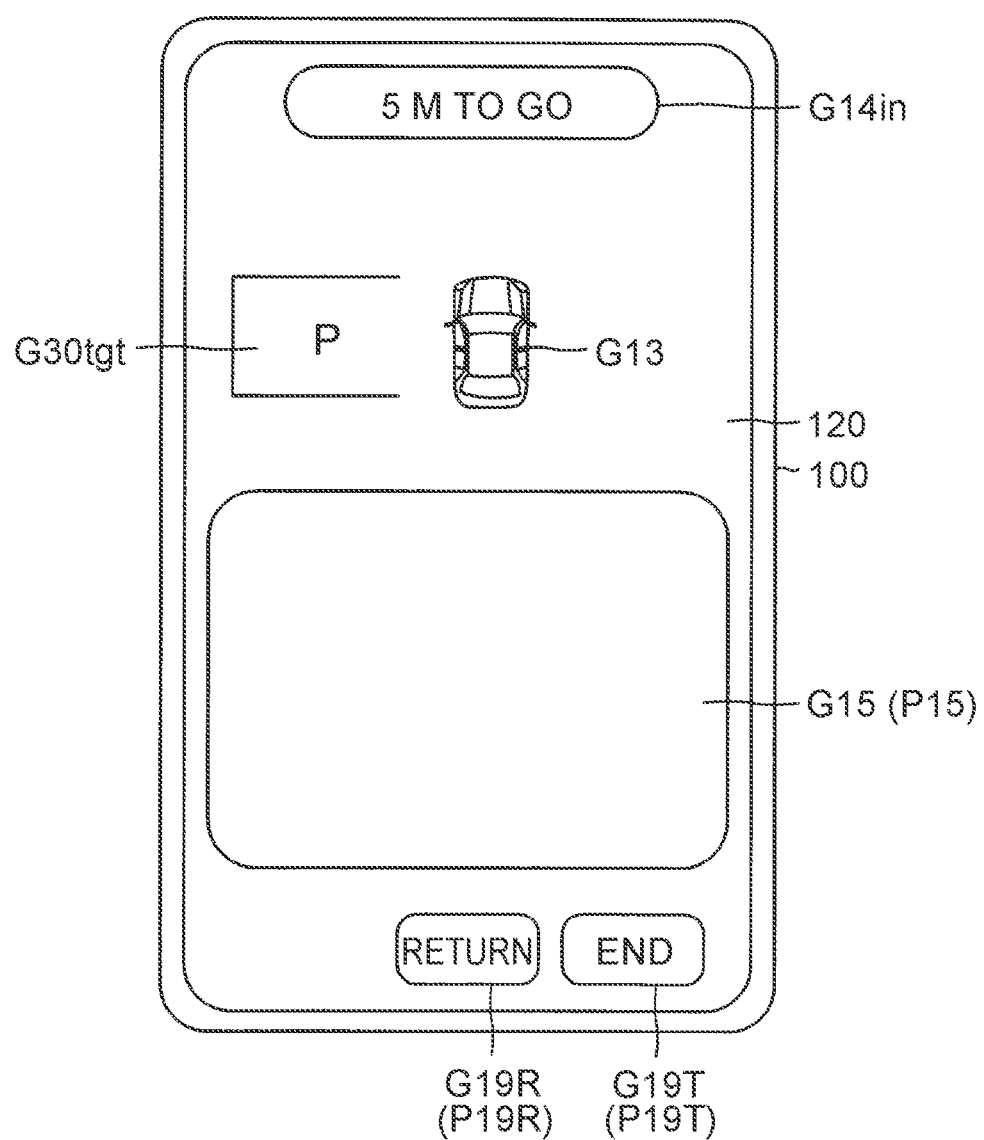
FIG. 12 is a view showing the operation terminal displaying a travel operation image etc. on the terminal display.

When the terminal control device 110 receives the vehicle position signal and the remaining move-in distance signal, the terminal control device 110 displays the screen shown in FIG. 12 to let the terminal user perform operation for making the host vehicle 200 travel on the operation terminal 100. Specifically, the terminal control device 110 displays a designated parking stall image G30tgt, a vehicle image G13, a remaining move-in distance image G14in, a travel operation image G15, the previous screen image G19R, and the end image G19T on the terminal display 120.

The designated parking stall image G30tgt is an image displaying the designated parking stall 30tgt. The vehicle image G13 is an image displaying the host vehicle 200. The terminal control device 110 displays the designated parking stall image G30tgt and the vehicle image G13 on the terminal display 120 so as to correspond to the positional relationship between the designated parking stall 30tgt and the host vehicle 200 shown by the vehicle position signal.

The remaining move-in distance image G14in is an image that displays the remaining move-in distance Din. The terminal control device 110 displays the remaining move-in distance Din shown by the remaining move-in distance signal on the terminal display 120 as the remaining move-in distance image G14in.

The travel operation image G15 is an image that demarcates a region having a predetermined area of the terminal display 120, and a portion of the terminal display 120 displaying this image (travel operation image portion P15) is a portion that receives touch operation.

The previous screen image G19R is an image displaying characters "return," and a portion of the display device 260 displaying this image (previous screen image portion P19R) is a portion that receives touch operation. When touch operation is performed on the previous screen image portion P19R, the terminal control device 110 returns the screen of the terminal display 120 to the immediately preceding screen. For example, when touch operation is performed on the previous screen image portion P19R while the screen shown in FIG. 12 is displayed on the terminal display 120, the terminal control device 110 returns the screen being displayed on the display device 260 to the screen shown in FIG. 10.

When predetermined touch operation is performed on the travel operation image portion P15, the terminal control device 110 wirelessly transmits a continuous touch operation signal to the outside.

Figure 13:
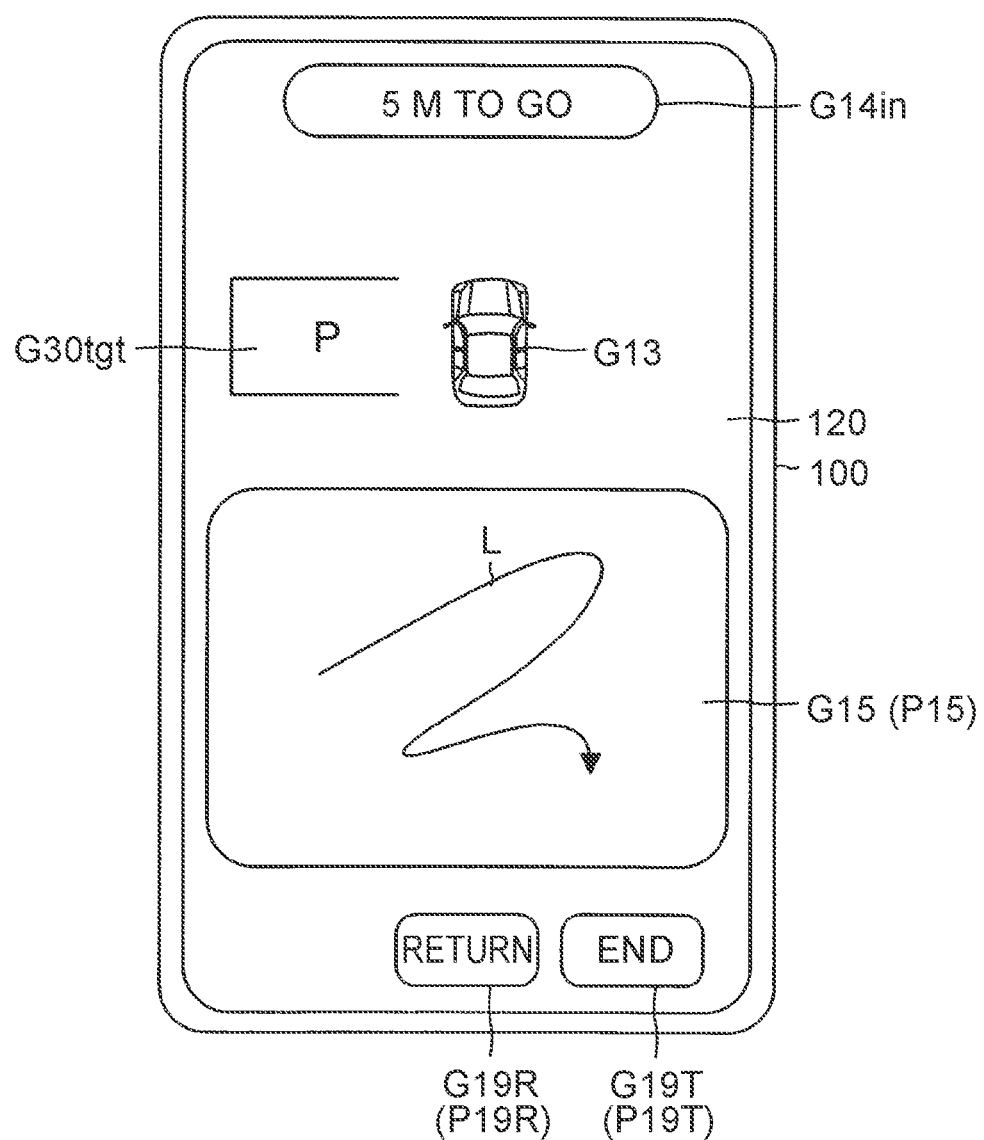
FIG. 13 is a view showing a trajectory of continuous touch operation.

In this example, the predetermined touch operation is operation of the terminal user sliding a finger over the travel operation image portion P15 while keeping the finger in contact with the travel operation image portion P15 (sliding operation) as indicated by line L in FIG. 13. Therefore, the terminal control device 110 does not transmit the continuous touch operation signal when touch operation is performed as a finger of the terminal user contacts the travel operation image portion P15 but the finger stops on the travel operation image portion P15 and thus continuous touch operation is not performed.

Operation of Vehicle Control Device

When the vehicle control device 210 receives the continuous touch operation signal, the vehicle control device 210 performs a vehicle travel process of making the host vehicle 200 travel by controlling the operation of the vehicle travel device 220. In this case, by the vehicle travel process, the vehicle control device 210 first sets the shift state of the transmission device 224 to the forward drive state, and makes the host vehicle 200 move forward while turning right along the target move-in route Rin_tgt and stop at a point of having moved a predetermined distance forward as shown in FIG. 14. While receiving the continuous touch operation signal, the vehicle control device 210 performs the vehicle travel process such that the host vehicle 200 travels along the target move-in route Rin_tgt.

On the other hand, as described above, when the terminal user separates the finger from the travel operation image portion P15, the terminal control device 110 stops transmitting the continuous touch operation signal. In this case, the vehicle control device 210 stops receiving the continuous touch operation signal. When the vehicle control device 210 stops receiving the continuous touch operation signal, the vehicle control device 210 performs a vehicle stopping process of temporarily stopping the host vehicle 200 by the braking device 222.

During a period from when the continuous touch operation signal starts to be received until parking of the host vehicle 200 into the designated parking stall 30tgt is completed, the vehicle control device 210 wirelessly transmits a vehicle position signal, a remaining move-in distance signal, and a travel direction signal to the outside at predetermined time intervals. The vehicle position signal is a signal showing the positional relationship between the host vehicle 200 and the designated parking stall 30tgt. The remaining move-in distance signal is a signal showing the remaining move-in distance Din. The travel direction signal is a signal showing the travel direction of the host vehicle 200.

Operation of Terminal Control Device

Figure 15:
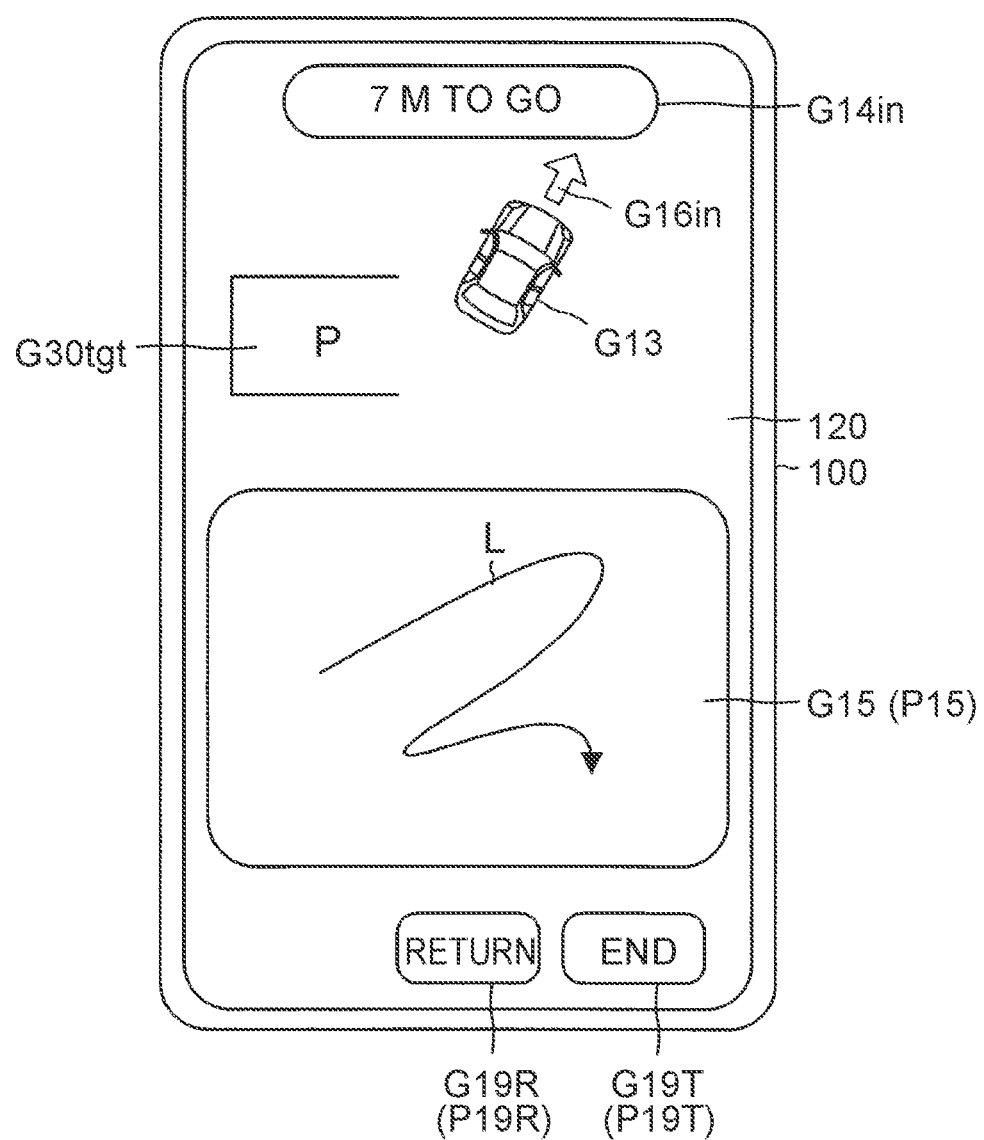
FIG. 15 is a view showing the operation terminal displaying a screen corresponding to the situation shown in FIG. 14 on the terminal display.

When the terminal control device 110 receives the vehicle position signal, as shown in FIG. 15, the terminal control device 110 displays the vehicle image G13 on the terminal display 120 so as to correspond to the positional relationship between the designated parking stall 30tgt and the host vehicle 200 shown by the vehicle position signal. The vehicle image G13 shown in FIG. 15 is displayed when the host vehicle 200 has traveled to the position shown in FIG. 14.

When the terminal control device 110 receives the remaining move-in distance signal, as shown in FIG. 15, the terminal control device 110 displays the remaining move-in distance image G14in displaying the remaining move-in distance Din shown by the remaining move-in distance signal on the terminal display 120.

When the terminal control device 110 receives the travel direction signal, as shown in FIG. 15, the terminal control device 110 displays a travel direction image G16in displaying the travel direction of the host vehicle 200 shown by the travel direction signal at a portion of the terminal display 120 near the vehicle image G13.

Operation of Vehicle Control Device

Figure 16:
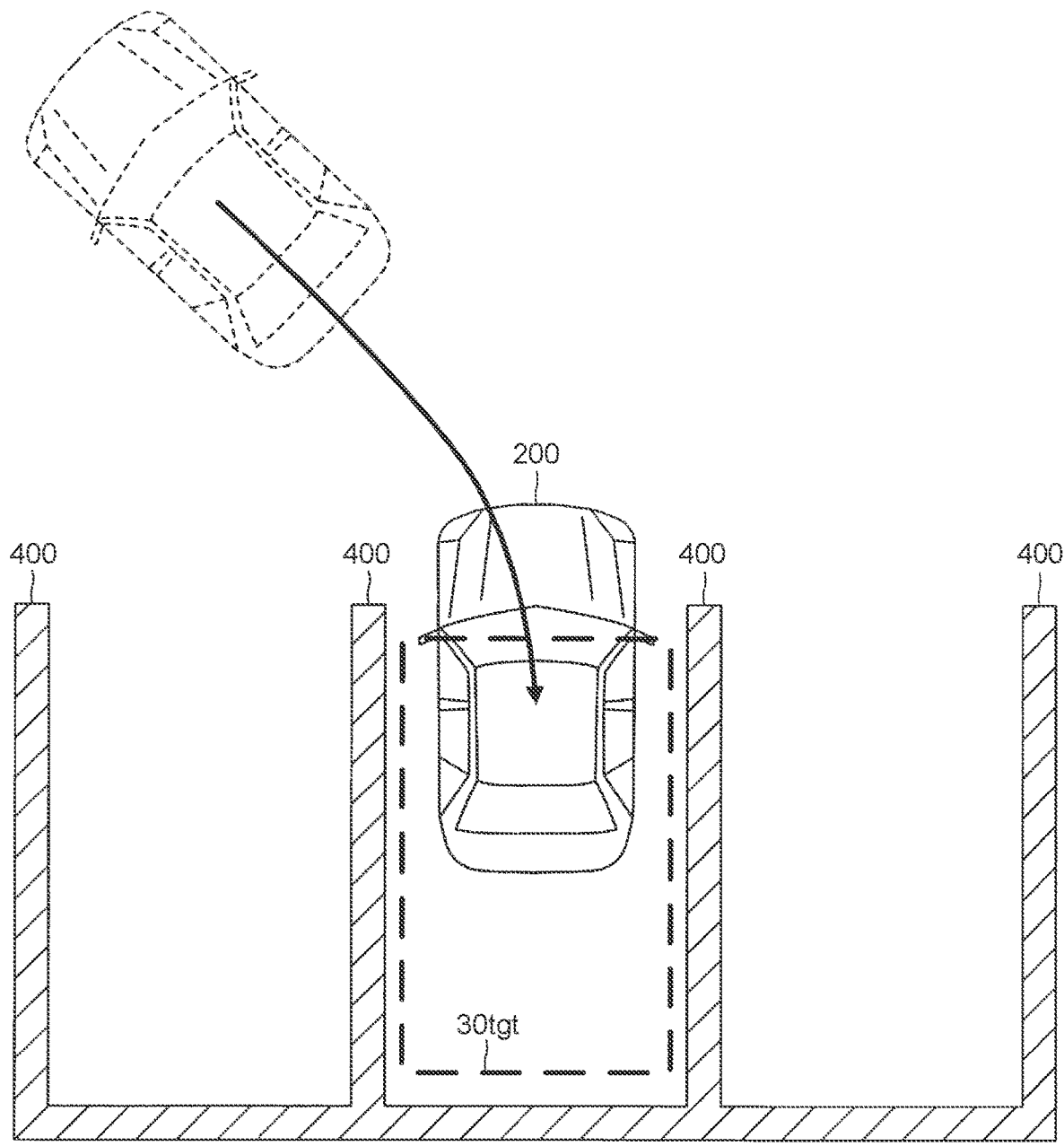
FIG. 16 is a view showing a situation where the host vehicle is made to move rearward while turning left by the remote move-in control.
Figure 17:
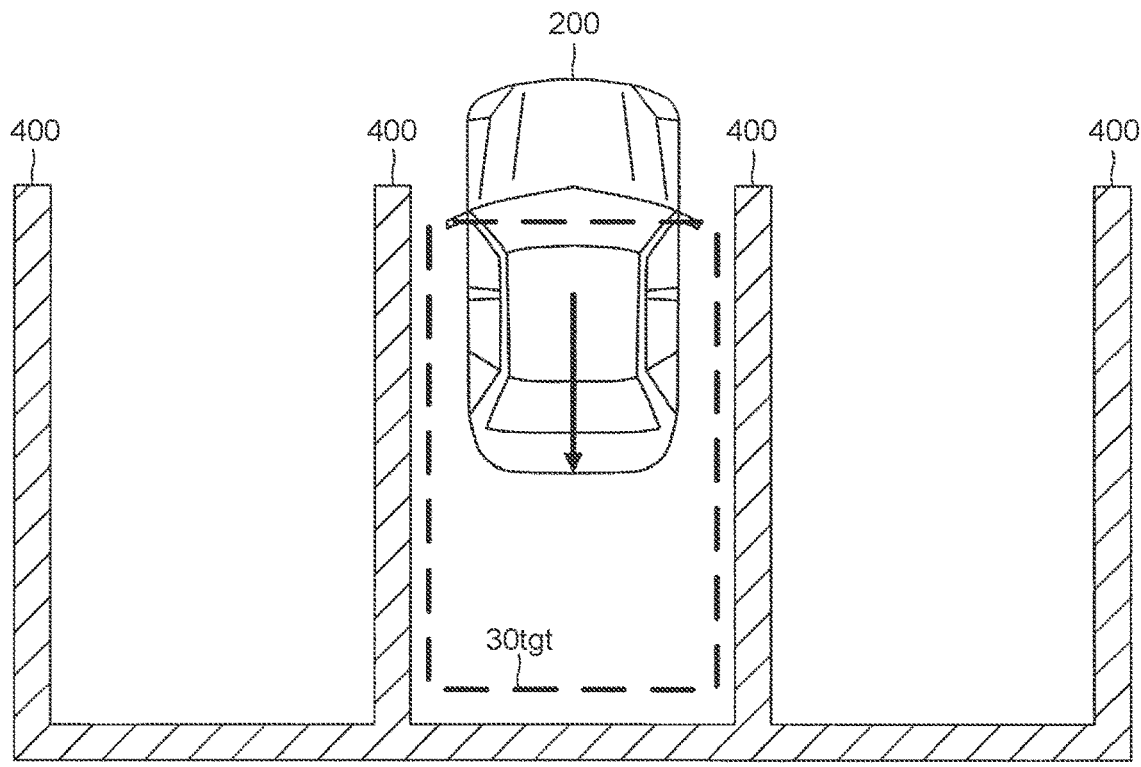
FIG. 17 is a view showing a situation where the host vehicle is moved straight rearward by the remote move-in control.

After making the host vehicle 200 move forward while turning right and stop as shown in FIG. 14, the vehicle control device 210 changes the shift state of the transmission device 224 from the forward drive state to the rearward drive state to change the travel direction of the host vehicle 200, and makes the host vehicle 200 move rearward while turning left as shown in FIG. 16. Thus, the steering angle θ is gradually reduced and becomes zero when a front-rear direction of the host vehicle 200 becomes parallel to a longitudinal direction of the designated parking stall 30tgt. Thereafter, while receiving a continuous touch operation signal, the vehicle control device 210 makes the host vehicle 200 move straight rearward as shown in FIG. 17.

Figure 18:
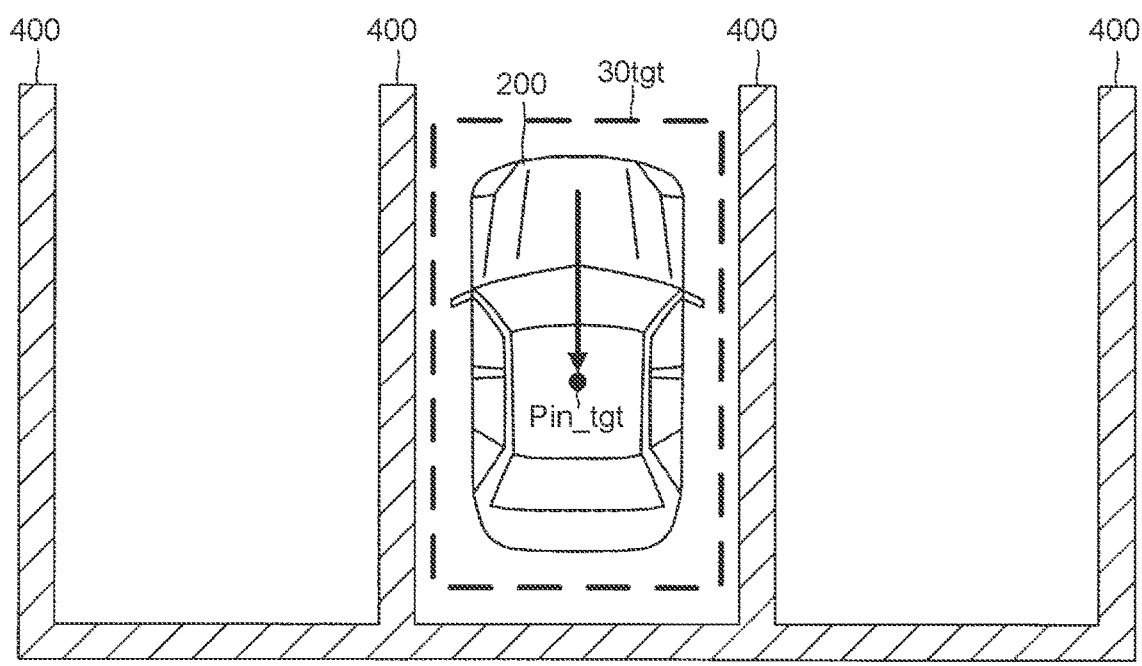
FIG. 18 is a view showing a situation where move-in of the host vehicle by the remote move-in control is completed.

As shown in FIG. 18, when the host vehicle 200 reaches the target parking point Pin_tgt, the vehicle control device 210 stops the host vehicle 200 by the vehicle stopping process, further holds the host vehicle 200 in a stopped state by the vehicle stop holding process, stops the operation of devices including the surroundings information detection device 270 and the vehicle travel device 220, and ends the remote move-in control. Thus, movement (parking) of the host vehicle 200 into the designated parking stall 30tgt is completed.

In this example, the vehicle stopping process is a process of stopping the host vehicle 200 by the braking device 222. The vehicle stop holding process is a process of holding the host vehicle 200 in a stopped state by operating the parking brake device 231, or holding the host vehicle 200 in a stopped state by controlling the operation of the transmission device 224 such that the transmission device 224 assumes the parking state.

When move-in (parking) of the host vehicle 200 is completed, the vehicle control device 210 wirelessly transmits a move-in completion signal to the outside. The move-in completion signal is a signal showing that move-in (parking) of the host vehicle 200 is completed.

The vehicle control device 210 performs a process of detecting obstacles based on the surroundings detection information IS while making the host vehicle 200 travel by the remote move-in control, and is configured to, upon detecting an obstacle by this process, stop the host vehicle 200 by the vehicle stopping process when the need to stop the host vehicle 200 arises due to a reason such as that the likelihood of the host vehicle 200 coming into contact with that obstacle has become high.

Operation of Terminal Control Device

Figure 19:
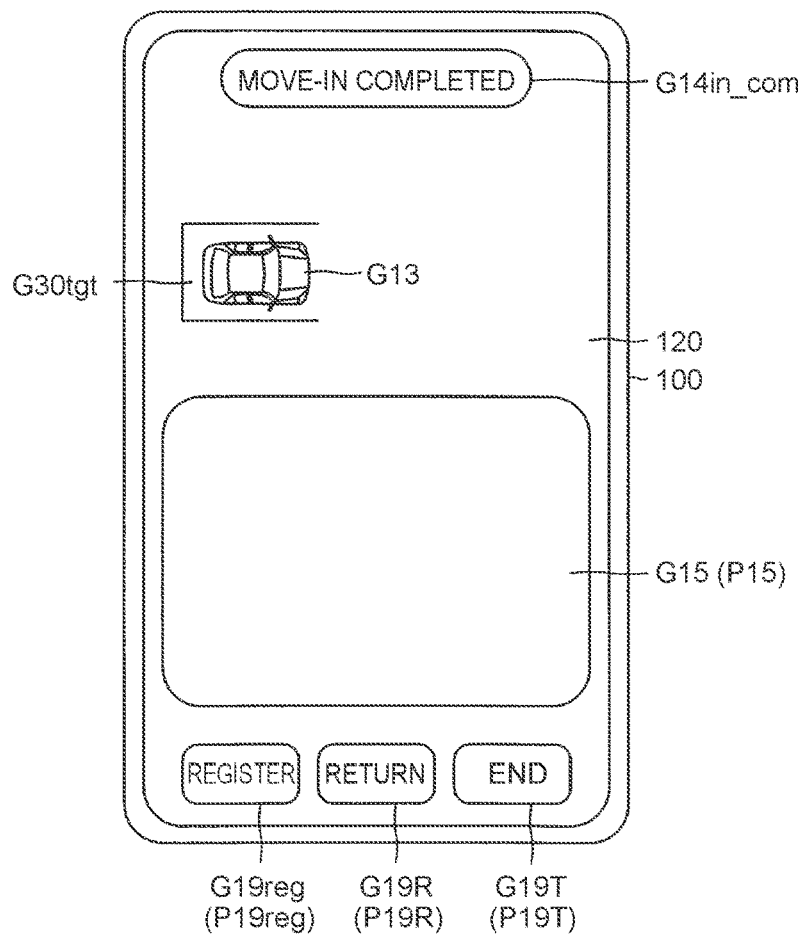
FIG. 19 is a view showing the operation terminal displaying a screen corresponding to the situation shown in FIG. 18 on the terminal display.

When the terminal control device 110 receives the move-in completion signal, as shown in FIG. 19, the terminal control device 110 displays a move-in completion image G14in_com on the terminal display 120 to let the terminal user know that move-in of the host vehicle 200 is completed. The move-in completion image G14in_com is an image showing that move-in of the host vehicle 200 is completed.

Further, when the terminal control device 110 receives the move-in completion signal, as shown in FIG. 19, the terminal control device 110 displays a registration image G19reg on the terminal display 120 to let the terminal user register the parking stall 30 (designated parking stall 30tgt) into which the host vehicle 200 has been moved this time as a registered parking stall 30reg in the vehicle control device 210. The registration image G19reg is an image displaying characters "register," and a portion of the terminal display 120 displaying this image (registration image portion P19reg) is a portion that receives touch operation.

When touch operation is performed on the registration image portion P19reg, the terminal control device 110 wirelessly transmits a registration request signal to the outside.

Operation of Vehicle Control Device

Registration of Parking Stall

During a period from immediately before the host vehicle 200 is stopped near the parking stall 30 until move-in of the host vehicle 200 is completed, the vehicle control device 210 performs a process of acquiring and storing, as brightness feature points, pixels of which the brightness differs greatly from that of surrounding pixels in an image taken by the image sensor 272.

When the vehicle control device 210 receives the registration request signal, the vehicle control device 210 registers (stores) the positional relationship among the stored brightness feature points as information on the parking stall 30 into which the host vehicle 200 has been moved at that time and on the ground and objects around the parking stall 30 (parking space information IP).

Figure 20:
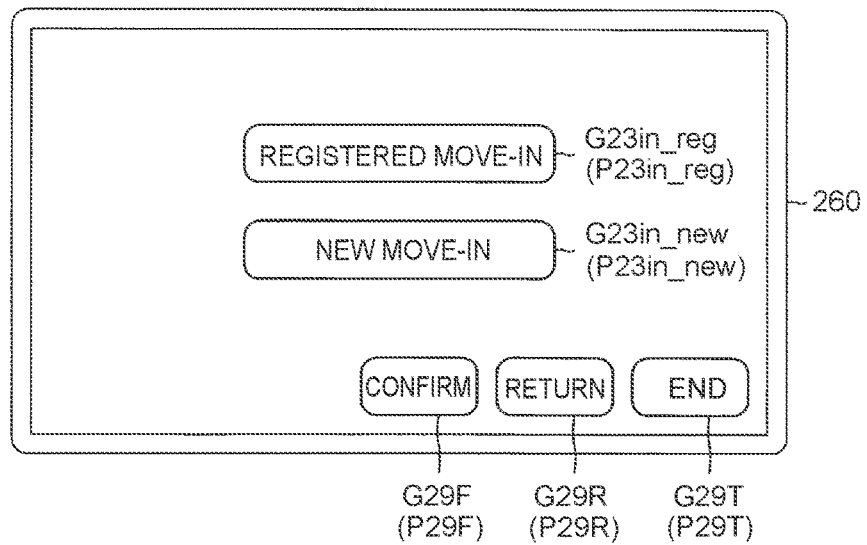
FIG. 20 is a view showing the display device displaying a registered move-in selection image, a new move-in selection image, etc.

When the host vehicle 200 is stopped by a parking space (registered parking space 30S_reg) including a parking stall (registered parking stall 30reg) for which the parking space information IP is registered and execution of the remote move-in control is requested, before displaying the screen shown in FIG. 7 on the display device 260, the vehicle control device 210 displays the screen shown in FIG. 20 on the display device 260 to let the driver select whether to move the host vehicle 200 into the registered parking stall 30reg or to move the host vehicle 200 into a new parking stall 30. Specifically, the vehicle control device 210 displays a registered move-in selection image G23in_reg, a new move-in selection image G23in_new, the selection confirmation image G29F, the previous screen image G29R, and the end image G29T.

The registered move-in selection image G23in_reg is an image displaying characters "registered move-in," and a portion of the display device 260 displaying this image (registered move-in selection image portion P23in_reg) is a portion that receives touch operation. The new move-in selection image G23in_new is an image displaying characters "new move-in," and a portion of the display device 260 displaying this image (new move-in selection image portion P23in_new) is a portion that receives touch operation.

When touch operation is performed on the registered move-in selection image portion P23in_reg and subsequently touch operation is performed on the selection confirmation image portion P29F, the vehicle control device 210 determines that movement of the host vehicle 200 into the registered parking stall 30reg has been selected, and displays the screen shown in FIG. 8B on the display device 260 instead of displaying the screen shown in FIG. 7 on the display device 260. The subsequent operation of each of the vehicle control device 210 and the terminal control device 110 is as described above. In this case, the registered parking stall 30reg is set as the designated parking stall 30tgt.

On the other hand, when touch operation is performed on the new move-in selection image portion P23in_new and subsequently touch operation is performed on the selection confirmation image portion P29F, the vehicle control device 210 determines that movement of the host vehicle 200 into a new parking stall 30 has been selected instead of movement of the host vehicle 200 into the registered parking stall 30reg, and performs a parkable stall detection process and displays the screen shown in FIG. 7 on the display device 260. The subsequent operation of each of the vehicle control device 210 and the terminal control device 110 is as described above.

Remote Move-Out Control

Next, the remote move-out control will be described.

Operation of Terminal Control Device

When the driver performs application start operation on the terminal display 120 of the operation terminal 100 outside the host vehicle 200, as described above, the terminal control device 110 starts the remote travel application in response to the application start operation, and displays the remote move-in or -out start image G11 and the end image G19T on the terminal display 120 as shown in FIG. 9.

When touch operation is performed on the remote move-in or -out start image portion P11, the terminal control device 110 displays the screen shown in FIG. 10 on the terminal display 120 to let the terminal user select whether to move the host vehicle 200 in or out.

When touch operation is performed on the move-out selection image portion P12out, the terminal control device 110 wirelessly transmits an application start signal and a move-out selection signal to the outside. As described above, the application start signal is a signal showing information, such as an ID, that is used to determine whether the operation terminal 100 is a registered operation terminal (to identify the operation terminal 100). The move-out selection signal is a signal showing that move-out of the host vehicle 200 is selected by the terminal user.

Operation of Vehicle Control Device

When the vehicle control device 210 receives the application start signal and the move-out selection signal, the vehicle control device 210 determines whether the operation terminal 100 shown by the application start signal is a registered operation terminal. In this example, the operation terminal 100 is a registered operation terminal, and therefore the vehicle control device 210 determines that the operation terminal 100 is a registered operation terminal.

When the vehicle control device 210 receives the application start signal and the move-out selection signal and determines that the operation terminal 100 is a registered operation terminal, the vehicle control device 210 starts the remote move-out control. When the vehicle control device 210 starts the remote move-out control, the vehicle control device 210 performs a process of searching for a direction in which the host vehicle 200 can be moved out (move-out direction) based on the surroundings detection information IS (move-out direction search process).

Figure 21:
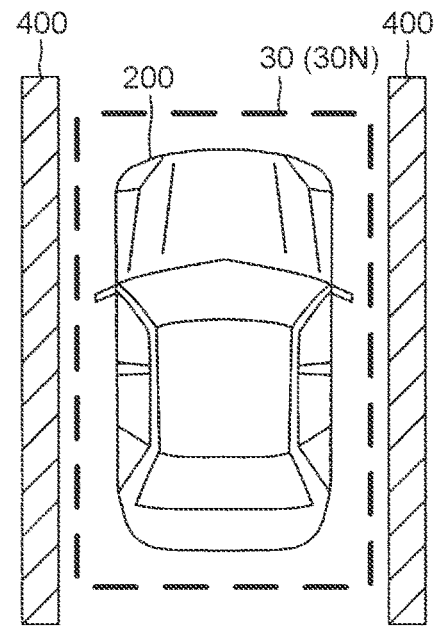
FIG. 21 is a view showing a situation where the host vehicle is parked in a parking stall.

For example, as shown in FIG. 21, when the host vehicle 200 can be moved out by moving it forward as well as by moving it rearward, the vehicle control device 210 detects the two directions of a forward move-out direction and a rearward move-out direction as move-out directions by the move-out direction search process.

Figure 22:
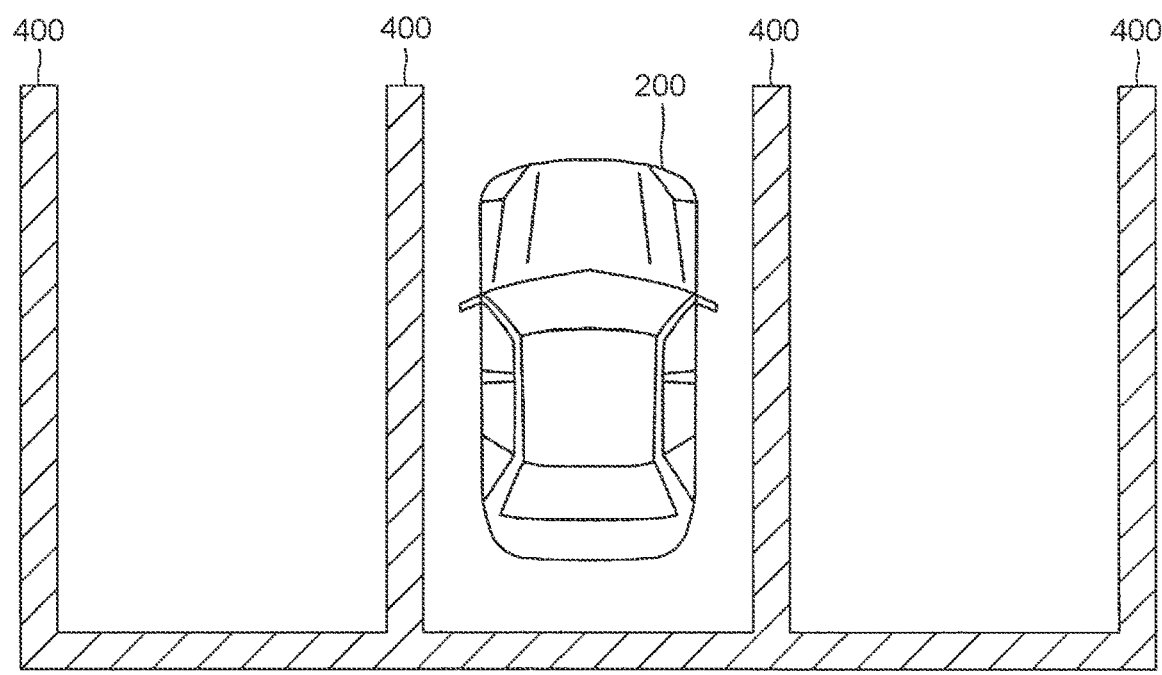
FIG. 22 is a view showing a situation where the host vehicle is parked in a parking stall.

On the other hand, as shown in FIG. 22, when the host vehicle 200 can be moved out only by moving it forward, the vehicle control device 210 detects only the forward move-out direction as the move-out direction by the move-out direction search process. Similarly, when the host vehicle 200 can be moved out only by moving it rearward, the vehicle control device 210 detects only the rearward move-out direction as the move-out direction by the move-out direction search process.

When the vehicle control device 210 detects the move-out direction, the vehicle control device 210 wirelessly transmits a move-out direction signal to the outside. The move-out direction signal is a signal showing the detected move-out direction.

Operation of Terminal Control Device

Figure 23:
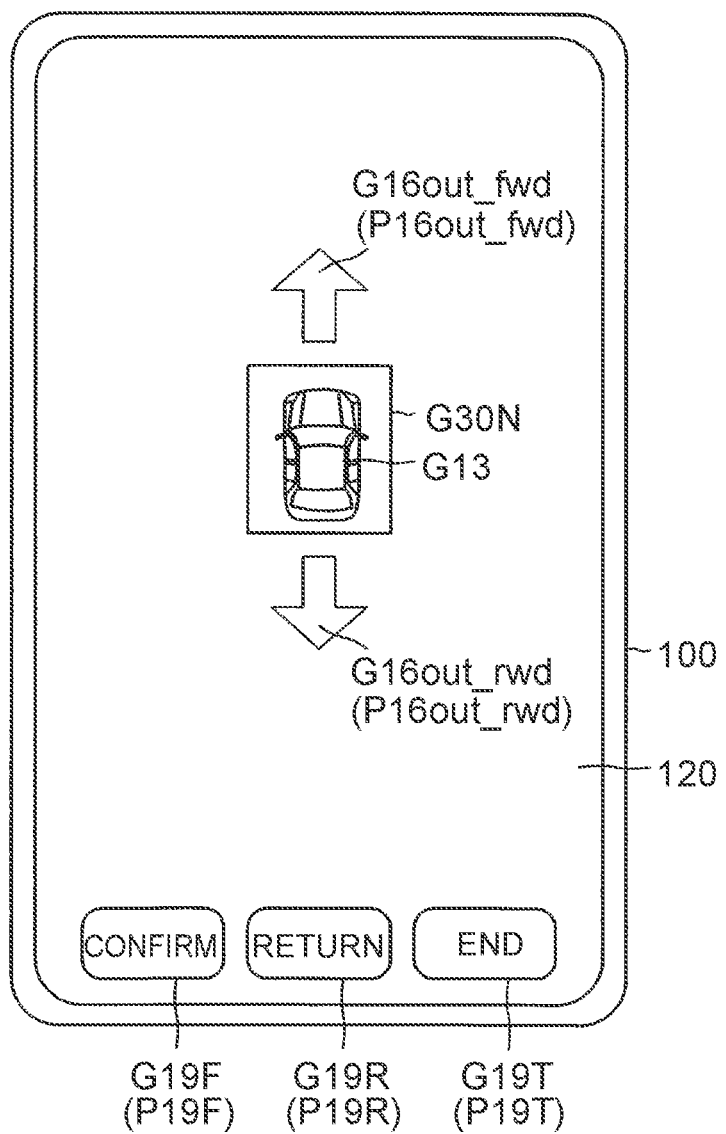
FIG. 23 is a view showing the operation terminal displaying a forward move-out selection image, a rearward move-out selection image, etc. on the terminal display.

When the terminal control device 110 receives the move-out direction signal, the terminal control device 110 displays the screen shown in FIG. 23 on the terminal display 120 to let the terminal user select a move-out direction. Specifically, the terminal control device 110 displays a current parking stall image G30N, the vehicle image G13, a forward move-out selection image G16out_fwd, a rearward move-out selection image G16out_rwd, the selection confirmation image G19F, the previous screen image G19R, and the end image G19T on the terminal display 120.

The current parking stall image G30N is an image displaying a parking stall in which the host vehicle 200 is currently parked (current parking stall 30N). The forward move-out selection image G16out_fwd is an image showing a forward direction, and a portion of the terminal display 120 displaying this image (forward move-out selection image portion P16out_fwd) is a portion that receives touch operation. The rearward move-out selection image G16out_rwd is an image showing a rearward direction, and a portion of the terminal display 120 displaying this image (rearward move-out selection image portion P16out_rwd) is a portion that receives touch operation.

FIG. 23 shows a screen that is displayed on the terminal display 120 when the host vehicle 200 is parked as shown in FIG. 21. Therefore, while the terminal control device 110 displays the two images of the forward move-out selection image G16out_fwd and the rearward move-out selection image G16out_rwd on the terminal display 120 shown in FIG. 23, the terminal control device 110 may be configured to display only the forward move-out selection image G16out_fwd on the terminal display 120 and omit displaying the rearward move-out selection image G16out_rwd on the terminal display 120 when it can be determined that the host vehicle 200 can be moved out only by moving it forward. Similarly, the terminal control device 110 may be configured to display only the rearward move-out selection image G16out_rwd on the terminal display 120 and omit displaying the forward move-out selection image G16out_fwd on the terminal display 120 when it can be determined that the host vehicle 200 can be moved out only by moving it rearward.

When touch operation is performed on one of the forward move-out selection image portion P16out_fwd and the rearward move-out selection image portion P16out_rwd and subsequently touch operation is performed on the selection confirmation image portion P29F, the terminal control device 110 wirelessly transmits a move-out direction selection signal to the outside.

In the case where touch operation is performed on the forward move-out selection image portion P16out_fwd and subsequently touch operation is performed on the selection confirmation image portion P29F, the move-out direction selection signal is a signal showing that the forward direction is selected as the move-out direction. In the case where touch operation is performed on the rearward move-out selection image portion P16out_rwd and subsequently touch operation is performed on the selection confirmation image portion P29F, the move-out direction selection signal is a signal showing that the rearward direction is selected as the move-out direction.

Operation of Vehicle Control Device

Figure 24:
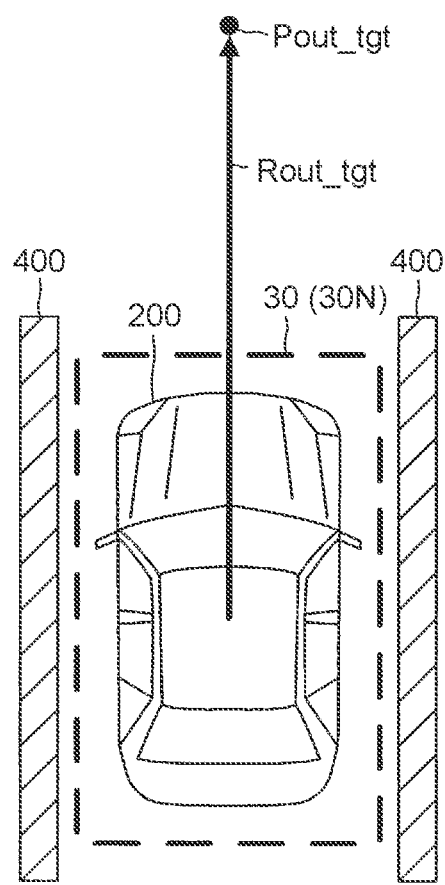
FIG. 24 is a view showing a target move-out route.

When the vehicle control device 210 receives the move-out direction selection signal, as shown in FIG. 24, the vehicle control device 210 sets a target move-out route Rout_tgt according to the move-out direction shown by the move-out direction selection signal. The target move-out route Rout_tgt shown in FIG. 24 is a route that is set when the move-out direction shown by the move-out direction selection signal is the forward direction.

When the vehicle control device 210 sets the target move-out route Rout_tgt, the vehicle control device 210 acquires the distance between the host vehicle 200 and a point outside the current parking stall 30N (target move-out point Pout_tgt) to be reached by the host vehicle 200 under the remote move-out control (remaining move-out distance Dout) based on the surroundings detection information IS.

When the vehicle control device 210 sets the target move-out route Rout_tgt and acquires the remaining move-out distance Dout, the vehicle control device 210 wirelessly transmits a vehicle position signal and a remaining move-out distance signal to the outside. The vehicle position signal is a signal showing the positional relationship between the target move-out point Pout_tgt and the host vehicle 200. The remaining move-out distance signal is a signal showing the remaining move-out distance Dout.

Operation of Terminal Control Device

Figure 25:
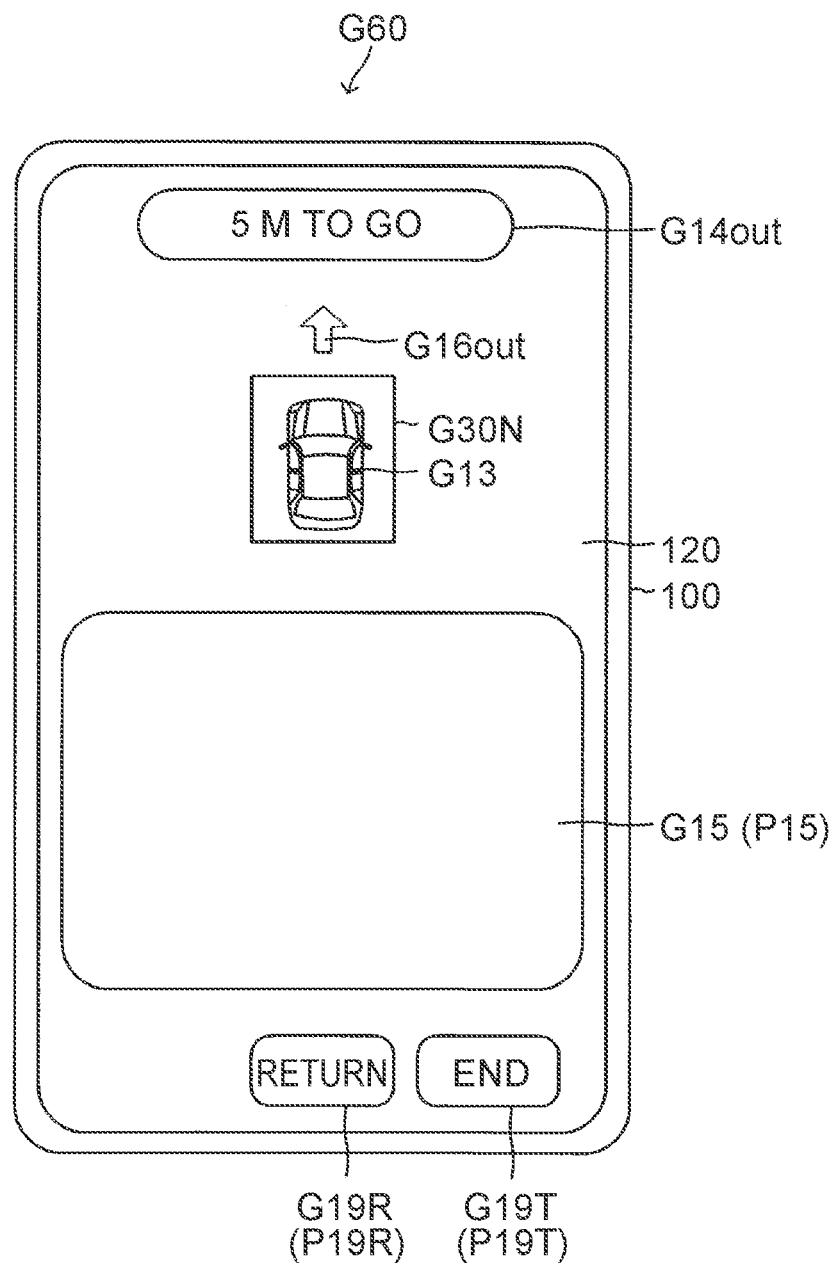
FIG. 25 is a view showing the operation terminal displaying, on the terminal display, a screen that appears when forward move-out is selected.
Figure 26:
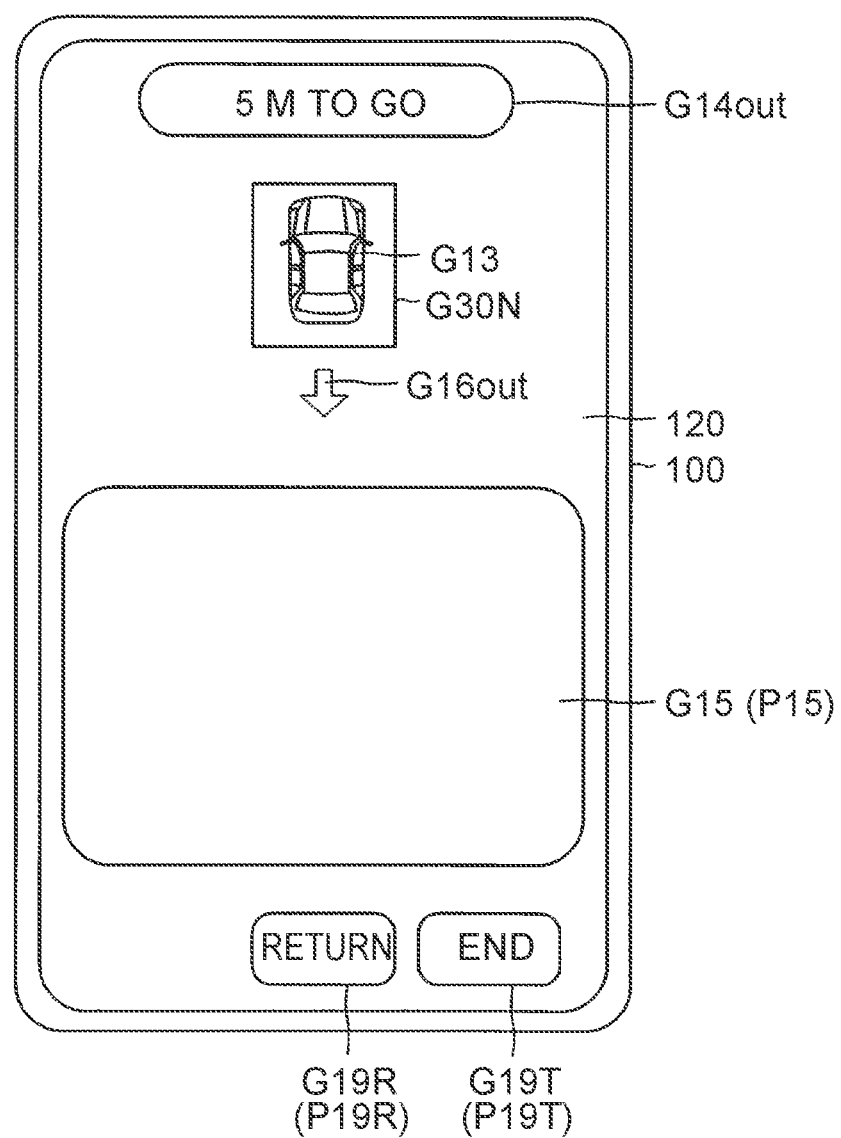
FIG. 26 is a view showing the operation terminal displaying, on the terminal display, a screen that appears when rearward move-out is selected.

When the terminal control device 110 receives the vehicle position signal and the remaining move-out distance signal, the terminal control device 110 displays the screen shown in FIG. 25 or FIG. 26 on the terminal display 120 to let the terminal user perform operation for making the host vehicle 200 travel on the operation terminal 100. Specifically, the terminal control device 110 displays the current parking stall image G30N, the vehicle image G13, a remaining move-out distance image G14out, the travel operation image G15, and a move-out direction image G16out on the terminal display 120.

The screen shown in FIG. 25 is a screen that is displayed on the terminal display 120 when touch operation is performed on the forward move-out selection image portion P16out_fwd in the screen shown in FIG. 23, and the screen shown in FIG. 26 is a screen that is displayed on the terminal display 120 when touch operation is performed on the rearward move-out selection image portion P16out_rwd in the screen shown in FIG. 23.

The remaining move-out distance image G14out is an image displaying the remaining move-out distance Dout. The terminal control device 110 displays the remaining move-out distance Dout shown by the remaining move-out distance signal on the terminal display 120 as the remaining move-out distance image G14out. The move-out direction image G16out is an image displaying the move-out direction.

Figure 27:
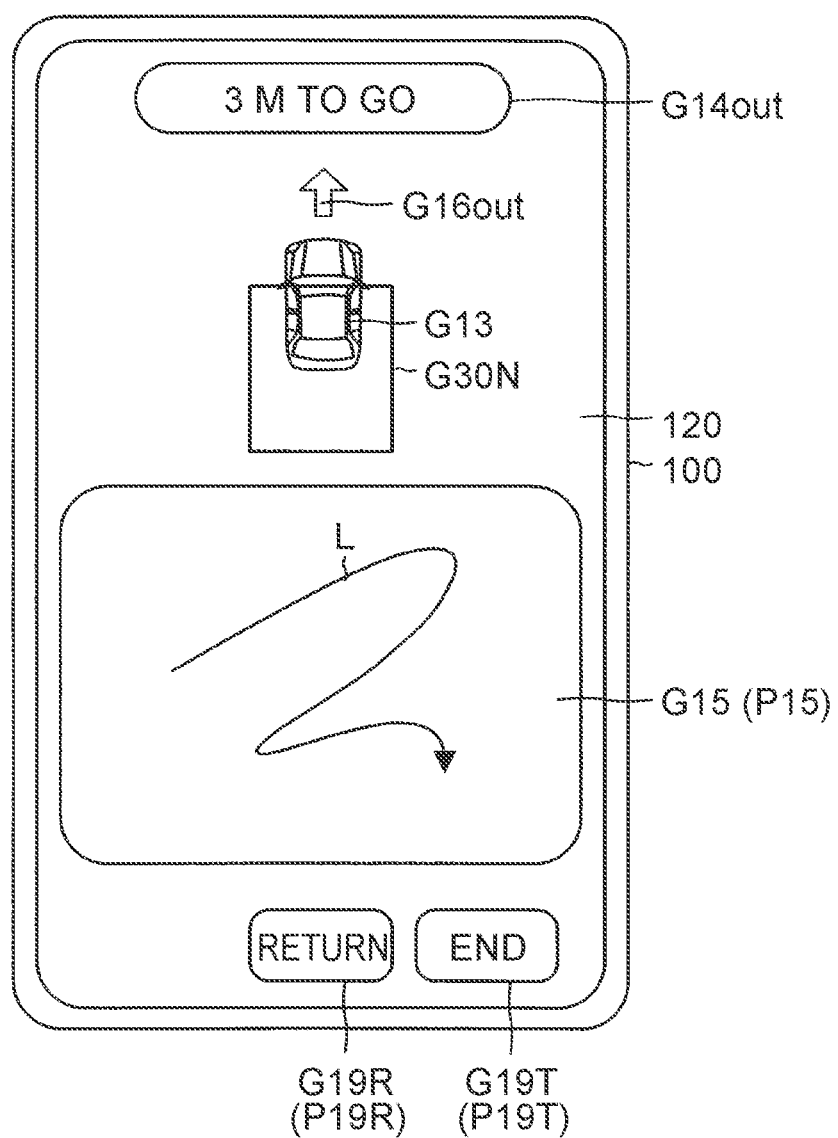
FIG. 27 is a view showing the operation terminal on which continuous touch operation is performed.

When predetermined touch operation is performed on the travel operation image portion P15 as indicated by line L in FIG. 27, the terminal control device 110 wirelessly transmits a continuous touch operation signal to the outside. The screen shown in FIG. 27 is a screen that is displayed on the terminal display 120 when the forward move-out direction is selected as the move-out direction.

Operation of Vehicle Control Device

Figure 28:
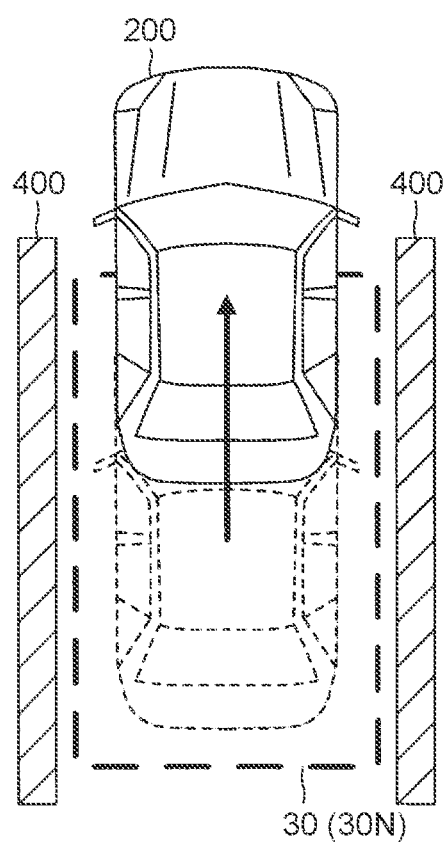
FIG. 28 is a view showing a situation where the host vehicle is moved straight forward by remote move-out control.

When the vehicle control device 210 receives the continuous touch operation signal, the vehicle control device 210 performs the vehicle travel process of controlling the operation of the vehicle travel device 220. In this case, by the vehicle travel process, the vehicle control device 210 changes the shift state of the transmission device 224 to the forward drive state, and as shown in FIG. 28, makes the host vehicle 200 move forward along the target move-out route Rout_tgt and makes the host vehicle 200 stop at a point when the host vehicle 200 reaches the target move-out point Pout_tgt. While receiving the continuous touch operation signal, the vehicle control device 210 executes the vehicle travel process such that the host vehicle 200 travels along the target move-out route Rout_tgt.

On the other hand, as described above, when the terminal user separates the finger from the travel operation image portion P15, the terminal control device 110 stops transmitting the continuous touch operation signal. In this case, the vehicle control device 210 stops receiving the continuous touch operation signal. When the vehicle control device 210 stops receiving the continuous touch operation signal, the vehicle control device 210 executes the vehicle stopping process of temporarily stopping the host vehicle 200 by the braking device 222.

During the period from when the continuous touch operation signal starts to be received until movement of the host vehicle 200 out of the current parking stall 30N is completed, the vehicle control device 210 wirelessly transmits the vehicle position signal and the remaining move-out distance signal to the outside at predetermined time intervals. The vehicle position signal is a signal showing the positional relationship between the host vehicle 200 and the current parking stall 30N. The remaining move-out distance signal is a signal showing the remaining move-out distance Dout.

Operation of Terminal Control Device

When the terminal control device 110 receives the vehicle position signal, as shown in FIG. 27, the terminal control device 110 displays the vehicle image G13 on the terminal display 120 so as to correspond to the positional relationship between the current parking stall 30N and the host vehicle 200 shown by the vehicle position signal. The vehicle image G13 shown in FIG. 27 is an image that is displayed on the display device 260 when the host vehicle 200 has traveled to the position shown in FIG. 28.

When the terminal control device 110 receives the remaining move-out distance signal, as shown in FIG. 27, the terminal control device 110 displays the remaining move-out distance image G14out displaying the remaining move-out distance Dout shown by the remaining move-out distance signal on the terminal display 120.

Operation of Vehicle Control Device

Figure 29:
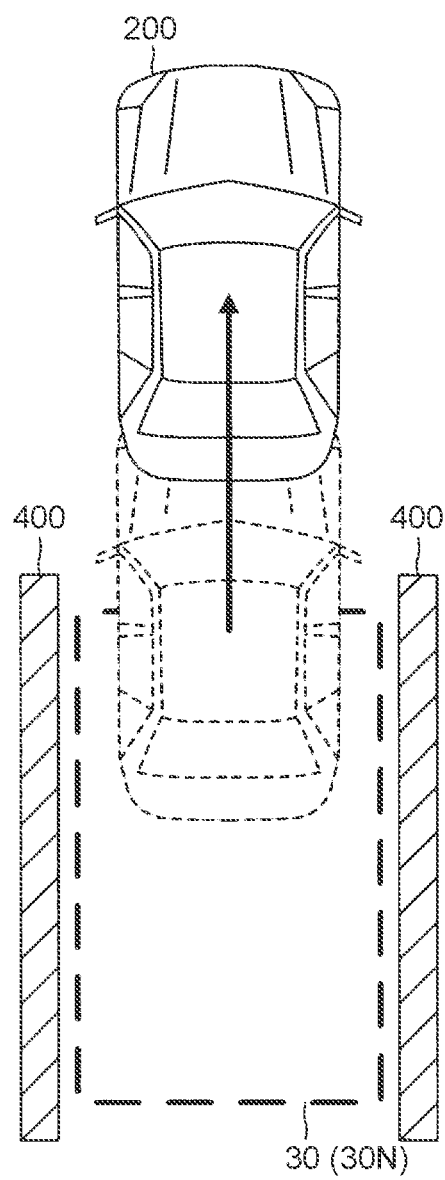
FIG. 29 is a view showing a situation where move-out of the host vehicle by the remote move-out control is completed.

As shown in FIG. 29, when the host vehicle 200 reaches the target move-out point Pout_tgt, the vehicle control device 210 stops the host vehicle 200 by the vehicle stopping process, further holds the host vehicle 200 in a stopped state by the vehicle stop holding process, and stops the operation of devices including the surroundings information detection device 270 and the vehicle travel device 220, and ends the remote move-out control. Thus, movement of the host vehicle 200 out of the current parking stall 30N is completed.

When move-out of the host vehicle 200 is completed, the vehicle control device 210 wirelessly transmits a move-out completion signal to the outside. The move-out completion signal is a signal showing that move-out of the host vehicle 200 is completed.

Operation of Terminal Control Device

Figure 30:
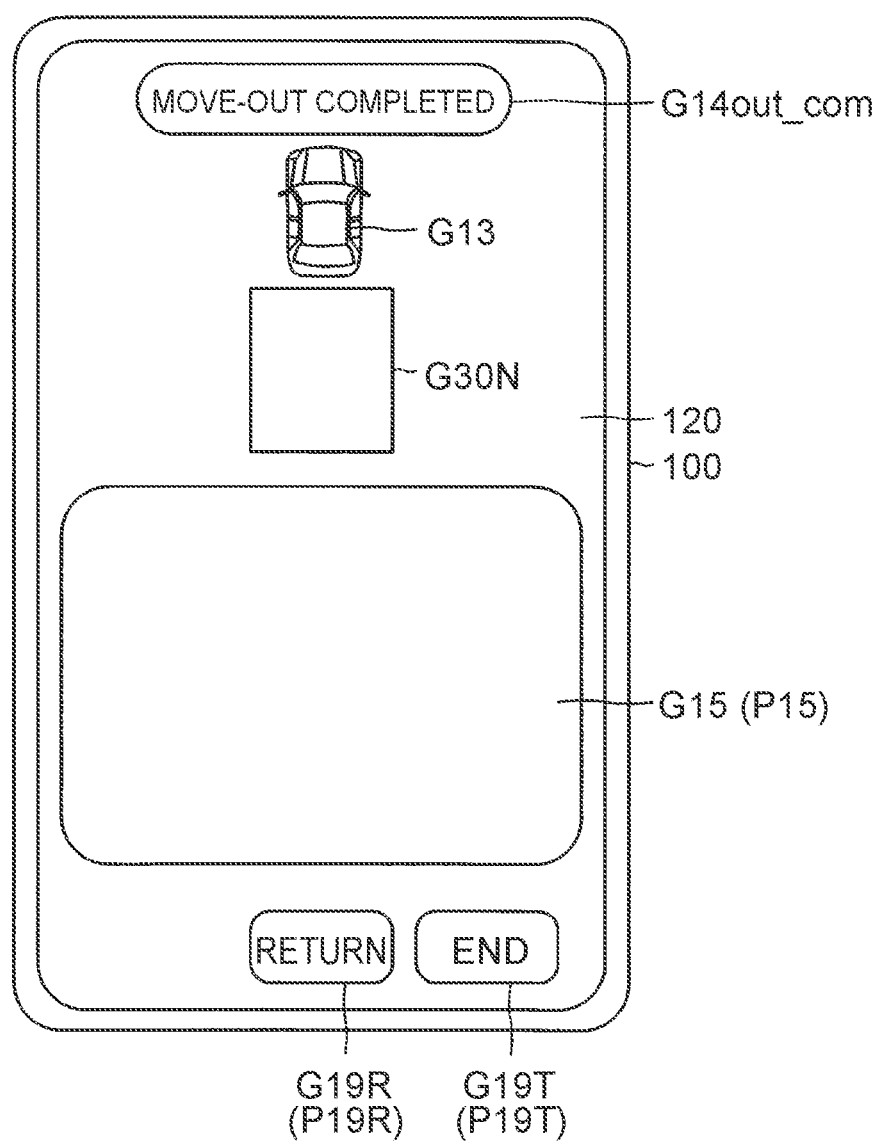
FIG. 30 is a view showing the operation terminal displaying, on the terminal display, a screen that appears when move-out of the host vehicle by the remote move-out control is completed.

When the terminal control device 110 receives the move-out completion signal, as shown in FIG. 30, the terminal control device 110 displays a move-out completion image G14out_com on the terminal display 120 to let the terminal user know that move-out of the host vehicle 200 is completed. The move-out completion image G14out_com is an image showing that move-out of the host vehicle 200 is completed.

Ending Application and Others

When touch operation is performed on the end image portion P19T, the terminal control device 110 ends the remote travel application and wirelessly transmits a control end command signal to the outside. The control end command signal is a signal that commands that the remote move-in or -out control be ended.

When the vehicle control device 210 receives the control end command signal, the vehicle control device 210 stops the host vehicle 200 by the vehicle stopping process, further holds the host vehicle 200 in a stopped state by the vehicle stop holding process, stops the operation of devices including the surroundings information detection device 270 and the vehicle travel device 220, and ends the remote move-in control when executing the remote move-in control or ends the remote move-out control when executing the remote move-out control.

When touch operation is performed on the end image portion P29T, the vehicle control device 210 stops the host vehicle 200 by the vehicle stopping process, further holds the host vehicle 200 in a stopped state by the vehicle stop holding process, and stops the operation of devices including the surroundings information detection device 270 and the vehicle travel device 220, and ends the remote move-in control.

Designation of Parking Stall

Figure 31:
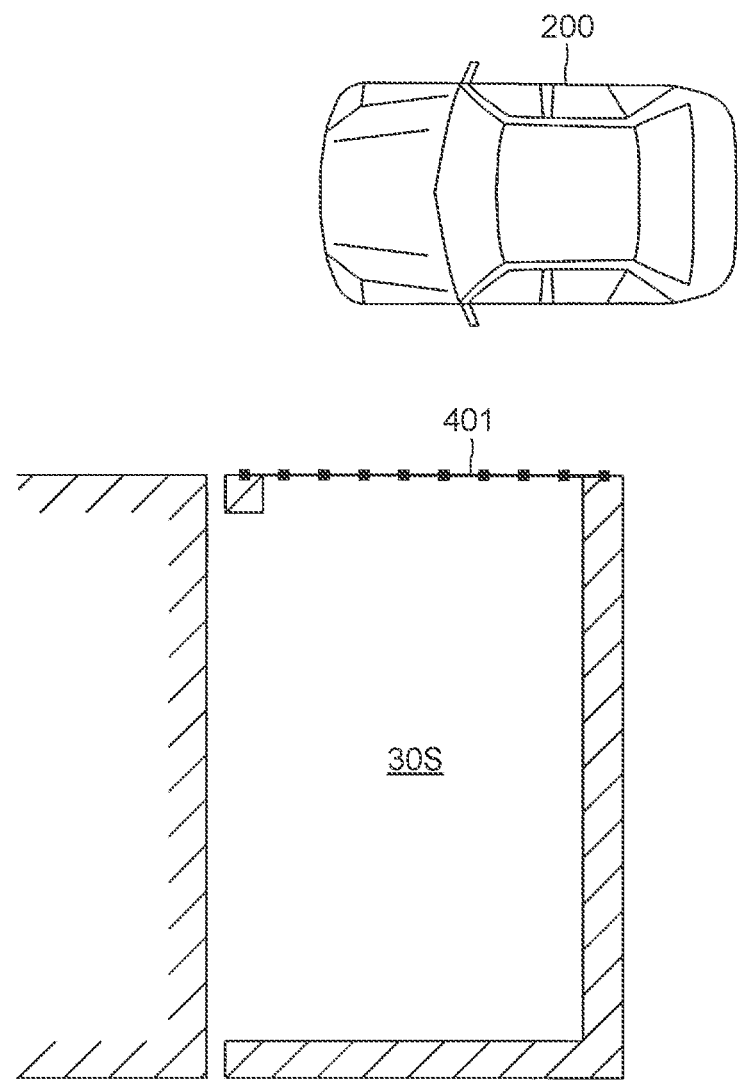
FIG. 31 is a view showing a situation where the host vehicle is stopped by a parking stall that is closed with a shutter.
Figure 32:
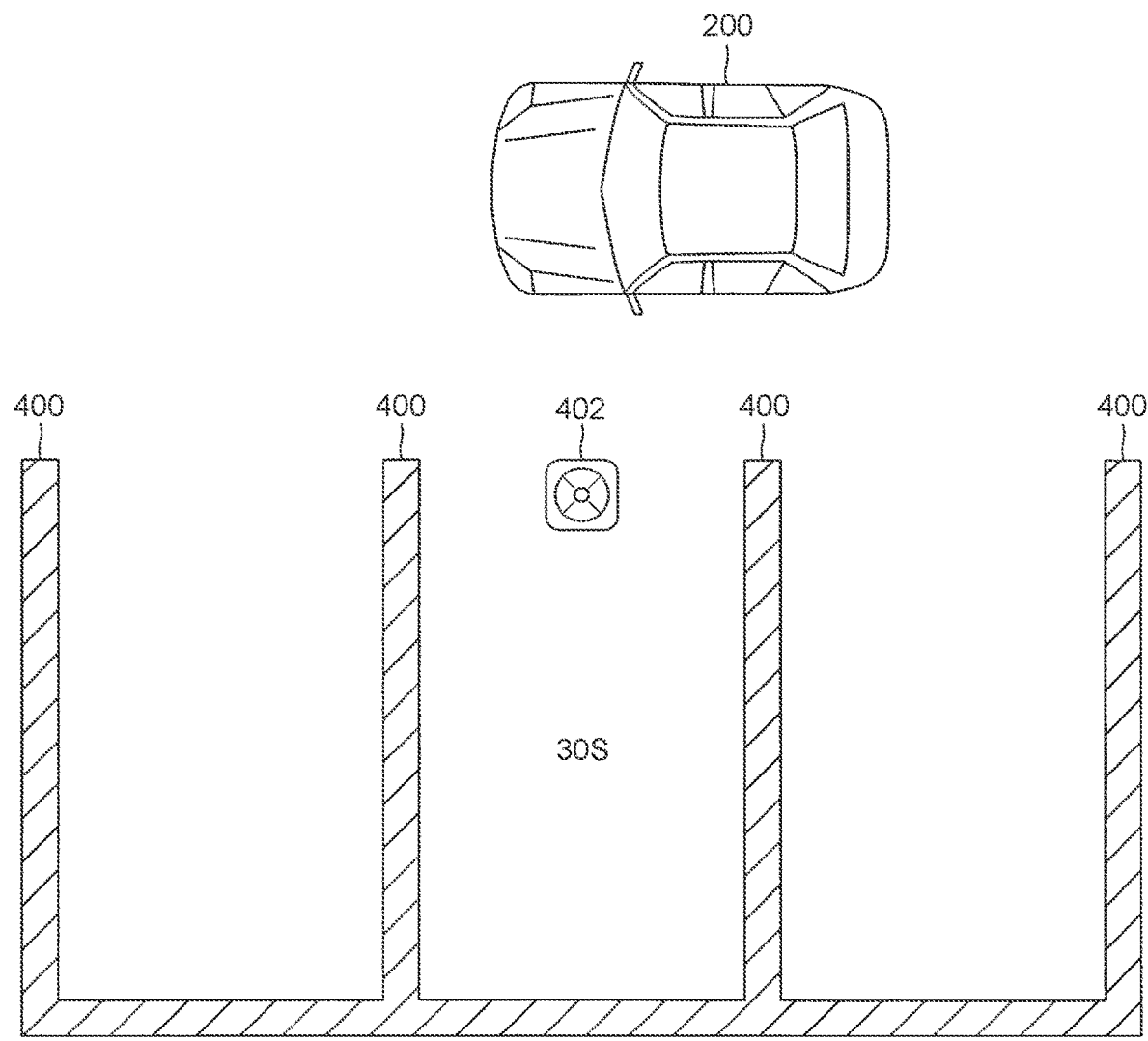
FIG. 32 is a view showing a situation where the host vehicle is stopped by a parking stall in which a pylon is placed.

As shown in FIG. 31, when the driver stops the host vehicle 200 by a parking space 30S at home to move the host vehicle 200 into the parking space 30S, the entrance of the parking space may be closed with a shutter 401. Further, as shown in FIG. 32, when the driver stops the host vehicle 200 by a parking space 30S outside the home to move the host vehicle 200 into the parking space 30S, a pylon 402 may be placed at the entrance of the parking space 30S.

When the entrance of the parking space is closed with a shutter, the parking stall inside the parking space cannot be detected based on the surroundings detection information IS, so that this parking stall cannot be set as the parkable stall 30C and therefore cannot be set as the designated parking stall 30*tgt*.

When a pylon is placed at the entrance of the parking space, the parking stall inside the parking space can be detected based on the surroundings detection information IS. However, as the pylon is present as an obstacle on the travel route of the host vehicle 200 for making the host vehicle 200 move into that parking stall, this parking stall does not meet the aforementioned parkability conditions and therefore is not set as the parkable stall 30C.

However, even when the entrance of the parking space is closed with a shutter, if the parking space is a registered parking space 30S_reg, it is possible to confirm that that parking space is a registered parking space 30S_reg as well as grasp the position of the parking stall inside the parking space from the positional relationship among the brightness feature points of the ground on the front side of the shutter. Therefore, even when this parking stall is set as the designated parking stall 30*tgt*, the target move-in route Rin_tgt can be set, and the host vehicle 200 can be moved into the parking stall inside the parking space if the shutter is opened before the host vehicle 200 starts traveling.

Further, even when a pylon is placed at the entrance of the parking space, if the parking stall inside the parking space is demarcated by demarcation lines, the parking stall can be detected based on the surroundings detection information IS. Therefore, even when this parking stall is set as the designated parking stall 30*tgt*, the target move-in route Rin_tgt can be set, and the host vehicle 200 can be moved into the parking stall inside the parking space if the pylon is removed from the entrance before the host vehicle 200 starts traveling.

Of course, it is also possible for the driver to temporarily step out of the host vehicle 200, open the shutter or remove the pylon, then get into the host vehicle 200 again, and request execution of the remote move-in control by operating the remote move-in request operation device 249. Then, the parkable stall 30C is set and the designated parking stall 30*tgt* can be set, and consequently the host vehicle 200 can be moved into the parking stall. However, this forces the driver to go through trouble as well as reduces the flexibility for the timing of designating the designated parking stall 30*tgt*.

On the other hand, in a situation where the entrance of the parking space is closed with a shutter or a pylon is placed at the entrance of the parking space, even when the parking stall inside such a parking space is set as the designated parking stall 30*tgt*, the host vehicle 200 can be moved into the designated parking stall 30*tgt* if the driver steps out of the host vehicle 200 and opens the shutter or removes the pylon after the designated parking stall 30*tgt* is set. Thus, the flexibility for the timing of designating the designated parking stall 30*tgt* can be increased.

Operation of Vehicle Control Device

Therefore, the vehicle control device 210 is configured such that, even when there is an obstacle on the travel route of the host vehicle 200 and the parking stall 30 cannot be detected based on the surroundings detection information IS, if the obstacle is a movable obstacle, such as a shutter, the vehicle control device 210 detects brightness feature points based on the surroundings detection information IS. When it can be determined that the host vehicle 200 is stopped by the registered parking space 30S_reg based on the brightness feature points, the vehicle control device 210 sets the registered parking stall 30reg inside the registered parking space 30S_reg as the parkable stall 30C and displays the screen shown in FIG. 7 on the display device 260.

Further, the vehicle control device 210 is configured such that, in the case where there is an obstacle on the travel route of the host vehicle 200 and the obstacle is a movable obstacle, such as a pylon, and the parking stall 30 can be detected based on the surroundings detection information IS, the vehicle control device 210 sets the parking stall 30 as the parkable stall 30C and displays the screen shown in FIG. 7 on the display device 260, even when the conditions that the parking stall 30 has no other vehicle parked therein, that the parking stall 30 has enough space for parking the host vehicle 200, and that a route for making the host vehicle 200 travel to move into the parking stall 30 (target move-in route Rin_tgt) can be set are met but the condition that there is no obstacle on the target move-in route Rin_tgt is not met and therefore the parkability conditions are not met.

When touch operation is performed on the parkable stall image portion P30C, the vehicle control device 210 displays the screen shown in FIG. 8A on the display device 260. Then, when touch operation is performed on the forward move-in selection image portion P23in_fwd or the rearward move-in selection image portion P23in_rwd, the vehicle control device 210 displays the screen shown in FIG. 8B on the display device 260 and wirelessly transmits an obstacle notification signal to the outside.

Operation of Terminal Control Device

When the driver steps out of the host vehicle 200 and performs predetermined operation (application start operation) on the terminal display 120 of the operation terminal 100, the terminal control device 110 starts the remote travel application in response to the application start operation and receives the obstacle notification signal transmitted from the vehicle control device 210.

Figure 33:
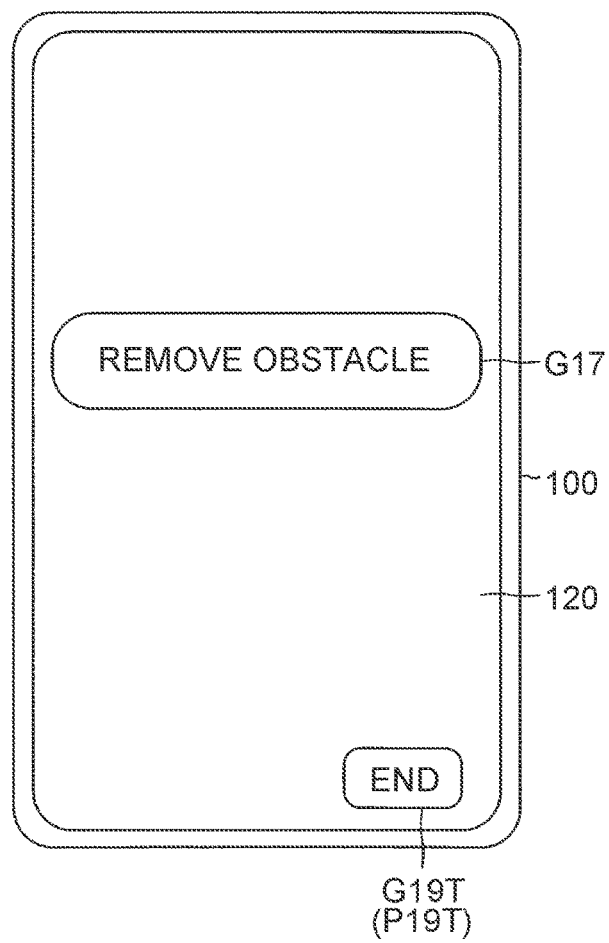
FIG. 33 is a view showing the operation terminal displaying an image for prompting the user to remove an obstacle, etc. on the terminal display.

When the terminal control device 110 receives the obstacle notification signal, the terminal control device 110 displays the screen shown in FIG. 33 on the terminal display 120 before displaying the screen shown in FIG. 9 on the terminal display 120. Specifically, the terminal control device 110 displays an obstacle notification image G17 and the end image G19T on the terminal display 120. The obstacle notification image G17 is an image notifying the terminal user that an obstacle, such as the shutter 401 or the pylon 402, should be removed from the entrance of the parking space. Thus, the remote travel system 10 is configured such that the terminal control device 110 performs a notification process of notifying that there is an obstacle on the travel route of the host vehicle 200.

Operation of Vehicle Control Device

When the terminal user removes the obstacle, such as the shutter 401 or the pylon 402, from the entrance of the parking space, the vehicle control device 210 detects that there is no obstacle, such as the shutter 401 or the pylon 402, at the entrance of the parking space based on the surroundings detection information IS.

When the vehicle control device 210 detects that there is no obstacle, such as the shutter 401 or the pylon 402, at the entrance of the parking space, the vehicle control device 210 wirelessly transmits an initial screen display permission signal to the outside.

Operation of Terminal Control Device

When the terminal control device 110 receives the initial screen display permission signal, the terminal control device 110 displays the screen shown in FIG. 9 on the terminal display 120.

Operation of Vehicle Control Device and Terminal Control Device

Subsequently, the terminal control device 110 and the vehicle control device 210 operate as described above to move the host vehicle 200 into the designated parking stall 30tgt.

Forward and Rearward Movement of Host Vehicle

Operation of Vehicle Control Device

Figure 34:
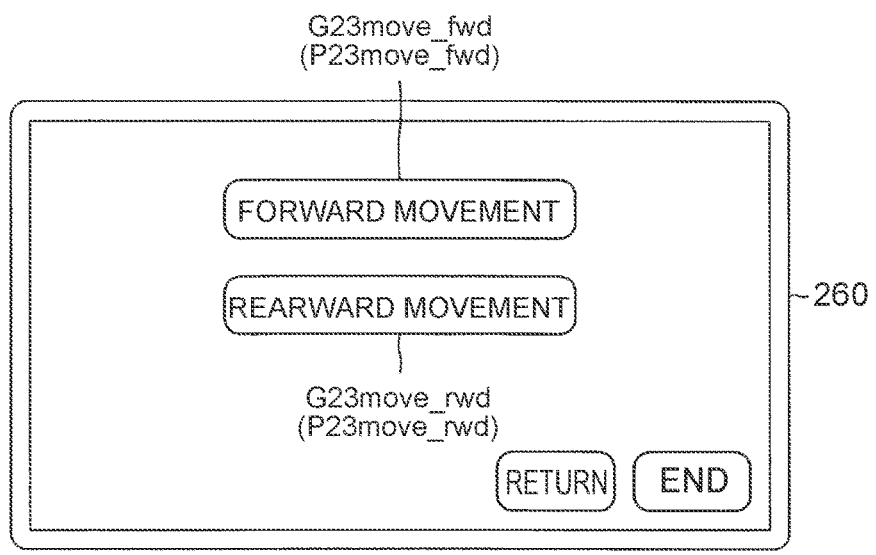
FIG. 34 is a view showing the operation terminal displaying a forward movement selection image, a rearward movement selection image, etc. on the terminal display.

The vehicle control device 210 may be configured to execute remote movement control of moving the host vehicle 200 forward or rearward over a predetermined distance (predetermined moving distance) in the case where, when execution of the remote move-in control is requested, it cannot be determined that there is a registered parking space 30S_reg near the host vehicle 200 based on brightness feature points and moreover the parking stall 30 cannot be detected based on the surroundings detection information IS. In this case, the vehicle control device 210 displays the screen shown in FIG. 34 on the display device 260 to let the driver select whether to move the host vehicle 200 forward or rearward over the predetermined moving distance. Specifically, the vehicle control device 210 displays a forward movement image G23move_fwd, a rearward movement image G23move_rwd, the previous screen image G19R, and the end image G19T on the display device 260. The forward movement image G23move_fwd is an image displaying characters "forward movement," and a portion of the display device 260 displaying this image (forward movement image portion P23move_fwd) is a portion that receives touch operation. The rearward movement image G23move_rwd is an image displaying characters "rearward movement," and a portion of the display device 260 displaying this image (rearward movement image portion P23move_rwd) is a portion that receives touch operation.

When touch operation is performed on the forward movement image portion P23move_fwd, the vehicle control device 210 wirelessly transmits a forward movement selection signal to the outside. On the other hand, when touch operation is performed on the rearward movement image portion P23move_rwd, the vehicle control device 210 wirelessly transmits a rearward movement selection signal to the outside.

Operation of Terminal Control Device

Figure 35:
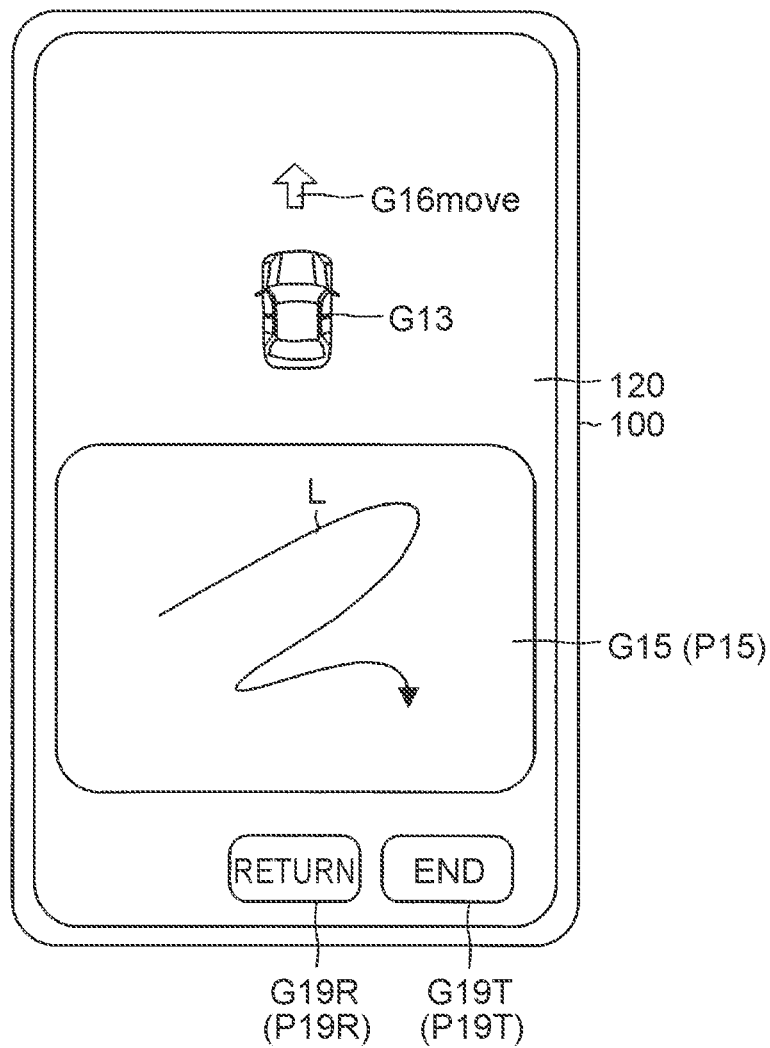
FIG. 35 is a view showing the operation terminal displaying, on the terminal display, a screen that appears when the host vehicle is to be moved forward by the remote travel control.

When the terminal control device 110 receives the forward movement selection signal, the terminal control device 110 displays the screen shown in FIG. 35 on the terminal display 120. Specifically, the terminal control device 110 displays the vehicle image G13, a moving direction image G16move, the travel operation image G15, the previous screen image G19R, and the end image G19T on the terminal display 120. The moving direction image G16move is an image displaying the moving direction of the host vehicle 200, and the moving direction image G16move shown in FIG. 35 is an image displaying the forward direction.

When predetermined touch operation is performed on the travel operation image portion P15 as indicated by line L in FIG. 35, the terminal control device 110 wirelessly transmits a continuous touch operation signal to the outside.

Operation of Vehicle Control Device

When the vehicle control device 210 receives the continuous touch operation signal, the vehicle control device 210 performs the vehicle travel process of making the host vehicle 200 travel by controlling the operation of the vehicle travel device 220. In this case, by the vehicle travel process, the vehicle control device 210 changes the shift state of the transmission device 224 to the forward drive state and moves the host vehicle 200 forward. While receiving the continuous touch operation signal, the vehicle control device 210 performs the vehicle travel process such that the host vehicle 200 moves forward.

On the other hand, when the vehicle control device 210 stops receiving the continuous touch operation signal, the vehicle control device 210 performs the vehicle stopping process of temporarily stopping the host vehicle 200 by the braking device 222.

During the period from when the continuous touch operation signal starts to be received until movement of the host vehicle 200 over the predetermined moving distance is completed, the vehicle control device 210 wirelessly transmits a remaining distance signal to the outside at predetermined time intervals. The remaining distance signal is a signal showing the remaining distance for moving the host vehicle 200 over the predetermined moving distance (remaining moving distance Dmove).

Operation of Terminal Control Device

Figure 36:
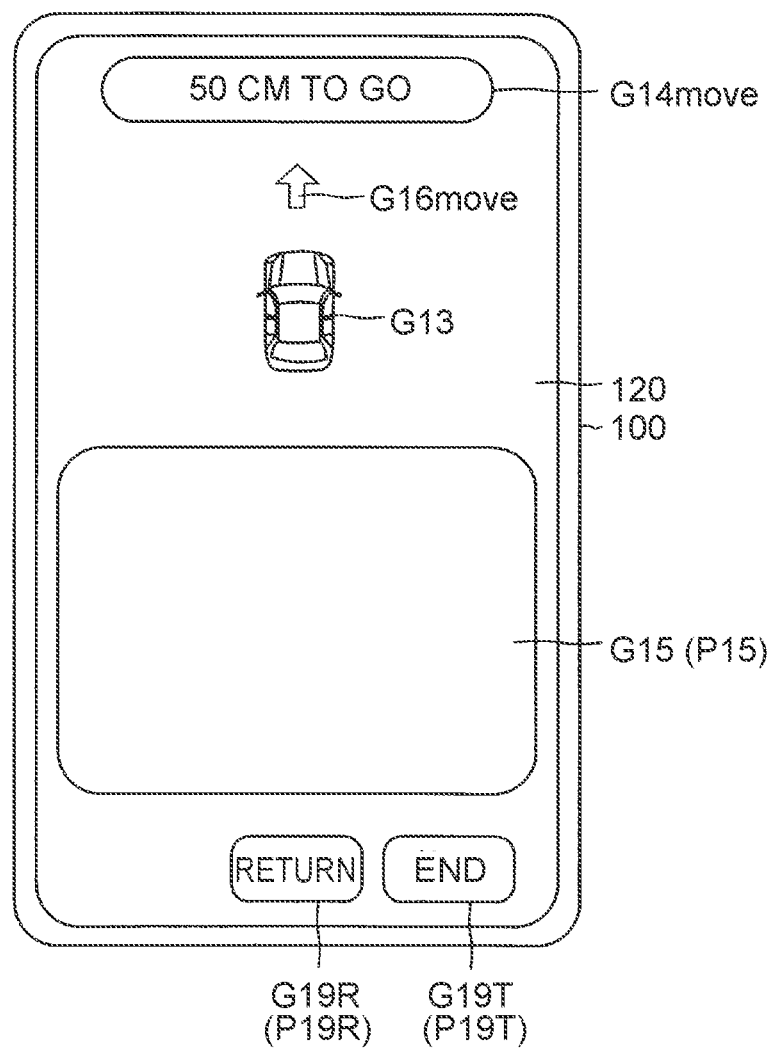
FIG. 36 is a view showing the operation terminal displaying, on the terminal display, a screen that appears when the host vehicle is being moved forward by the remote travel control.

When the terminal control device 110 receives the remaining distance signal, as shown in FIG. 36, the terminal control device 110 displays a remaining moving distance image G14move that displays the remaining moving distance Dmove shown by the remaining distance signal on the terminal display 120.

Operation of Vehicle Control Device

After moving the host vehicle 200 over the predetermined moving distance, the vehicle control device 210 stops the host vehicle 200 by the vehicle stopping process, further holds the host vehicle 200 in a stopped state by the vehicle stop holding process, and ends the remote move-in or -out control.

When movement of the host vehicle 200 is completed, the vehicle control device 210 wirelessly transmits a movement completion signal to the outside. The movement completion signal is a signal showing that movement of the host vehicle 200 over the predetermined moving distance is completed.

Operation of Terminal Control Device

Figure 37:
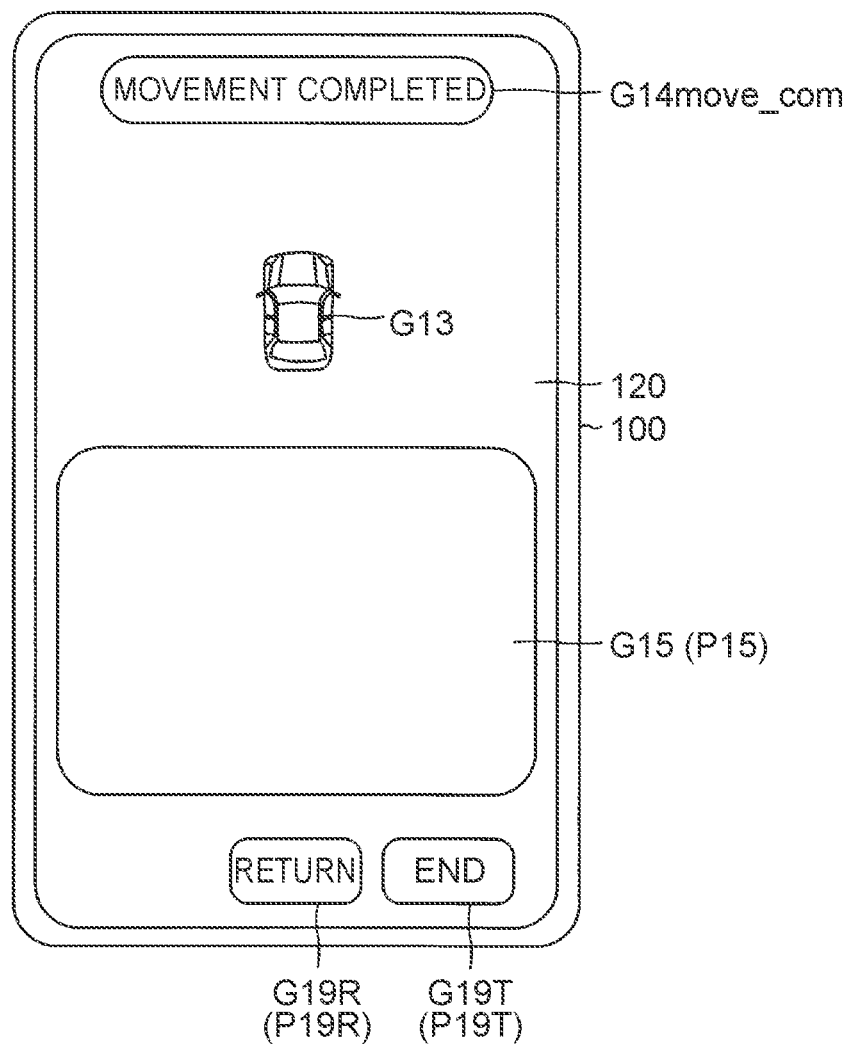
FIG. 37 is a view showing the operation terminal displaying, on the terminal display, a screen that appears when forward movement of the host vehicle by the remote travel control is completed.

When the terminal control device 110 receives the movement completion signal, as shown in FIG. 37, the terminal control device 110 displays a movement completion image G14move_com on the terminal display 120 to let the terminal user know that movement of the host vehicle 200 is completed. The movement completion image G14move_com is an image showing that movement of the host vehicle 200 is completed.

Operation of Terminal Control Device

Figure 38:
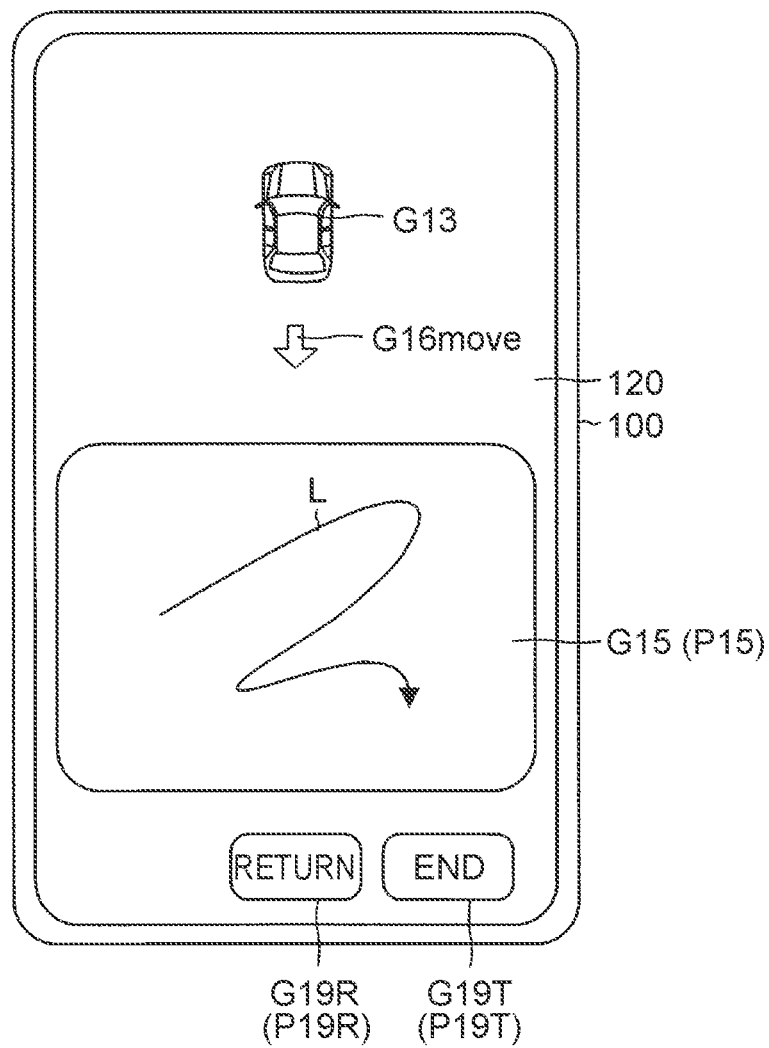
FIG. 38 is a view showing the operation terminal displaying, on the terminal display, a screen that appears when the host vehicle is to be moved rearward by the remote travel control.

On the other hand, when the terminal control device 110 receives the rearward movement selection signal, the terminal control device 110 displays the screen shown in FIG. 38 on the terminal display 120. Specifically, the terminal control device 110 displays the vehicle image G13, the moving direction image G16move, the travel operation image G15, the previous screen image G19R, and the end image G19T on the terminal display 120. The moving direction image G16move shown in FIG. 38 is an image displaying the rearward direction.

When predetermined touch operation is performed on the travel operation image portion P15, the terminal control device 110 wirelessly transmits a continuous touch operation signal to the outside.

Operation of Vehicle Control Device

When the vehicle control device 210 receives the continuous touch operation signal, the vehicle control device 210 performs the vehicle travel process of making the host vehicle 200 travel by controlling the operation of the vehicle travel device 220. In this case, by the vehicle travel process, the vehicle control device 210 changes the shift state of the transmission device 224 to the rearward moving state and makes the host vehicle 200 move rearward. While receiving the continuous touch operation signal, the vehicle control device 210 performs the vehicle travel process such that the host vehicle 200 moves rearward.

On the other hand, when the vehicle control device 210 stops receiving the continuous touch operation signal, the vehicle control device 210 performs the vehicle stopping process of temporarily stopping the host vehicle 200 by the braking device 222.

During the period from when the continuous touch operation signal starts to be received until movement of the host vehicle 200 over the predetermined moving distance is completed, the vehicle control device 210 wirelessly transmits a remaining distance signal to the outside at predetermined time intervals. The remaining distance signal is a signal showing a remaining distance for moving the host vehicle 200 over the predetermined moving distance (remaining moving distance Dmove).

Operation of Terminal Control Device

Figure 39:
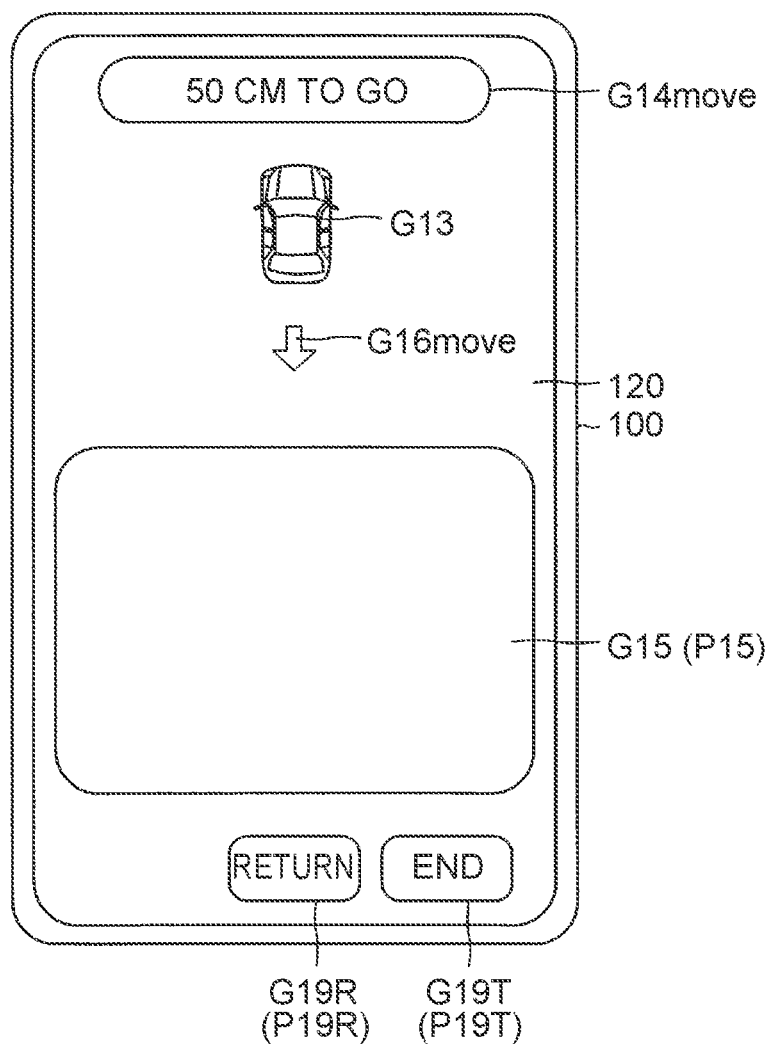
FIG. 39 is a view showing the operation terminal displaying, on the terminal display, a screen that appears when the host vehicle is being moved rearward by the remote travel control.

When the terminal control device 110 receives the remaining distance signal, as shown in FIG. 39, the terminal control device 110 displays the remaining moving distance image G14move that displays the remaining moving distance Dmove shown by the remaining distance signal on the terminal display 120.

Operation of Vehicle Control Device

After moving the host vehicle 200 over the predetermined moving distance, the vehicle control device 210 stops the host vehicle 200 by the vehicle stopping process, further holds the host vehicle 200 in a stopped state by the vehicle stop holding process, and ends the remote move-in or -out control.

When movement of the host vehicle 200 is completed, the vehicle control device 210 wirelessly transmits a movement completion signal to the outside. The movement completion signal is a signal showing that movement of the host vehicle 200 over the predetermined moving distance is completed.

Operation of Terminal Control Device

Figure 40:
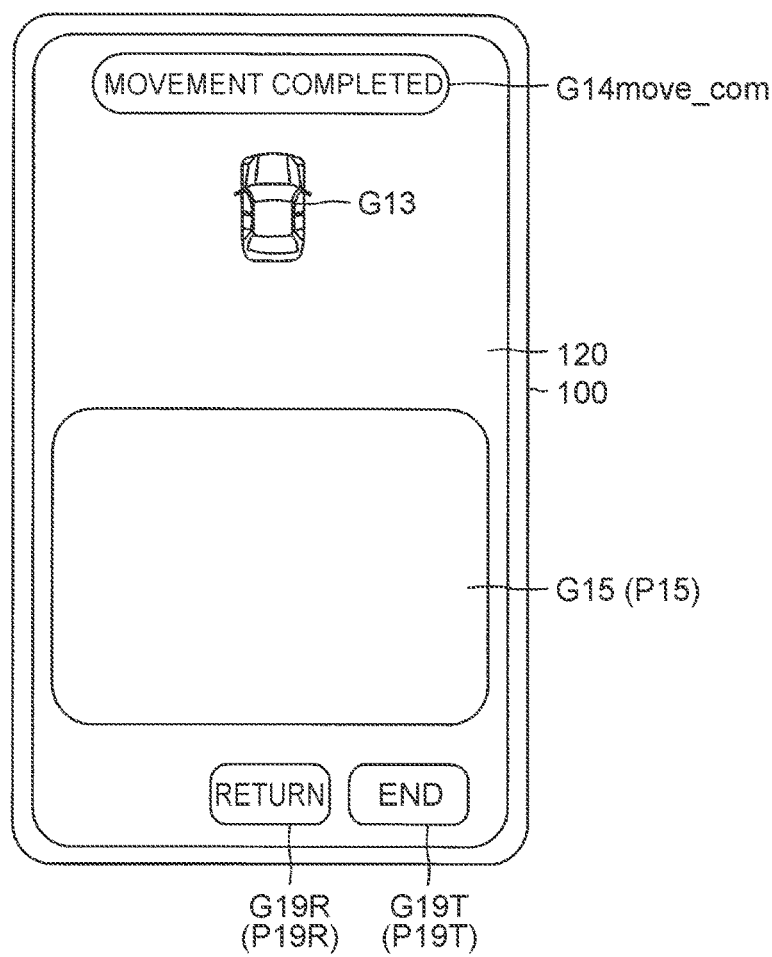
FIG. 40 is a view showing the operation terminal displaying, on the terminal display, a screen that appears when rearward movement of the host vehicle by the remote travel control is completed.

When the terminal control device 110 receives the movement completion signal, as shown in FIG. 40, the terminal control device 110 displays the movement completion image G14move_com on the terminal display 120 to let the terminal user know that movement of the host vehicle 200 is completed. The movement completion image G14move_com is an image showing that movement of the host vehicle 200 is completed.

The above is an overview of the operation of the remote travel system 10. In the remote travel system 10, even when there is an obstacle on the travel route of the host vehicle 200 for moving the host vehicle 200 into a parking stall 30, that parking stall 30 can be designated as the designated parking stall 30tgt. Thus, the flexibility for the timing of designating the designated parking stall 30tgt can be increased.

Specific Operation of Remote Travel System

Next, the specific operation of the remote travel system 10 will be described.

Figure 41:
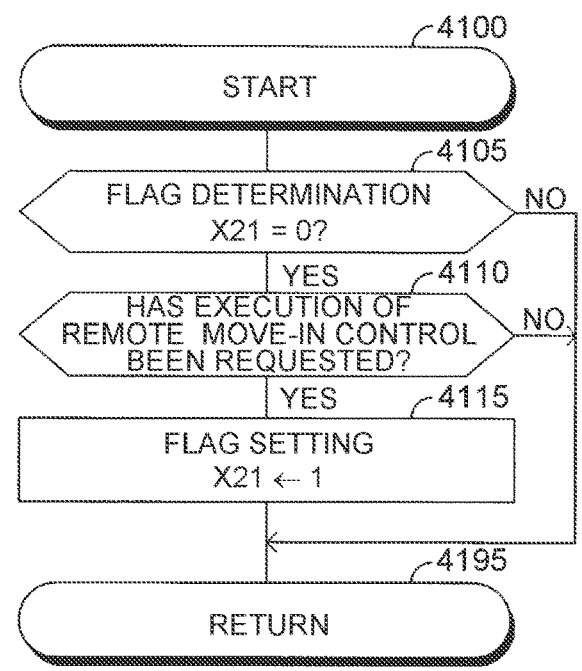
FIG. 41 is a flowchart showing a routine executed by the vehicle control device according to the embodiment of the disclosure.

The vehicle CPU 291 of the vehicle ECU 290 of the vehicle control device 210 is configured to execute the routine shown in FIG. 41 in a predetermined arithmetic operation cycle. Therefore, when a predetermined timing comes, the vehicle CPU 291 starts the processing of the routine shown in FIG. 41 from step 4100 and proceeds with the processing to step 4105, where it determines whether the value of a first vehicle flag X21 is "0."

When the vehicle CPU 291 determines "Yes" in step 4105, the vehicle CPU 291 proceeds with the processing to step 4110 and determines whether execution of the remote move-in control has been requested. When the vehicle CPU 291 determines "Yes" in step 4110, the vehicle CPU 291 proceeds with the processing to step 4115 and sets the value of the first vehicle flag X21 to "1." Then, the vehicle CPU 291 proceeds with the processing to step 4195 and temporarily ends the processing of this routine.

On the other hand, when the vehicle CPU 291 determines "No" in step 4105 or step 4110, the vehicle CPU 291 proceeds with the processing directly to step 4195 and temporarily ends the processing of this routine.

Figure 42:
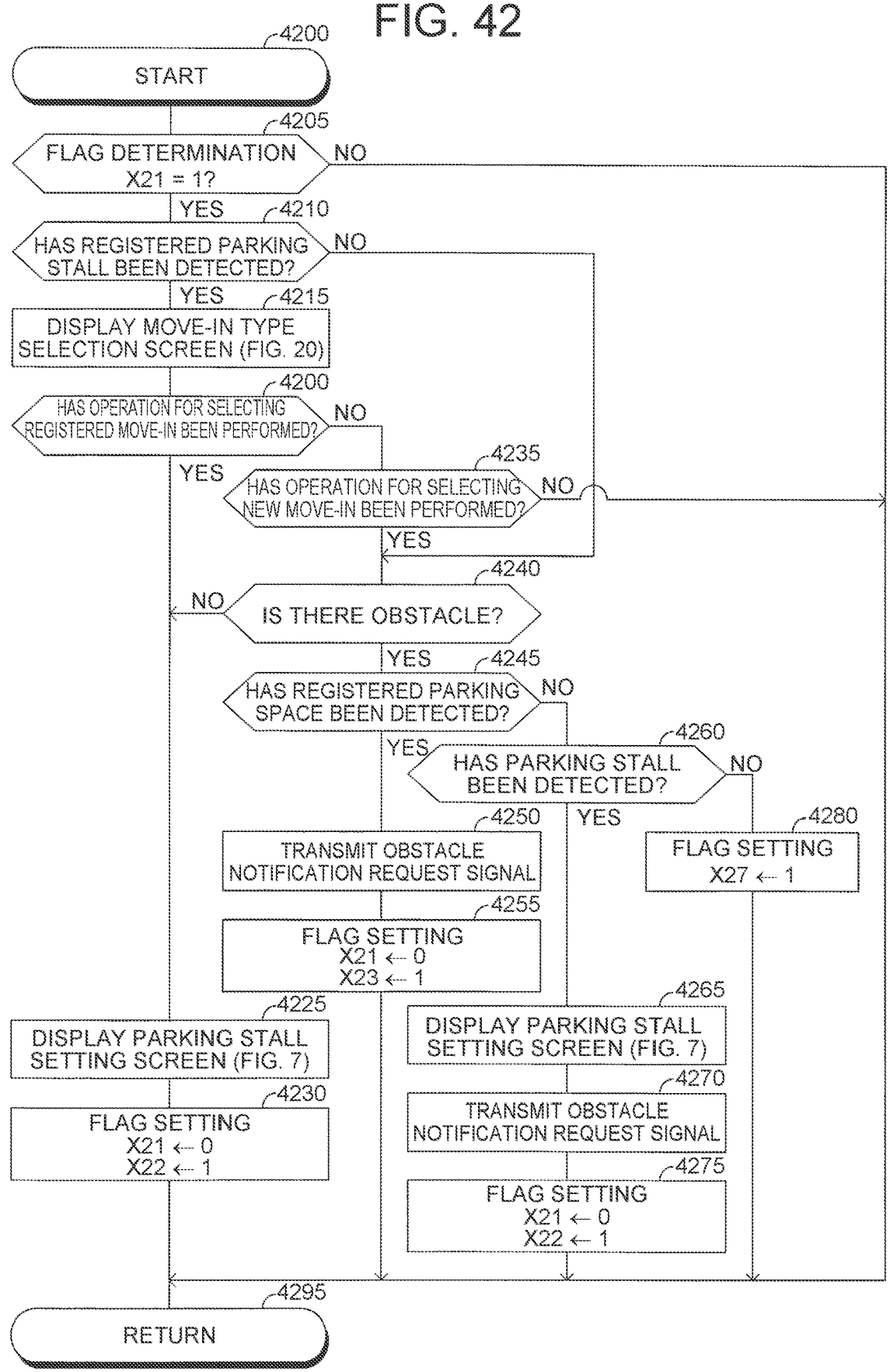
FIG. 42 is a flowchart showing a routine executed by the vehicle control device according to the embodiment of the disclosure.

Further, the vehicle CPU 291 is configured to execute the routine shown in FIG. 42 in a predetermined arithmetic operation cycle. Therefore, when a predetermined timing comes, the vehicle CPU 291 starts the processing of the routine shown in FIG. 42 from step 4200 and proceeds with the processing to step 4205, where it determines whether the value of the first vehicle flag X21 is "1." When the vehicle CPU 291 determines "Yes" in step 4205, the vehicle CPU 291 proceeds with the processing to step 4210 and determines whether the registered parking stall 30reg has been detected. When the vehicle CPU 291 determines "Yes" in step 4210, the vehicle CPU 291 proceeds with the processing to step 4215 and displays the screen shown in FIG. 20 on the display device 260. Then, the vehicle CPU 291 proceeds with the processing to step 4220 and determines whether touch operation has been performed on the registered move-in selection image portion P23in_reg.

When the vehicle CPU 291 determines "Yes" in step 4220, the vehicle CPU 291 proceeds with the processing to step 4225 and displays the screen shown in FIG. 7 on the display device 260. Then, the vehicle CPU 291 proceeds with the processing to step 4230, sets the value of the first vehicle flag X21 to "0," and sets the value of a second vehicle flag X22 to "1." Then, the vehicle CPU 291 proceeds with the processing to step 4295 and temporarily ends the processing of this routine.

On the other hand, when the vehicle CPU 291 determines "No" in step 4220, the vehicle CPU 291 proceeds with the processing to step 4235 and determines whether touch operation has been performed on the new move-in selection image portion P23in_new. When the vehicle CPU 291 determines "Yes" in step 4235, the vehicle CPU 291 proceeds with the processing to step 4240 and determines whether there is an obstacle on the travel route of the host vehicle 200. When the vehicle CPU 291 determines "Yes" in step 4240, the vehicle CPU 291 proceeds with the processing to step 4245 and determines whether the registered parking space 30S_reg has been detected.

When the vehicle CPU 291 determines "Yes" in step 4245, the vehicle CPU 291 proceeds with the processing to step 4250 and wirelessly transmits an obstacle notification request signal to the outside. Then, the vehicle CPU 291 proceeds with the processing to step 4255, sets the value of the first vehicle flag X21 to "0," and sets the value of a third vehicle flag X23 to "1." Then, the vehicle CPU 291 proceeds with the processing to step 4295 and temporarily ends the processing of this routine.

On the other hand, when the vehicle CPU 291 determines "No" in step 4245, the vehicle CPU 291 proceeds with the processing to step 4260 and determines whether a parking stall 30 has been detected. When the vehicle CPU 291 determines "Yes" in step 4260, the vehicle CPU 291 proceeds with the processing to step 4265 and displays the screen shown in FIG. 7 on the display device 260. Then, the vehicle CPU 291 proceeds with the processing to step 4270 and wirelessly transmits an obstacle notification request signal to the outside. Then, the vehicle CPU 291 proceeds with the processing to step 4275, sets the value of the first vehicle flag X21 to "0," and sets the value of the second vehicle flag X22 to "1." Then, the vehicle CPU 291 proceeds with the processing to step 4295 and temporarily ends the processing of this routine.

On the other hand, when the vehicle CPU 291 determines "No" in step 4260, the vehicle CPU 291 proceeds with the processing to step 4280 and sets the value of a seventh vehicle flag X27 to "1." Then, the vehicle CPU 291 proceeds with the processing to step 4295 and temporarily ends the processing of this routine.

When the vehicle CPU 291 determines "No" in step 4240, the vehicle CPU 291 executes the processing of step 4225 and the subsequent steps as described above, and temporarily ends the processing of this routine.

When the vehicle CPU 291 determines "No" in step 4235, the vehicle CPU 291 proceeds with the processing directly to step 4295 and temporarily ends the processing of this routine.

When the vehicle CPU 291 determines "No" in step 4210, the vehicle CPU 291 executes the processing of step 4240 and the subsequent steps as described above, and temporarily ends the processing of this routine.

When the vehicle CPU 291 determines "No" in step 4205, the vehicle CPU 291 proceeds with the processing directly to step 4295 and temporarily ends the processing of this routine.

Figure 43:
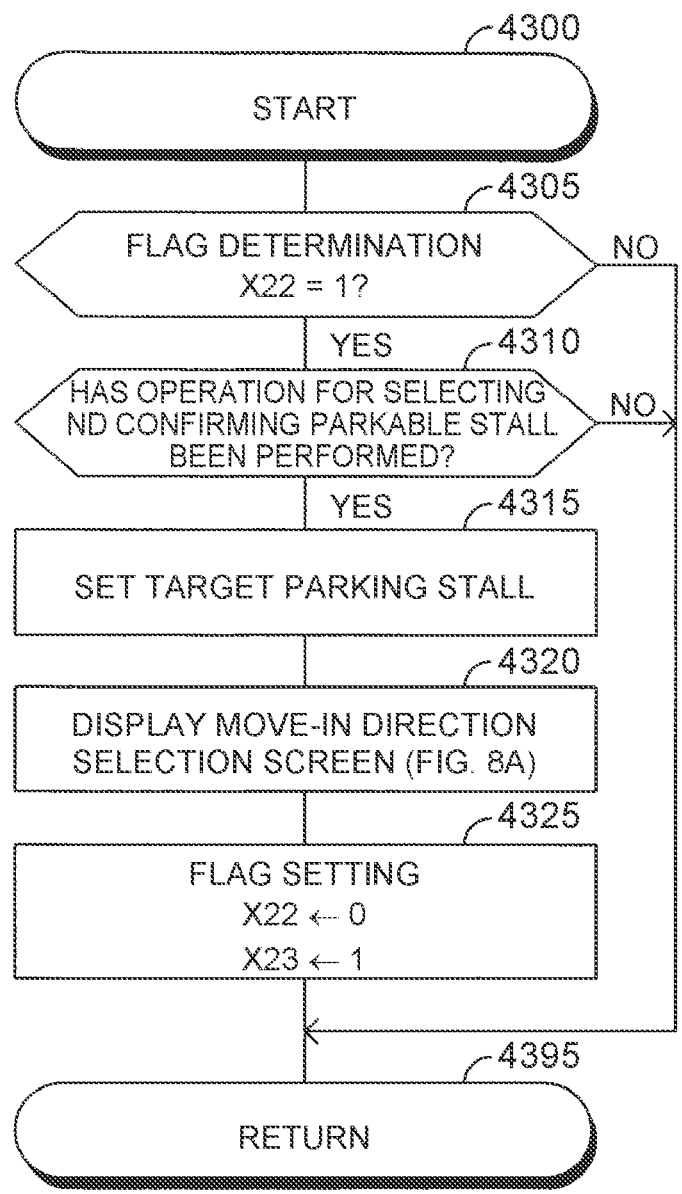
FIG. 43 is a flowchart showing a routine executed by the vehicle control device according to the embodiment of the disclosure.

Further, the vehicle CPU 291 is configured to execute the routine shown in FIG. 43 in a predetermined arithmetic operation cycle. Therefore, when a predetermined timing comes, the vehicle CPU 291 starts the processing of the routine shown in FIG. 43 from step 4300 and proceeds with the processing to step 4305, where it determines whether the value of the second vehicle flag X22 is "1." When the vehicle CPU 291 determines "Yes" in step 4305, the vehicle CPU 291 proceeds with the processing to step 4310 and determines whether touch operation has been performed on a parkable stall image portion P30C and subsequently touch operation has been performed on the selection confirmation image portion P29F.

When the vehicle CPU 291 determines "Yes" in step 4310, the vehicle CPU 291 proceeds with the processing to step 4315 and sets the designated parking stall 30tgt. Then, the vehicle CPU 291 proceeds with the processing to step 4320 and displays the screen shown in FIG. 8A on the display device 260. Then, the vehicle CPU 291 proceeds with the processing to step 4325, sets the value of the second vehicle flag X22 to "0," and sets the value of the third vehicle flag X23 to "1." Then, the vehicle CPU 291 proceeds with the processing to step 4395 and temporarily ends the processing of this routine.

On the other hand, when the vehicle CPU 291 determines "No" in step 4305 or step 4310, the vehicle CPU 291 proceeds with the processing directly to step 4395 and temporarily ends the processing of this routine.

Figure 44:
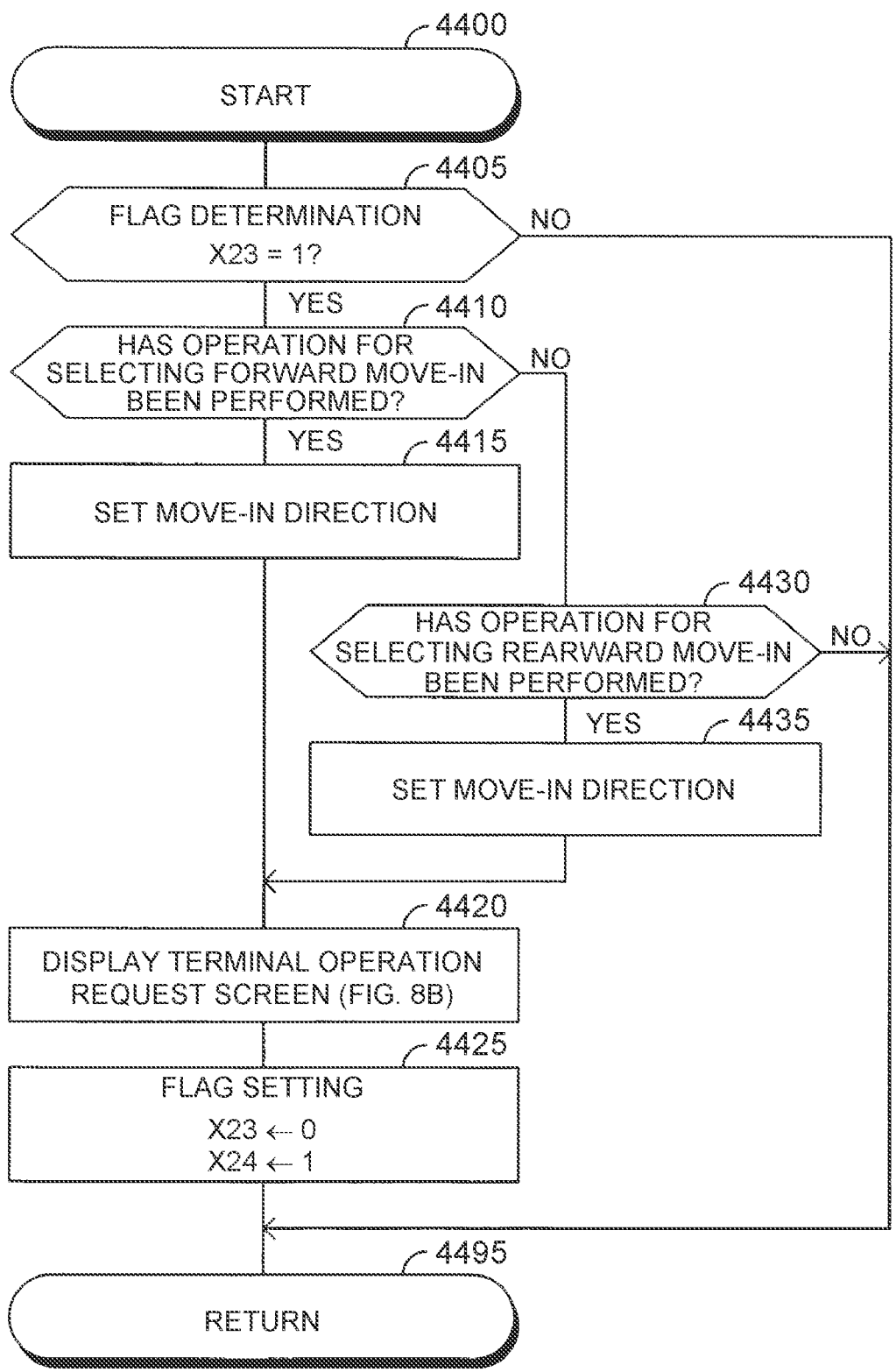
FIG. 44 is a flowchart showing a routine executed by the vehicle control device according to the embodiment of the disclosure.

Further, the vehicle CPU 291 is configured to execute the routine shown in FIG. 44 in a predetermined arithmetic operation cycle. Therefore, when a predetermined timing comes, the vehicle CPU 291 starts the processing of the routine shown in FIG. 44 from step 4400 and proceeds with the processing to step 4405, where it determines whether the value of the third vehicle flag X23 is "1." When the vehicle CPU 291 determines "Yes" in step 4405, the vehicle CPU 291 proceeds with the processing to step 4410 and determines whether touch operation has been performed on the forward move-in selection image portion P23in_fwd.

When the vehicle CPU 291 determines "Yes" in step 4410, the vehicle CPU 291 proceeds with the processing to step 4415 and sets the forward direction as the move-in direction. Then, the vehicle CPU 291 proceeds with the processing to step 4420 and displays the screen shown in FIG. 8B on the display device 260. Then, the vehicle CPU 291 proceeds with the processing to step 4425, sets the value of the third vehicle flag X23 to "0," and sets the value of a fourth vehicle flag X24 to "1." Then, the vehicle CPU 291 proceeds with the processing to step 4495 and temporarily ends the processing of this routine.

On the other hand, when the vehicle CPU 291 determines "No" in step 4410, the vehicle CPU 291 proceeds with the processing to step 4430 and determines whether touch operation has been performed on the rearward move-in selection image portion P23in_rwd. When the vehicle CPU 291 determines "Yes" in step 4430, the vehicle CPU 291 proceeds with the processing to step 4435 and sets the rearward direction as the move-in direction. Then, the vehicle CPU 291 executes the processing of step 4420 and the subsequent steps as described above, and temporarily ends the processing of this routine.

On the other hand, when the vehicle CPU 291 determines "No" in step 4430, the vehicle CPU 291 proceeds with the processing to step 4495 and temporarily ends the processing of this routine.

When the vehicle CPU 291 determines "No" in step 4405 also, the vehicle CPU 291 proceeds with the processing to step 4495 and temporarily ends the processing of this routine.

Figure 45:
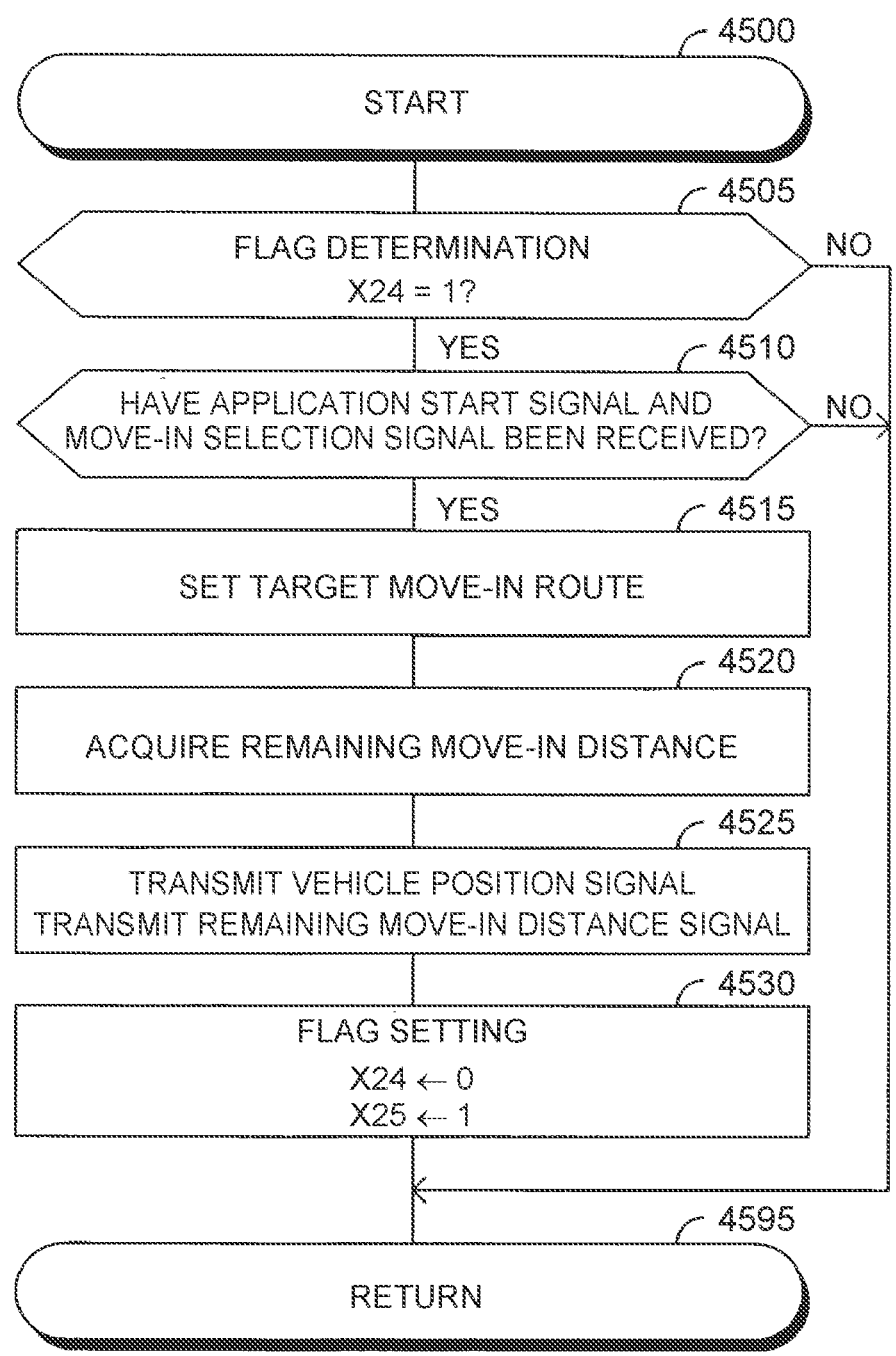
FIG. 45 is a flowchart showing a routine executed by the vehicle control device according to the embodiment of the disclosure.

Further, the vehicle CPU 291 is configured to execute the routine shown in FIG. 45 in a predetermined arithmetic operation cycle. Therefore, when a predetermined timing comes, the vehicle CPU 291 starts the processing of the routine shown in FIG. 45 from step 4500 and proceeds with the processing to step 4505, where it determines whether the value of the fourth vehicle flag X24 is "1." When the vehicle CPU 291 determines "Yes" in step 4505, the vehicle CPU 291 proceeds with the processing to step 4510 and determines whether an application start signal and a move-in selection signal have been received.

When the vehicle CPU 291 determines "Yes" in step 4510, the vehicle CPU 291 proceeds with the processing to step 4515 and sets the target move-in route Rin_tgt. Then, the vehicle CPU 291 proceeds with the processing to step 4520 and acquires the remaining move-in distance Din. Then, the vehicle CPU 291 proceeds with the processing to step 4525 and wirelessly transmits a vehicle position signal and a remaining move-in distance signal to the outside. Then, the vehicle CPU 291 proceeds with the processing to step 4530, sets the value of the fourth vehicle flag X24 to "0," and sets the value of a fifth vehicle flag X25 to "1." Then, the vehicle CPU 291 proceeds with the processing to step 4595 and temporarily ends the processing of this routine.

On the other hand, when the vehicle CPU 291 determines "No" in step 4505 or step 4510, the vehicle CPU 291 proceeds with the processing directly to step 4595 and temporarily ends the processing of this routine.

Figure 46:
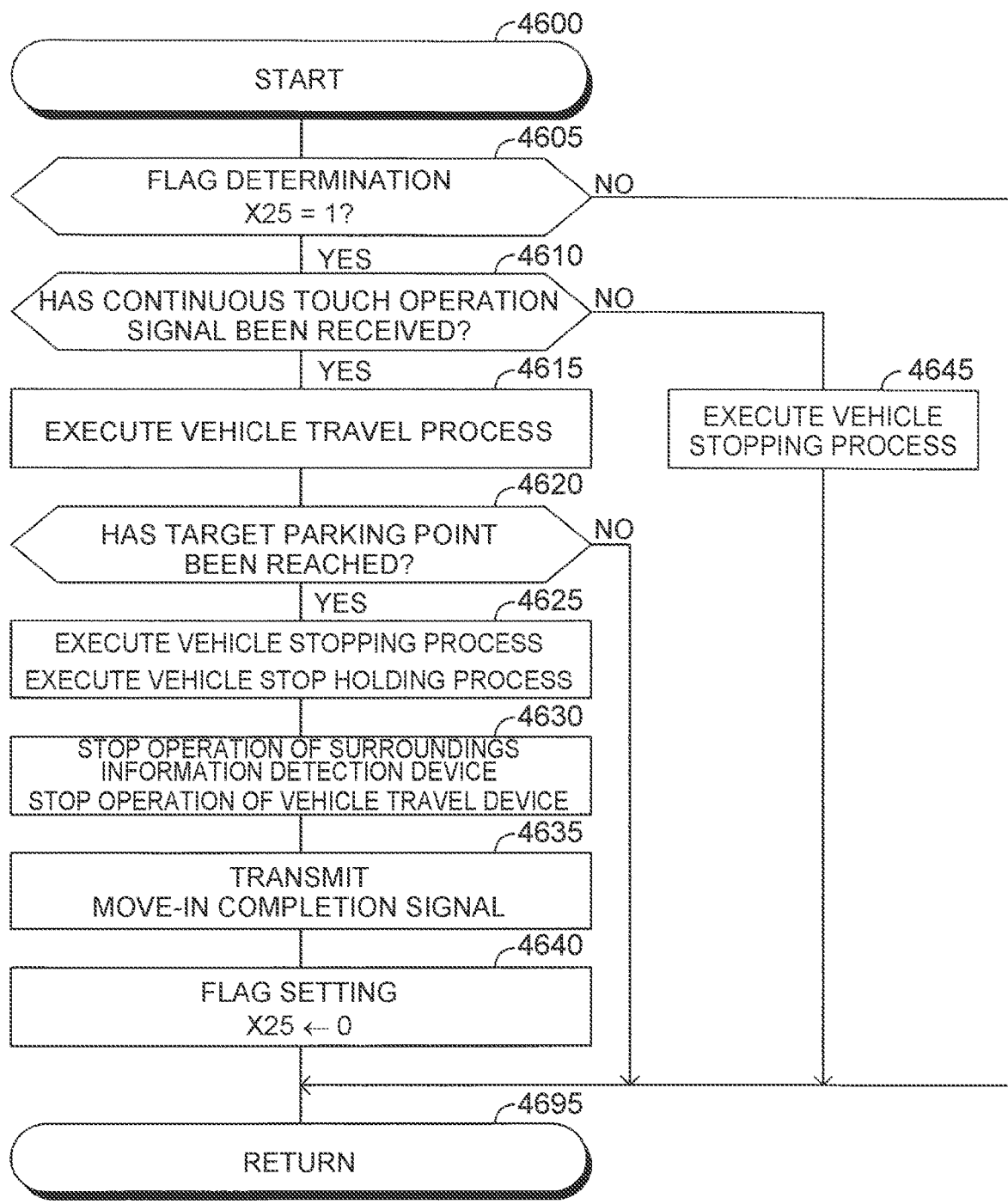
FIG. 46 is a flowchart showing a routine executed by the vehicle control device according to the embodiment of the disclosure.

Further, the vehicle CPU 291 is configured to execute the routine shown in FIG. 46 in a predetermined arithmetic operation cycle. Therefore, when a predetermined timing comes, the vehicle CPU 291 starts the processing of the routine shown in FIG. 46 from step 4600 and proceeds with the processing to step 4605, where it determines whether the value of the fifth vehicle flag X25 is set to "1." When the vehicle CPU 291 determines "Yes" in step 4605, the vehicle CPU 291 proceeds with the processing to step 4610 and determines whether continuous touch operation signal has been received. When the vehicle CPU 291 determines "Yes" in step 4610, the vehicle CPU 291 proceeds with the processing to step 4615 and executes the vehicle travel process. Then, the vehicle CPU 291 proceeds with the processing to step 4620 and determines whether the host vehicle 200 has reached the target parking point Pin_tgt.

When the vehicle CPU 291 determines "Yes" in step 4620, the vehicle CPU 291 proceeds with the processing to step 4625 and executes the vehicle stopping process and the vehicle stop holding process. Then, the vehicle CPU 291 proceeds with the processing to step 4630 and stops the operation of the surroundings information detection device 270 and the vehicle travel device 220. Then, the vehicle CPU 291 proceeds with the processing to step 4635 and wirelessly transmits a move-in completion signal to the outside. Then, the vehicle CPU 291 proceeds with the processing to step 4640 and sets the value of the fifth vehicle flag X25 to "0." Then, the vehicle CPU 291 proceeds with the processing to step 4695 and temporarily ends the processing of this routine.

On the other hand, when the vehicle CPU 291 determines "No" in step 4620, the vehicle CPU 291 proceeds with the processing directly to step 4695 and temporarily ends the processing of this routine.

When the vehicle CPU 291 determines "No" in step 4610, the vehicle CPU 291 proceeds with the processing to step 4645 and executes the vehicle stopping process. Then, the vehicle CPU 291 proceeds with the processing to step 4695 and temporarily ends the processing of this routine.

When the vehicle CPU 291 determines "No" in step 4605, the vehicle CPU 291 proceeds with the processing directly to step 4695 and temporarily ends the processing of this routine.

Figure 47:
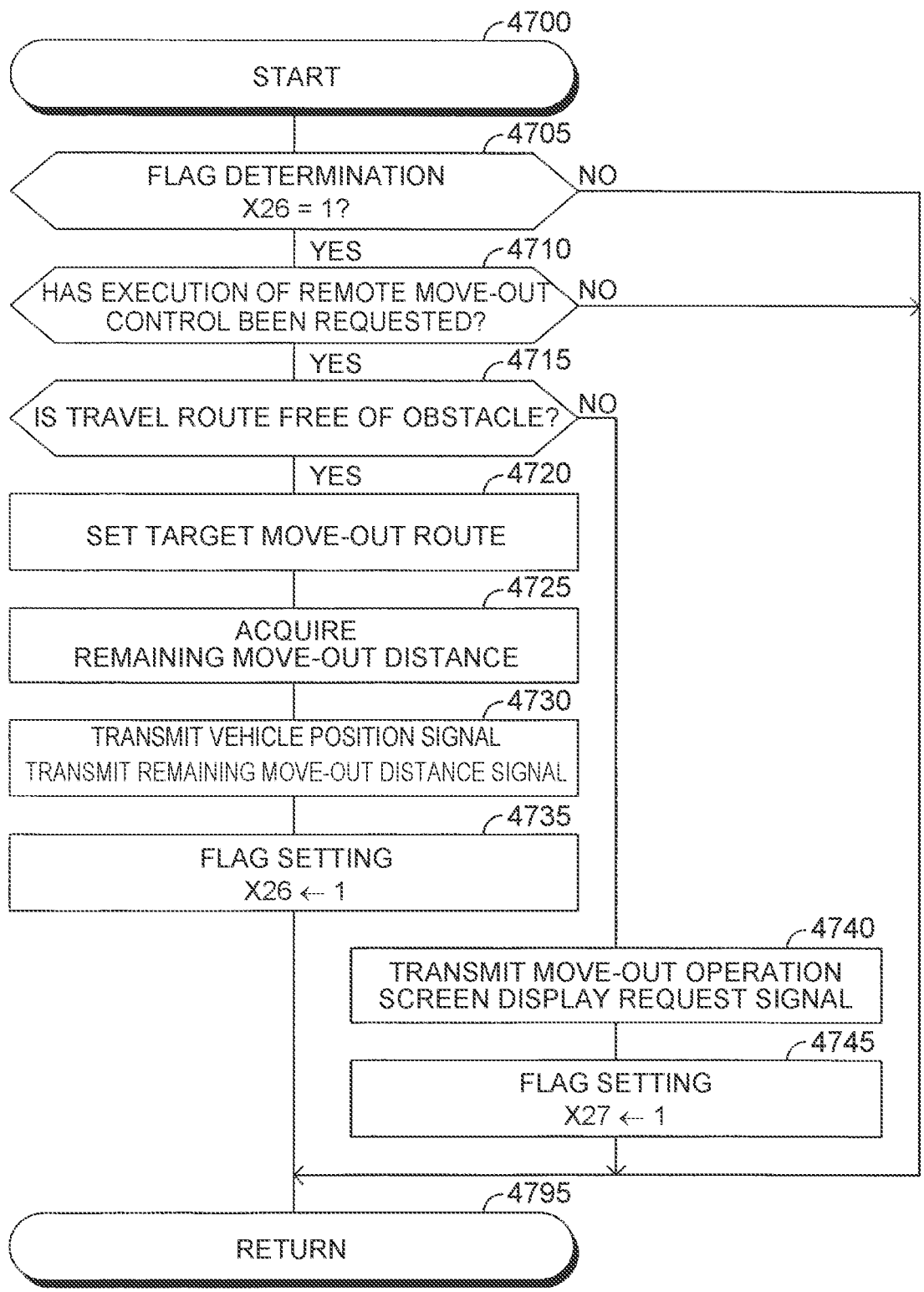
FIG. 47 is a flowchart showing a routine executed by the vehicle control device according to the embodiment of the disclosure.

Further, the vehicle CPU 291 is configured to execute the routine shown in FIG. 47 in a predetermined arithmetic operation cycle. Therefore, when a predetermined timing comes, the vehicle CPU 291 starts the processing of the routine shown in FIG. 47 from step 4700 and proceeds with the processing to step 4705, where it determines whether the value of a sixth vehicle flag X26 is "0." When the vehicle CPU 291 determines "Yes" in step 4705, the vehicle CPU 291 proceeds with the processing to step 4710 and determines whether execution of the remote move-out control has been requested. When the vehicle CPU 291 determines "Yes" in step 4710, the vehicle CPU 291 proceeds with the processing to step 4715 and determines whether there is an obstacle on the travel route of the host vehicle 200.

When the vehicle CPU 291 determines "Yes" in step 4715, the vehicle CPU 291 proceeds with the processing to step 4720 and sets the target move-out route Rout_tgt. Then, the vehicle CPU 291 proceeds with the processing to step 4725 and acquires the remaining move-out distance Dout. Then, the vehicle CPU 291 proceeds with the processing to step 4730 and wirelessly transmits a vehicle position signal and a remaining move-out distance signal to the outside. Then, the vehicle CPU 291 proceeds with the processing to step 4735 and sets the value of the sixth vehicle flag X26 to "1." Then, the vehicle CPU 291 proceeds with the processing to step 4795 and temporarily ends the processing of this routine.

On the other hand, when the vehicle CPU 291 determines "No" in step 4715, the vehicle CPU 291 proceeds with the processing to step 4740 and transmits a move-out operation screen display request signal. Then, the vehicle CPU 291 proceeds with the processing to step 4745 and sets the value of the seventh vehicle flag X27 to "1." Then, the vehicle CPU 291 proceeds with the processing to step 4795 and temporarily ends the processing of this routine.

When the vehicle CPU 291 determines "No" in step 4705 or step 4710, the vehicle CPU 291 proceeds with the processing directly to step 4795 and temporarily ends the processing of this routine.

Figure 48:
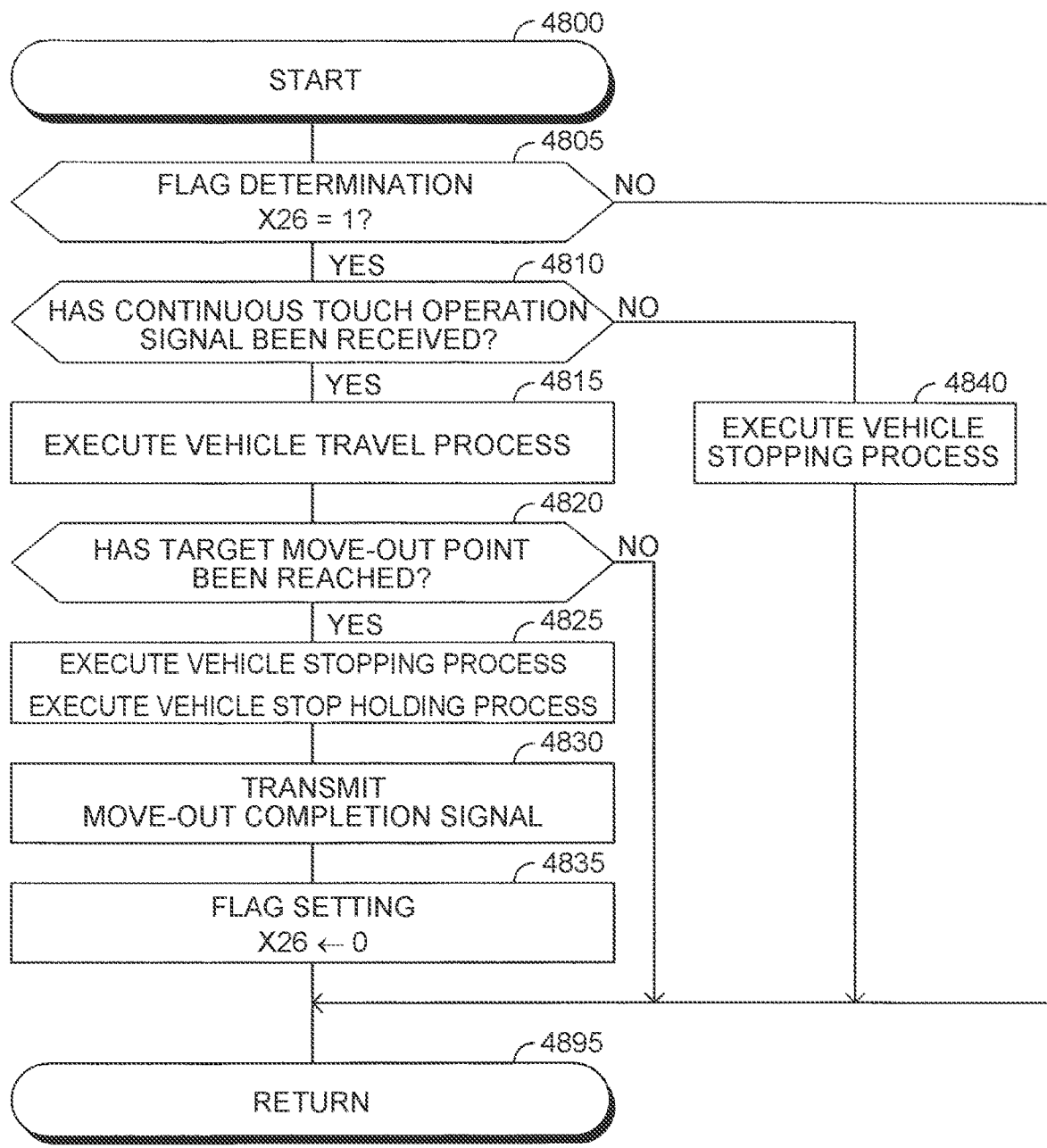
FIG. 48 is a flowchart showing a routine executed by the vehicle control device according to the embodiment of the disclosure.

Further, the vehicle CPU 291 is configured to execute the routine shown in FIG. 48 in a predetermined arithmetic operation cycle. Therefore, when a predetermined timing comes, the vehicle CPU 291 starts the processing of the routine shown in FIG. 48 from step 4800 and proceeds with the processing to step 4805, where it determines whether the value of the sixth vehicle flag X26 is "1." When the vehicle CPU 291 determines "Yes" in step 4805, the vehicle CPU 291 proceeds with the processing to step 4810 and determines whether a continuous touch operation signal has been received. When the vehicle CPU 291 determines "Yes" in step 4810, the vehicle CPU 291 proceeds with the processing to step 4815 and executes the vehicle travel process.

Then, the vehicle CPU 291 proceeds with the processing to step 4820 and determines whether the host vehicle 200 has reached the target move-out point Pout_tgt. When the vehicle CPU 291 determines "Yes" in step 4820, the vehicle CPU 291 proceeds with the processing to step 4825 and executes the vehicle stopping process and the vehicle stop holding process. Then, the vehicle CPU 291 proceeds with the processing to step 4830 and wirelessly transmits a move-out completion signal to the outside. Then, the vehicle CPU 291 proceeds with the processing to step 4835 and sets the value of the sixth vehicle flag X26 to "0." Then, the vehicle CPU 291 proceeds with the processing to step 4895 and temporarily ends the processing of this routine.

On the other hand, when the vehicle CPU 291 determines "No" in step 4820, the vehicle CPU 291 proceeds with the processing directly to step 4895 and temporarily ends the processing of this routine.

When the vehicle CPU 291 determines "No" in step 4810, the vehicle CPU 291 proceeds with the processing to step 4840 and executes the vehicle stopping process. Then, the vehicle CPU 291 proceeds with the processing to step 4895 and temporarily ends the processing of this routine.

When the vehicle CPU 291 determines "No" in step 4805, the vehicle CPU 291 proceeds with the processing directly to step 4895 and temporarily ends the processing of this routine.

Figure 49:
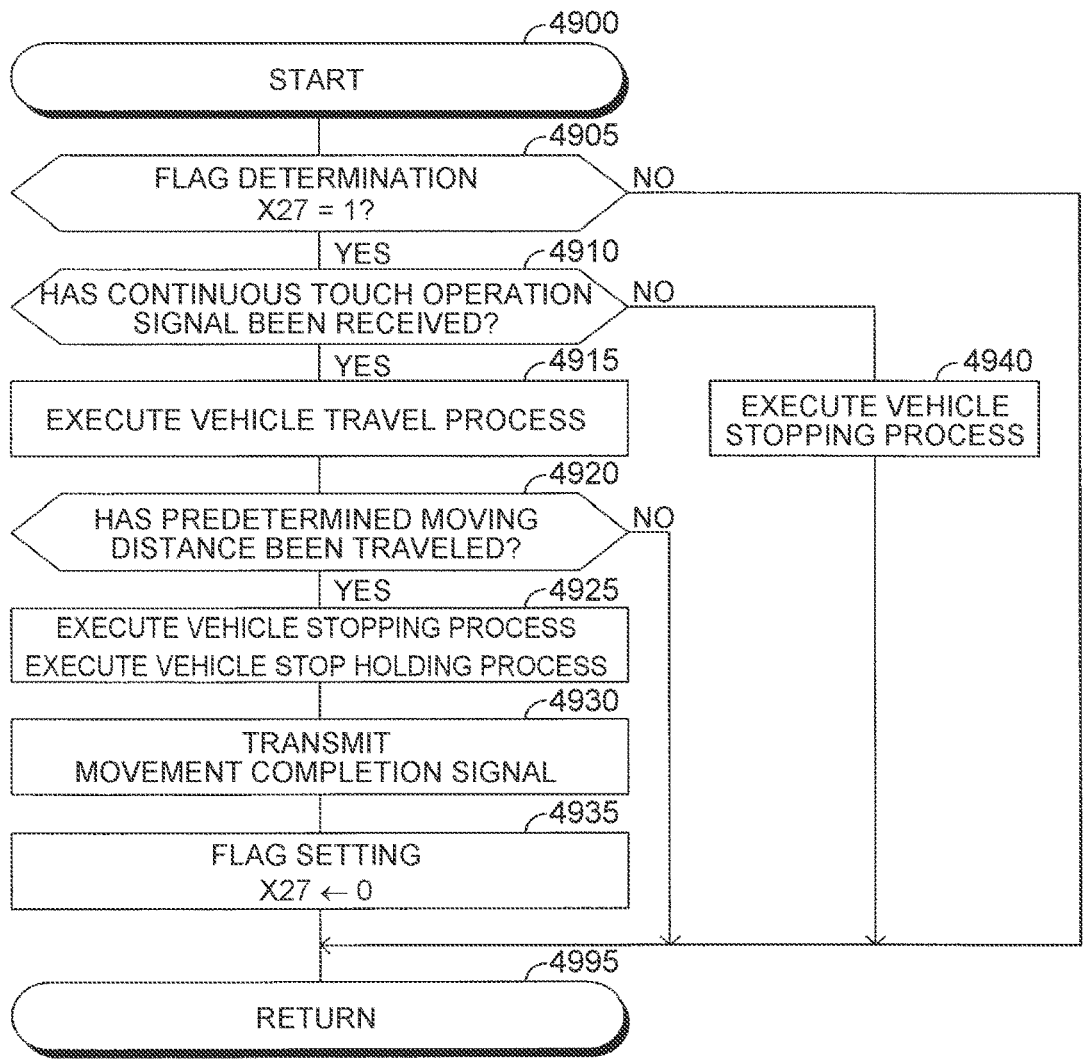
FIG. 49 is a flowchart showing a routine executed by the vehicle control device according to the embodiment of the disclosure.

Further, the vehicle CPU 291 is configured to execute the routine shown in FIG. 49 in a predetermined arithmetic operation cycle. Therefore, when a predetermined timing comes, the vehicle CPU 291 starts the processing of the routine shown in FIG. 49 from step 4900 and proceeds with the processing to step 4905, where it determines whether the value of the seventh vehicle flag X27 is "1." When the vehicle CPU 291 determines "Yes" in step 4905, the vehicle CPU 291 proceeds with the processing to step 4910 and determines whether a continuous touch operation signal has been received. When the vehicle CPU 291 determines "Yes" in step 4910, the vehicle CPU 291 proceeds with the processing to step 4915 and executes the vehicle travel process.

Then, the vehicle CPU 291 proceeds with the processing to step 4920 and determines whether the host vehicle 200 has traveled the predetermined moving direction. When the vehicle CPU 291 determines "Yes" in step 4920, the vehicle CPU 291 proceeds with the processing to step 4925 and executes the vehicle stopping process and the vehicle stop holding process. Then, the vehicle CPU 291 proceeds with the processing to step 4930 and wirelessly transmits a movement completion signal to the outside. Then, the vehicle CPU 291 proceeds with the processing to step 4935 and sets the value of the seventh vehicle flag X27 to "0." Then, the vehicle CPU 291 proceeds with the processing to step 4995 and temporarily ends the processing of this routine.

On the other hand, when the vehicle CPU 291 determines "No" in step 4920, the vehicle CPU 291 proceeds with the processing directly to step 4995 and temporarily ends the processing of this routine.

When the vehicle CPU 291 determines "No" in step 4910, the vehicle CPU 291 proceeds with the processing to step 4940 and executes the vehicle stopping process. Then, the vehicle CPU 291 proceeds with the processing to step 4995 and temporarily ends the processing of this routine.

When the vehicle CPU 291 determines "No" in step 4905, the vehicle CPU 291 proceeds with the processing directly to step 4995 and temporarily ends the processing of this routine.

Figure 50:
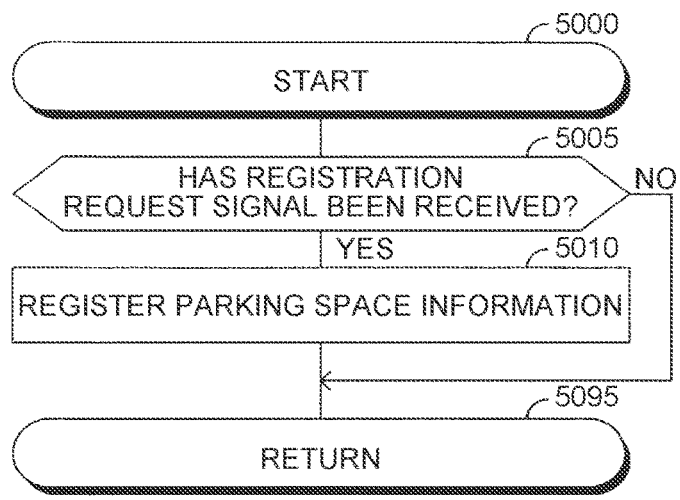
FIG. 50 is a flowchart showing a routine executed by the vehicle control device according to the embodiment of the disclosure.

Further, the vehicle CPU 291 is configured to execute the routine shown in FIG. 50 in a predetermined arithmetic operation cycle. Therefore, when a predetermined timing comes, the vehicle CPU 291 starts the processing of the routine shown in FIG. 50 from step 5000 and proceeds with the processing to step 5005, where it determines whether a registration request signal has been received. When the vehicle CPU 291 determines "Yes" in step 5005, the vehicle CPU 291 proceeds with the processing to step 5010 and registers (stores) parking space information IP. Then, the vehicle CPU 291 proceeds with the processing to step 5095 and temporarily ends the processing of this routine.

On the other hand, when the vehicle CPU 291 determines "No" in step 5005, the vehicle CPU 291 proceeds with the processing directly to step 5095 and temporarily ends the processing of this routine.

Figure 51:
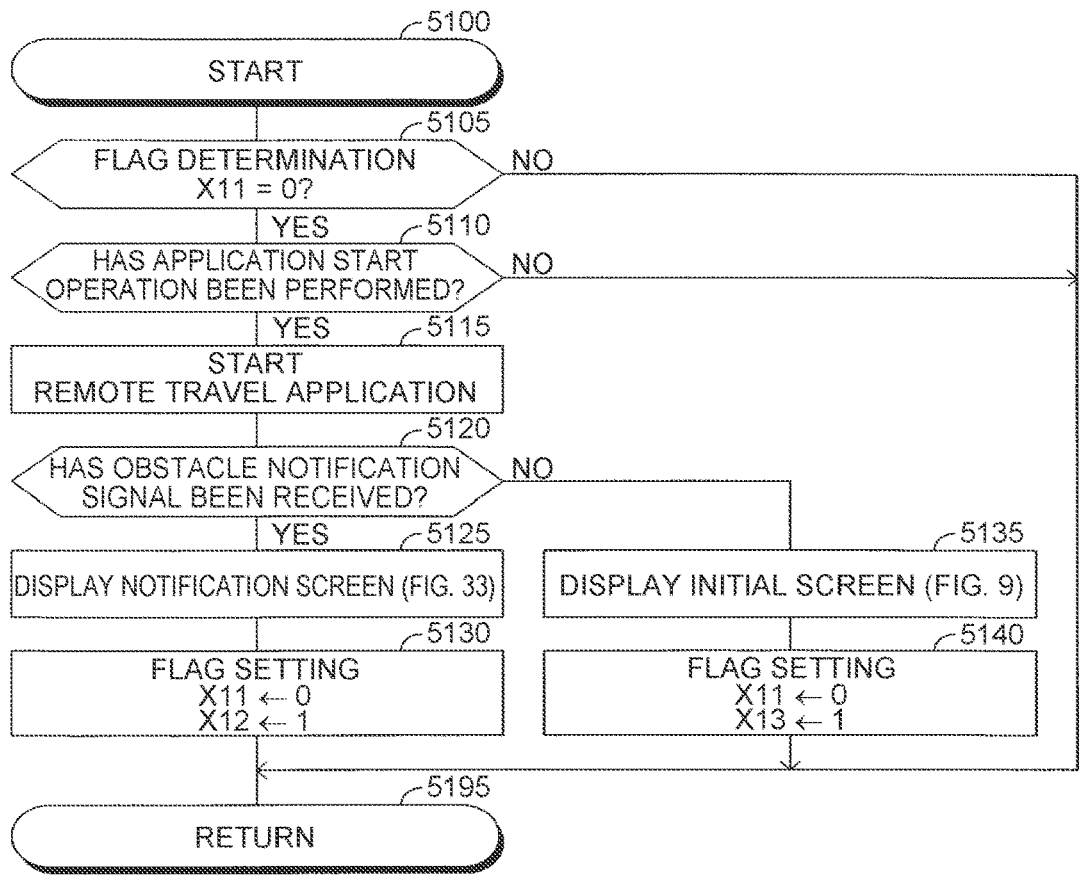
FIG. 51 is a flowchart showing a routine executed by the terminal control device according to the embodiment of the disclosure.

On the other hand, the terminal CPU 191 is configured to execute the routine shown in FIG. 51 in a predetermined arithmetic operation cycle. Therefore, when a predetermined timing comes, the terminal CPU 191 starts the processing of the routine shown in FIG. 51 from step 5100 and proceeds with the processing to step 5105, where it determines whether the value of a first terminal flag X11 is "0." When the terminal CPU 191 determines "Yes" in step 5105, the terminal CPU 191 proceeds with the processing to step 5110 and determines whether application start operation has been performed on the operation terminal 100. When the terminal CPU 191 determines "Yes" in step 5110, the terminal CPU 191 proceeds with the processing to step 5115 and starts the remote travel application.

Then, the terminal CPU 191 proceeds with the processing to step 5120 and determines whether an obstacle notification signal has been received. When the terminal CPU 191 determines "Yes" in step 5120, the terminal CPU 191 proceeds with the processing to step 5125 and displays the screen shown in FIG. 33 on the terminal display 120. Then, the terminal CPU 191 proceeds with the processing to step 5130, sets the value of the first terminal flag X11 to "0," and sets the value of the second terminal flag X12 to "1." Then, the terminal CPU 191 proceeds with the processing to step 5195 and temporarily ends the processing of this routine.

On the other hand, when the terminal CPU 191 determines "No" in step 5120, the terminal CPU 191 proceeds with the processing to step 5135 and displays the screen shown in FIG. 9 on the terminal display 120. Then, the terminal CPU 191 proceeds with the processing to step 5140, sets the value of the first terminal flag X11 to "0," and sets the value of a third terminal flag X13 to "1." Then, the terminal CPU 191 proceeds with the processing to step 5195 and temporarily ends the processing of this routine.

When the terminal CPU 191 determines "No" in step 5105 or step 5110, the terminal CPU 191 proceeds with the processing directly to step 5195 and temporarily ends the processing of this routine.

Figure 52:
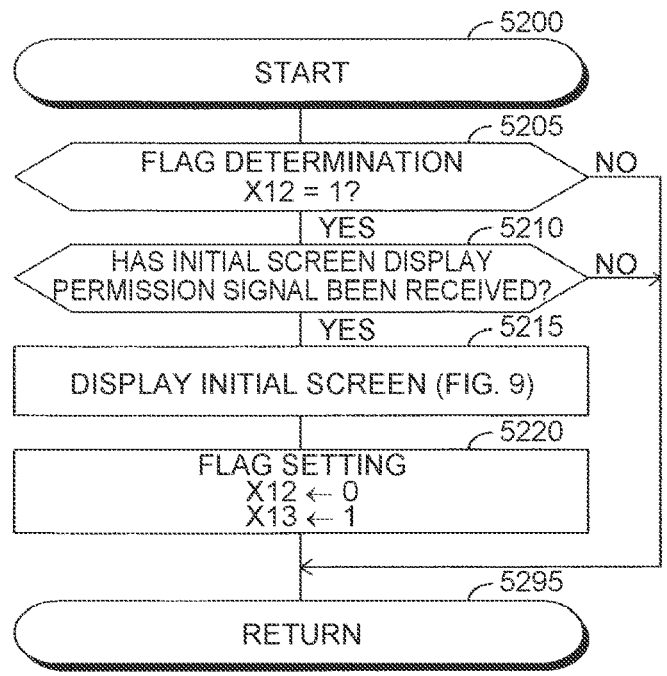
FIG. 52 is a flowchart showing a routine executed by the terminal control device according to the embodiment of the disclosure.

Further, the terminal CPU 191 is configured to execute the routine shown in FIG. 52 in a predetermined arithmetic operation cycle. Therefore, when a predetermined timing comes, the terminal CPU 191 starts the processing of the routine shown in FIG. 52 from step 5200 and proceeds with the processing to step 5205, where it determines whether the value of the second terminal flag X12 is "1." When the terminal CPU 191 determines "Yes" in step 5205, the terminal CPU 191 proceeds with the processing to step 5210 and determines whether an initial screen display permission signal has been received. When the terminal CPU 191 determines "Yes" in step 5210, the terminal CPU 191 proceeds with the processing to step 5215 and displays the screen shown in FIG. 9 on the terminal display 120. Then, the terminal CPU 191 proceeds with the processing to step 5220, sets the value of the second terminal flag X12 to "0," and sets the value of the third terminal lag X13 to "1." Then, the terminal CPU 191 proceeds with the processing to step 5295 and temporarily ends the processing of this routine.

On the other hand, when the terminal CPU 191 determines "No" in step 5205 or step 5210, the terminal CPU 191 proceeds with the processing directly to step 5295 and temporarily ends the processing of this routine.

Figure 53:
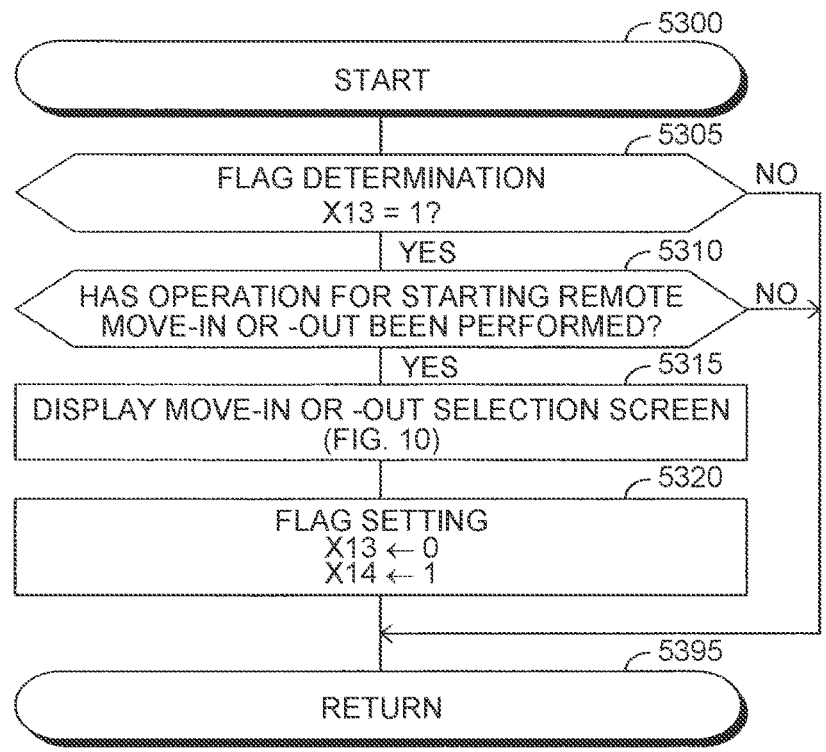
FIG. 53 is a flowchart showing a routine executed by the terminal control device according to the embodiment of the disclosure.

Further, the terminal CPU 191 is configured to execute the routine shown in FIG. 53 in a predetermined arithmetic operation cycle. Therefore, when a predetermined timing comes, the terminal CPU 191 starts the processing of the routine shown in FIG. 53 from step 5300 and proceeds with the processing to step 5305, where it determines whether the value of the third terminal flag X13 is "1." When the terminal CPU 191 determines "Yes" in step 5305, the terminal CPU 191 proceeds with the processing to step 5310 and determines whether touch operation has been performed on the remote move-in or -out start image portion P11. When the terminal CPU 191 determines "Yes" in step 5310, the terminal CPU 191 proceeds with the processing to step 5315 and displays the screen shown in FIG. 10 on the terminal display 120. Then, the terminal CPU 191 proceeds with the processing to step 5320, sets the value of the third terminal flag X13 to "0," and sets the value of a fourth terminal flag X14 to "1." Then, the terminal CPU 191 proceeds with the processing to step 5395 and temporarily ends the processing of this routine.

On the other hand, when the terminal CPU 191 determines "No" in step 5305 or step 5310, the terminal CPU 191 proceeds with the processing directly to step 5395 and temporarily ends the processing of this routine.

Figure 54:
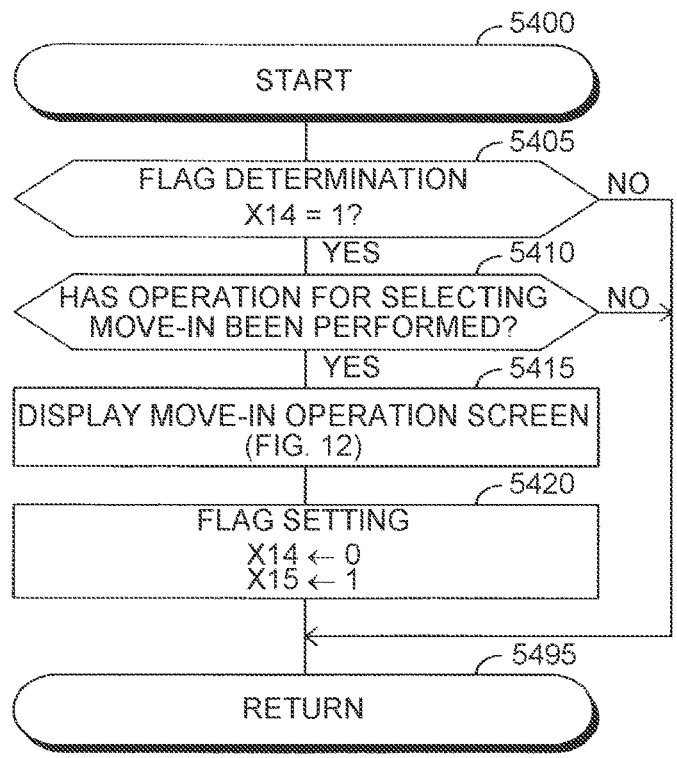
FIG. 54 is a flowchart showing a routine executed by the terminal control device according to the embodiment of the disclosure.

Further, the terminal CPU 191 is configured to execute the routine shown in FIG. 54 in a predetermined arithmetic operation cycle. Therefore, when a predetermined timing comes, the terminal CPU 191 starts the processing of the routine shown in FIG. 54 from step 5400 and proceeds with the processing to step 5405, where it determines whether the value of the fourth terminal flag X14 is "1." When the terminal CPU 191 determines "Yes" in step 5405, the terminal CPU 191 proceeds with the processing to step 5410 and determines whether touch operation has been performed on the move-in selection image portion P12in. When the terminal CPU 191 determines "Yes" in step 5410, the terminal CPU 191 proceeds with the processing to step 5415 and displays the screen shown in FIG. 12 on the terminal display 120. Then, the terminal CPU 191 proceeds with the processing to step 5420, sets the value of the fourth terminal flag X14 to "0," and sets the value of a fifth terminal flag X15 to "1." Then, the terminal CPU 191 proceeds with the processing to step 5495 and temporarily ends the processing of this routine.

On the other hand, when the terminal CPU 191 determines "No" in step 5405 or step 5410, the terminal CPU 191 proceeds with the processing to step 5495 and temporarily ends the processing of this routine.

Figure 55:
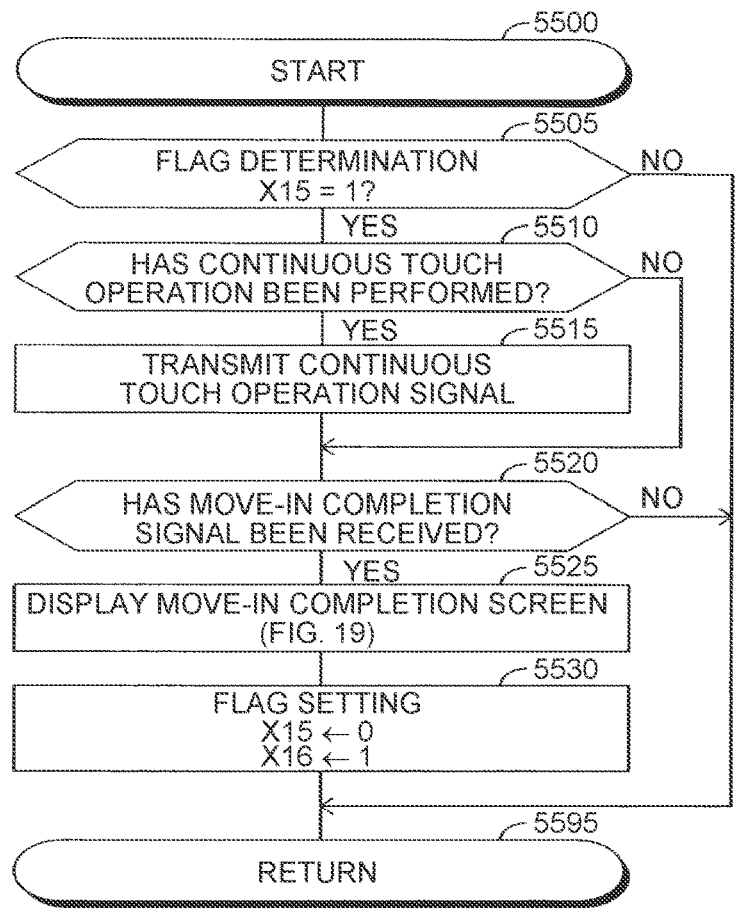
FIG. 55 is a flowchart showing a routine executed by the terminal control device according to the embodiment of the disclosure.

Further, the terminal CPU 191 is configured to execute the routine shown in FIG. 55 in a predetermined arithmetic operation cycle. Therefore, when a predetermined timing comes, the terminal CPU 191 starts the processing of the routine shown in FIG. 55 from step 5500 and proceeds with the processing to step 5505, where it determines whether the value of the fifth terminal flag X15 is "1." When the terminal CPU 191 determines "Yes" in step 5505, the terminal CPU 191 proceeds with the processing to step 5510 and determines whether continuous touch operation has been performed on the travel operation image portion P15. When the terminal CPU 191 determines "Yes" in step 5510, the terminal CPU 191 proceeds with the processing to step 5515 and wirelessly transmits a continuous touch operation signal to the outside. Then, the terminal CPU 191 proceeds with the processing to step 5520.

On the other hand, when the terminal CPU 191 determines "No" in step 5510, the terminal CPU 191 proceeds with the processing directly to step 5520.

When the terminal CPU 191 proceeds with the processing to step 5520, the terminal CPU 191 determines whether a move-in completion signal has been received. When the terminal CPU 191 determines "Yes" in step 5520, the terminal CPU 191 proceeds with the processing to step 5525 and displays the screen shown in FIG. 19 on the terminal display 120. Then, the terminal CPU 191 proceeds with the processing to step 5530, sets the value of the fifth terminal flag X15 to "0," and sets the value of a sixth terminal flag X16 to "1."

On the other hand, when the terminal CPU 191 determines "No" in step 5505 or 5520, the terminal CPU 191 proceeds with the processing directly to step 5595 and temporarily ends the processing of this routine.

Figure 56:
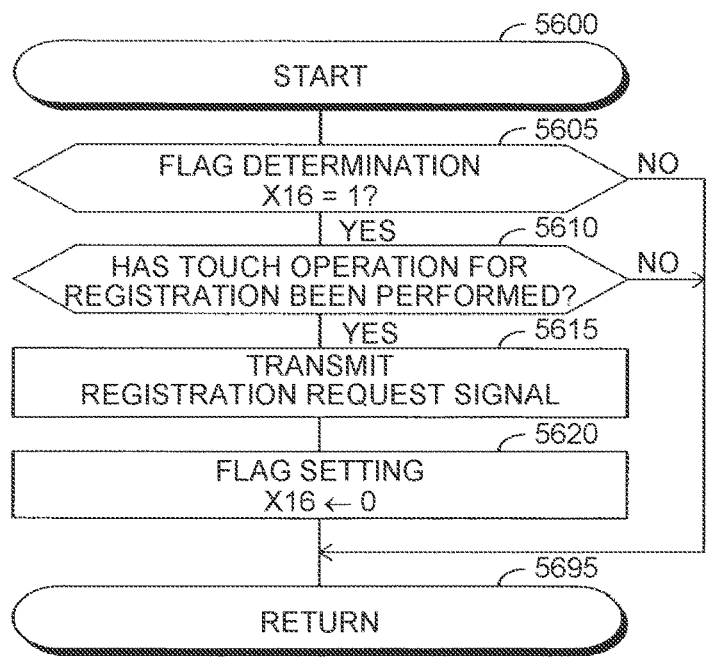
FIG. 56 is a flowchart showing a routine executed by the terminal control device according to the embodiment of the disclosure.

Further, the terminal CPU 191 is configured to execute the routine shown in FIG. 56 in a predetermined arithmetic operation cycle. Therefore, when a predetermined timing comes, the terminal CPU 191 starts the processing of the routine shown in FIG. 56 from step 5600 and proceeds with the processing to step 5605, where it determines whether the value of the sixth terminal flag X16 is "1." When the terminal CPU 191 determines "Yes" in step 5605, the terminal CPU 191 proceeds with the processing to step 5610 and determines whether touch operation has been performed on the registration image portion P19reg. When the terminal CPU 191 determines "Yes" in step 5610, the terminal CPU 191 proceeds with the processing to step 5615 and transmits a registration request signal. Then, the terminal CPU 191 proceeds with the processing to step 5620 and sets the value of the sixth terminal flag X16 to "0." Then, the terminal CPU 191 proceeds with the processing to step 5695 and temporarily ends the processing of this routine.

On the other hand, when the terminal CPU 191 determines "No" in step 5605 or step 5610, the terminal CPU 191 proceeds with the processing directly to step 5695 and temporarily ends the processing of this routine.

Figure 57:
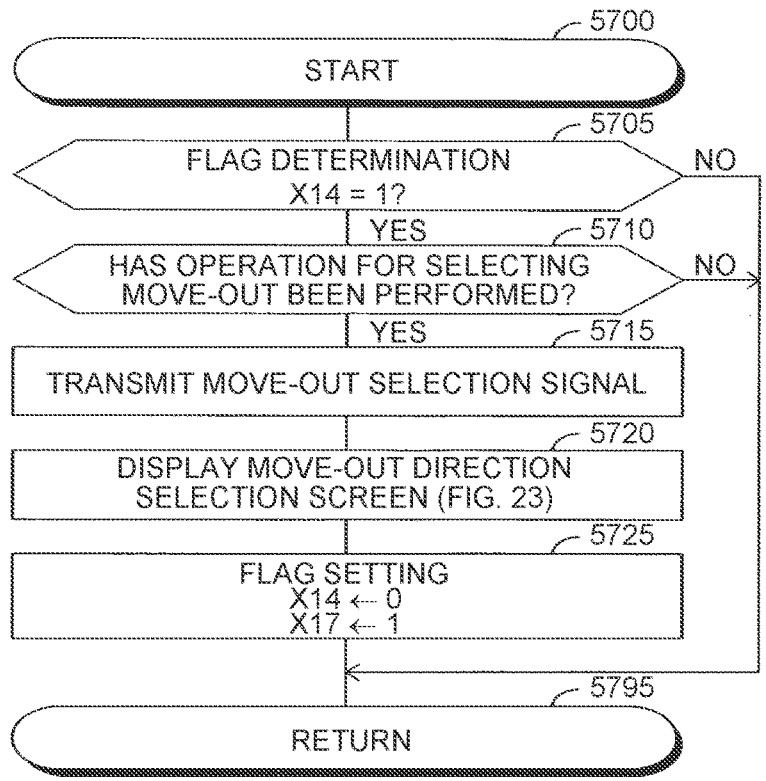
FIG. 57 is a flowchart showing a routine executed by the terminal control device according to the embodiment of the disclosure.

Further, the terminal CPU 191 is configured to execute the routine shown in FIG. 57 in a predetermined arithmetic operation cycle. Therefore, when a predetermined timing comes, the terminal CPU 191 starts the processing of the routine shown in FIG. 57 from step 5700 and proceeds with the processing to step 5705, where it determines whether the value of the fourth terminal flag X14 is "1." When the terminal CPU 191 determines "Yes" in step 5705, the terminal CPU 191 proceeds with the processing to step 5710 and determines whether touch operation has been performed on the move-out selection image portion P12out. When the terminal CPU 191 determines "Yes" in step 5710, the terminal CPU 191 proceeds with the processing to step 5715 and wirelessly transmits a move-out selection signal to the outside. Then, the terminal CPU 191 proceeds with the processing to step 5720 and displays the screen shown in FIG. 23 on the terminal display 120. Then, the terminal CPU 191 proceeds with the processing to step 5725, sets the value of the fourth terminal flag X14 to "0," and sets the value of a seventh terminal flag X17 to "1." Then, the terminal CPU 191 proceeds with the processing to step 5795 and temporarily ends the processing of this routine.

On the other hand, when the terminal CPU 191 determines "No" in step 5705 or step 5710, the terminal CPU 191 proceeds with the processing directly to step 5795 and temporarily ends the processing of this routine.

Figure 58:
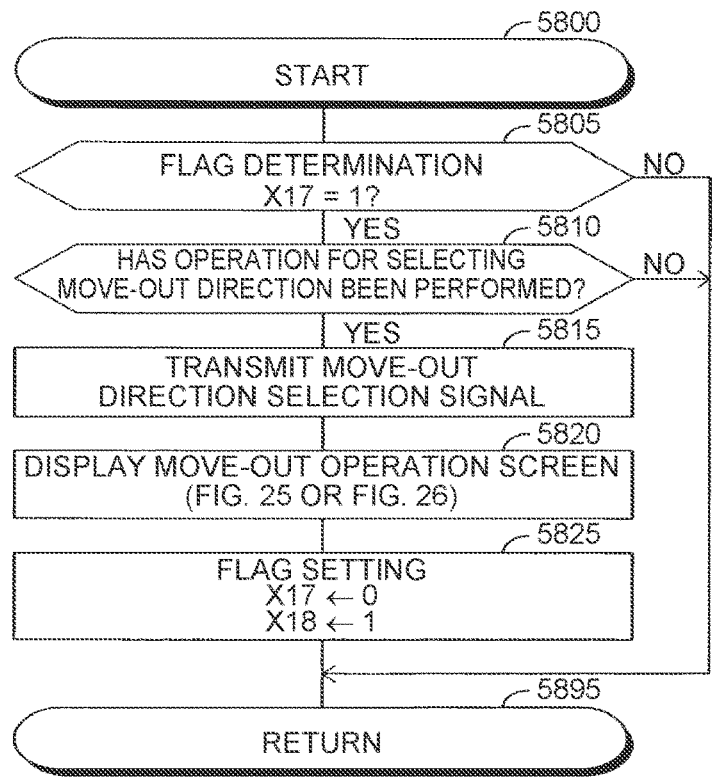
FIG. 58 is a flowchart showing a routine executed by the terminal control device according to the embodiment of the disclosure.

Further, the terminal CPU 191 is configured to execute the routine shown in FIG. 58 in a predetermined arithmetic operation cycle. Therefore, when a predetermined timing comes, the terminal CPU 191 starts the processing of the routine shown in FIG. 58 from step 5800 and proceeds with the processing to step 5805, where it determines whether the value of the seventh terminal flag X17 is "1." When the terminal CPU 191 determines "Yes" in step 5805, the terminal CPU 191 proceeds with the processing to step 5810 and determines whether touch operation has been performed on the forward move-out selection image portion P16out_fwd or the rearward move-out selection image portion P16out_rwd. When the terminal CPU 191 determines "Yes" in step 5810, the terminal CPU 191 proceeds with the processing to step 5815 and wirelessly transmits a move-out direction selection signal to the outside. Then, the terminal CPU 191 proceeds with the processing to step 5820 and displays the screen shown in FIG. 25 or FIG. 26 on the terminal display 120. Then, the terminal CPU 191 proceeds with the processing to step 5825, sets the value of the seventh terminal flag X17 to "0," and sets the value of an eighth terminal flag X18 to "1." Then, the terminal CPU 191 proceeds with the processing to step 5895 and temporarily ends the processing of this routine.

On the other hand, when the terminal CPU 191 determines "No" in step 5805 or step 5810, the terminal CPU 191 proceeds with the processing directly to step 5895 and temporarily ends the processing of this routine.

Figure 59:
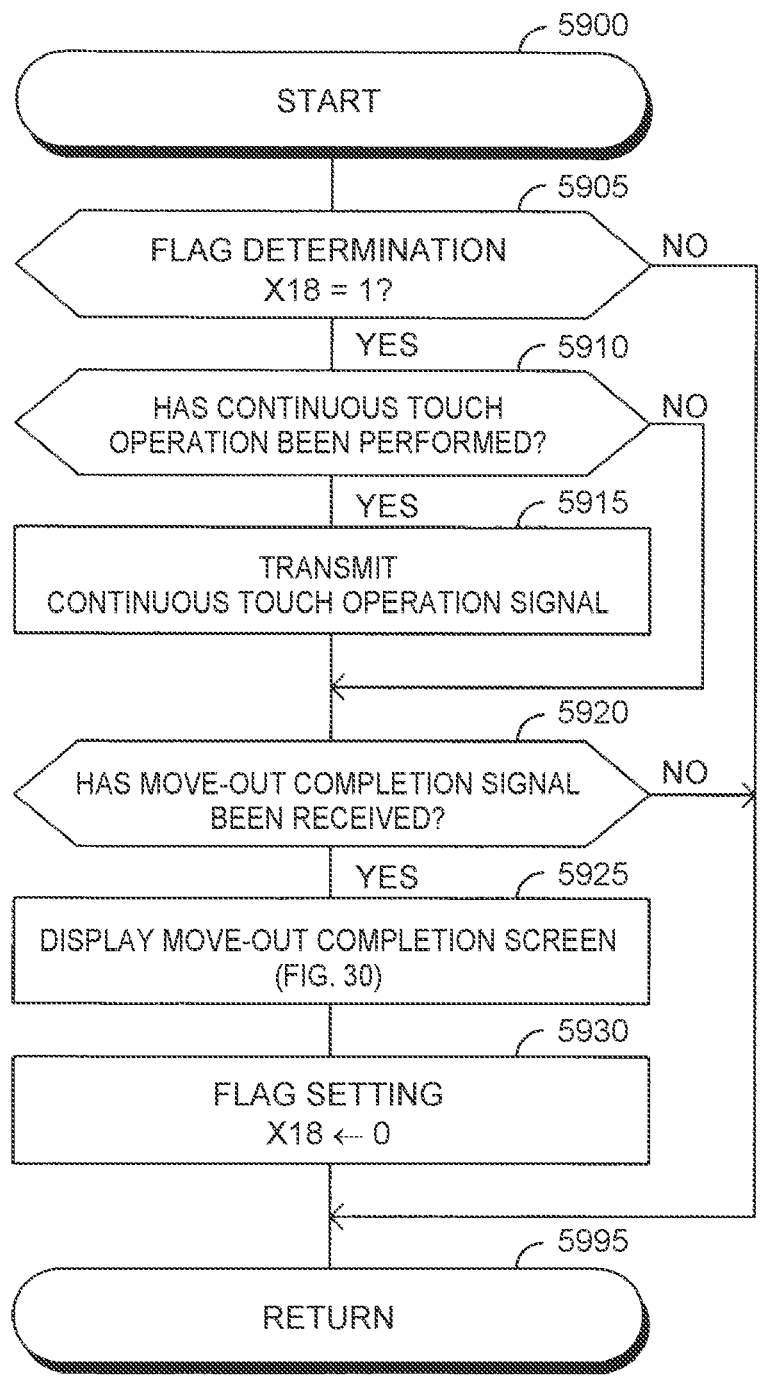
FIG. 59 is a flowchart showing a routine executed by the terminal control device according to the embodiment of the disclosure.

Further, the terminal CPU 191 is configured to execute the routine shown in FIG. 59 in a predetermined arithmetic operation cycle. Therefore, when a predetermined timing comes, the terminal CPU 191 starts the processing of the routine shown in FIG. 59 from step 5900 and proceeds with the processing to step 5905, where it determines whether the value of the eighth terminal flag X18 is "1." When the terminal CPU 191 determines "Yes" in step 5905, the terminal CPU 191 proceeds with the processing to step 5910 and determines whether continuous touch operation has been performed on the travel operation image portion P15. When the terminal CPU 191 determines "Yes" in step 5910, the terminal CPU 191 proceeds with the processing to step 5915 and wirelessly transmits a continuous touch operation signal to the outside. Then, the terminal CPU 191 proceeds with the processing to step 5920.

On the other hand, when the terminal CPU 191 determines "No" in step 5910, the terminal CPU 191 proceeds with the processing directly to step 5920.

When the terminal CPU 191 proceeds with the processing to step 5920, the terminal CPU 191 determines whether a move-out completion signal has been received. When the terminal CPU 191 determines "Yes" in step 5920, the terminal CPU 191 proceeds with the processing to step 5925 and displays the screen shown in FIG. 30 on the terminal display 120. Then, the terminal CPU 191 proceeds with the processing to step 5930 and sets the value of the eighth terminal flag X18 to "0." Then, the terminal CPU 191 proceeds with the processing to step 5995 and temporarily ends the processing of this routine.

On the other hand, when the terminal CPU 191 determines "No" in step 5905 or 5920, the terminal CPU 191 proceeds with the processing directly to step 5995 and temporarily ends the processing of this routine.

The above is the specific operation of the remote travel system 10.

The disclosure is not limited to the above-described embodiment, and various modified examples can be adopted within the scope of the disclosure.

What is claimed is:

1. A remote travel system comprising:
a vehicle including a first processor, a memory, and a display, the first processor being configured to perform remote travel control that causes the vehicle to travel autonomously; and
an operation terminal including a second processor configured to perform wireless communication with the first processor that sends a signal to the vehicle to start the vehicle to travel autonomously, the operation terminal being a terminal that is separate from the vehicle and used by a user of the vehicle, wherein
the first processor is configured to:
register a parking stall in the memory,
detect a movable obstacle on a travel route of the vehicle to a target parking stall to be reached by the vehicle during execution of the remote travel control,
when the movable obstacle is detected on the travel route of the vehicle to the target parking stall, set the target parking stall as a designated parking stall in response to the user in the vehicle performing a touch operation on the display mounted on the vehicle when the target parking stall is the registered parking stall, and
after the designated parking stall is set in response to the user in the vehicle performing the touch operation on the display mounted on the vehicle, cause the display mounted on the vehicle to display an image to prompt the user to step out of the vehicle,
the second processor is configured to, after the user has stepped out of the vehicle, notify the user, via the operation terminal, to remove the movable obstacle from an entrance of the target parking stall,
after the designated parking stall is set and the second processor has notified the user to remove the movable obstacle, the first processor is configured to control an internal combustion engine or a motor of the vehicle to perform the remote travel control to cause the vehicle to travel autonomously on the travel route that has the movable obstacle; and
control a parking brake of the vehicle to stop travel of the vehicle when a likelihood of the vehicle coming into contact with the movable obstacle becomes high while the vehicle is traveling on the travel route under the remote travel control to the designated parking stall.

2. The remote travel system according to claim 1, wherein, when the target parking stall registered in the memory is designated as the designated stall and the obstacle is present on the travel route of the vehicle to the designated stall during execution of the remote travel control, the second processor performs a notification process of notifying the presence of the obstacle to the user.

3. The remote travel system according to claim 1, wherein the movable obstacle is a shutter that closes the target parking stall, and the first processor is configured to, even when an entrance of the target parking stall is closed by the shutter, set the target parking stall as the designated parking stall when the target parking stall is the registered parking stall.

\* \* \* \* \*